US008000038B2

(12) United States Patent
Hirao et al.

(10) Patent No.: US 8,000,038 B2
(45) Date of Patent: Aug. 16, 2011

(54) IMAGE PICKUP LENS, IMAGE PICKUP APPARATUS AND MOBILE TERMINAL

(75) Inventors: Yusuke Hirao, Sakai (JP); Keiji Matsusaka, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/522,580

(22) PCT Filed: Feb. 7, 2008

(86) PCT No.: PCT/JP2008/052036
§ 371 (c)(1),
(2), (4) Date: Jul. 9, 2009

(87) PCT Pub. No.: WO2008/102648
PCT Pub. Date: Aug. 28, 2008

(65) Prior Publication Data
US 2010/0046096 A1 Feb. 25, 2010

(30) Foreign Application Priority Data
Feb. 19, 2007 (JP) .................. 2007-038221

(51) Int. Cl.
*G02B 9/04* (2006.01)
(52) U.S. Cl. ........................ 359/795; 359/642
(58) Field of Classification Search .............. 359/642, 359/645, 689–690, 795
See application file for complete search history.

(56) References Cited

U.S. PATENT DOCUMENTS

| 4,227,773 A | * | 10/1980 | Tojo et al. ............... 359/659 |
| 5,646,788 A | * | 7/1997 | Bietry .................. 359/740 |
| 5,995,279 A | * | 11/1999 | Ogino et al. ............ 359/355 |
| 2006/0262416 A1 | * | 11/2006 | Lee et al. .............. 359/645 |
| 2008/0130143 A1 | * | 6/2008 | Oh et al. .............. 359/794 |

FOREIGN PATENT DOCUMENTS

| JP | 2006-323365 A | 11/2006 |
| JP | 3926380 B1 | 3/2007 |
| JP | 3929479 B1 | 3/2007 |
| JP | 2007-126636 A | 5/2007 |
| JP | 3976780 B1 | 6/2007 |
| JP | 3976781 B1 | 6/2007 |
| JP | 3976782 B1 | 6/2007 |
| JP | 3946245 B1 | 7/2007 |
| JP | 4022246 B1 | 10/2007 |
| WO | WO 2008/102648 A1 | 8/2008 |

* cited by examiner

*Primary Examiner* — Joseph Martinez
*Assistant Examiner* — James R Greece
(74) *Attorney, Agent, or Firm* — Sidley Austin LLP

(57) ABSTRACT

The present invention provides an image pickup lens, an image pickup apparatus, and a mobile terminal The image pickup lens includes a lens group. The lens group includes a lens substrate which is a parallel flat plate, and lenses are formed on an object side surface and image side surface of the lens substrate, where a lens with a positive refractive power formed on the lens substrate has an Abbe number of vp and a lens with a negative refractive power formed on the lens substrate has an Abbe number of vn. The difference between the Abbe number vp and the Abbe number of vn satisfies $10<|vp-vn|$.

8 Claims, 32 Drawing Sheets

IMAGE PICKUP LENS, IMAGE PICKUP APPARATUS AND MOBILE TERMINAL

RELATED APPLICATIONS

This application is a U.S. National Phase Application under 35 USC 371 of International Application PCT/JP2008/052036 filed Feb. 7, 2008.

TECHNICAL FIELD

The present invention relates to an image pickup lens for an image pickup apparatus that employs a solid-state imaging device such as an image sensor of a CCD type and an image sensor of a CMOS type and that is capable of being mounted on a mobile terminal.

BACKGROUND ART

A small-sized and thin-type image pickup apparatus has been mounted on a mobile terminal representing a small-sized and thin-type electronic instrument such as a cell-phone and a PDA (Personal Digital Assistant), which has made it possible to transmit not only voice information but also image information to the remote place one another.

As image sensors used for these image pickup apparatuses, there are used solid-state imaging devices including an image sensor of a CCD (Charge Coupled Device) type and an image sensor of a CMOS (Complementary Metal-Oxide Semiconductor) type. As a lens for forming a subject image on the image sensor, lenses which are made of resins on a mass production basis at a low price come to be used for achieving a reduced cost.

As an image pickup lens used for such the image pickup apparatus (which is called also as a camera module, hereafter) that is built in a mobile terminal, an optical system of the type of three-element structure composed of three plastic lenses and an optical system of three-element structure composed of one glass lens and two plastic lenses are widely known. However, there are technical limitations for achieving a good balance between further downsizing of these optical systems and mass productivity required for mobile terminals.

To solve the aforesaid problems, there has been proposed a method for mass production of camera modules (see Patent Document 1) wherein a large amount of lens elements are formed simultaneously on a wafer with a dimension of several inches in a parallel flat plate shape, through a replica method, then, the wafer and a sensor wafer are combined and are cut. Lenses manufactured through this manufacturing method are sometimes called wafer scale lenses, and the camera modules manufactured through this manufacturing method are sometimes called wafer scale camera modules. Patent Document 1 discloses an image pickup lens that makes it possible to correct aberrations by simultaneously forming a diffractive surface and a refractive surface on a lens substrate.

However, it is not easy to simultaneously form a diffractive surface and a refractive surface on a lens substrate, and a thickness at the center on the refractive surface becomes extremely thin in the lens system in which an optical total length (a distance from an incident surface arranged at the closest position to the object side in the lens system, to an imaging plane of CCD) is small. Further, when the diffractive surface is employed, a diffraction efficiency for a wavelength other than a design wavelength is lowered, and an angle of light entering the diffractive surface is greatly restricted due to bad angle characteristics of an incident light entering the diffractive surface, which cause a problem that a wide angle of view is hardly secured.

Patent Document 1: Unexamined Japanese Patent Application Publication No. 2006-323365

DISCLOSURE OF INVENTION

Technical Problems

The present invention is achieved in view of the aforesaid circumstances, and an object of the present invention is to provide a wafer scale lens and an image pickup lens equipped with the wafer scale lens, wherein the wafer scale lens is an image pickup lens equipped with a lens substrate and a lens formed on the substrate and exhibits a property that a diffractive surface is not used, a total length of the optical system is short compared with an image height, and aberrations can be corrected favorably, especially, chromatic aberration can be corrected in a good condition.

Solution to Problem

The above object is achieved by an embodiment described in any one of Items 1 through 34:

1. An image pickup lens, where a lens group is assumed to comprise a lens substrate being a parallel flat plate and a lens or lenses formed on at least one of an object side surface and image side surface of the lens substrate, the image pickup lens comprising:
   the lens group in which lenses are formed on both sides of the lens substrate, which satisfies a condition of the following expression (28):
   [Math. 1]
   $$10 < |v_p - v_n| \qquad (28)$$
   In the expression, vp is an Abbe number of a lens with a positive refractive power formed on the lens substrate, and vn is an Abbe number of a lens with a negative refractive power formed on the lens substrate.

2. An image pickup lens, where a lens group is assumed to comprise a lens substrate being a parallel flat plate and a lens or lenses formed on at least one of an object side surface and image side surface of the lens substrate, and a first lens substrate is assumed to be a lens substrate being a parallel flat plate and be included in a lens group arranged at a closest position to an object side, the image pickup lens comprising:
   the first lens substrate;
   a first lens with an Abbe number v1 and a positive refractive power, formed on an object side surface of the first lens substrate; and
   a second lens with an Abbe number v2 and a negative refractive power, formed on an image side surface of the first lens substrate,
   wherein a difference of the Abbe numbers v1 and v2 satisfies a condition of the following expression (1).
   [Math. 2]
   $$10 < (v1 - v2) \qquad (1)$$

3. An image pickup lens, where a lens group is assumed to comprise a lens substrate being a parallel flat plate and a lens or lenses formed on at least one of an object side surface and image side surface of the lens substrate, the image pickup lens consisting of:
   a lens group comprising
   a first lens substrate,
   a first lens with an Abbe number v1 and a positive refractive power, formed on an object side surface of the first lens substrate, an object side surface of the first lens being a convex surface facing the object side, and
   a second lens with an Abbe number v2 and a negative refractive power, formed on an image side surface of the first lens substrate, an image side surface of the second lens being a concave surface facing the image side,
   wherein a difference of the Abbe numbers v1 and v2 satisfies a condition of the following expression (2).
   [Math. 3]
   $$10 < (v1 - v2) < 70 \qquad (2)$$

4. An image pickup lens, where a lens group is assumed to comprise a lens substrate being a parallel flat plate and lenses formed on an object side surface and an image side surface of the lens substrate, the image pickup lens comprising:
a first lens group; and
a lens A arranged at an image side of the first lens group with a predetermined distance,
wherein the first lens group comprises
a first lens substrate,
a first lens with an Abbe number v1 and a positive refractive power, formed on an object side surface of the first lens substrate, an object side surface of the first lens being a convex surface facing the object side, and
a second lens with an Abbe number v2 and a negative refractive power, formed on an image side surface of the first lens substrate, an image side surface of the second lens being an concave surface facing the image side,
the lens A is a lens or a lens group and has a positive or negative refractive power, and
a difference of the Abbe numbers v1 and v2 satisfies a condition of the following expression (2).
[Math. 4]

$$10<(v1-v2)<70 \tag{2}$$

5. An image pickup lens, where a lens group is assumed to comprise a lens substrate being a parallel flat plate and lenses formed on an object side surface and an image side surface of the lens substrate, the image pickup lens comprising:
a first lens group;
a lens A arranged at an image side of the first lens group with a predetermined distance; and
a lens B arranged at an image side of the lens A with a predetermined distance,
wherein the first lens group comprises
a first lens substrate,
a first lens with an Abbe number v1 and a positive refractive power, formed on an object side surface of the first lens substrate, an object side surface of the first lens being a convex surface facing the object side, and
a second lens with an Abbe number v2 with a negative refractive power, formed on an image side surface of the first lens substrate, an image side surface of the second lens being a concave surface facing the image side,
each of the lens A and the lens B is a lens or a lens group, and has a positive or negative refractive power, and
a difference of the Abbe numbers v1 and v2 satisfies a condition of the following expression (2).
[Math. 5]

$$10<(v1-v2)<70 \tag{2}$$

6. The image pickup lens of Item 1,
wherein at least one lens group in which lenses are formed on both sides of the lens substrate, satisfies a condition of the following expression (29).
[Math. 6]

$$10<|(vp-vn)|<70 \tag{29}$$

7. The image pickup lens of Item 2,
wherein at least one lens group in which lenses are formed on both sides of the lens substrate, satisfies a condition of the following expression (2).
[Math. 7]

$$10<(v1-v2)<70 \tag{2}$$

8. The image pickup lens of Item 2, 4, 5, or 7, further comprising:
a second lens substrate being a parallel flat plate, arranged at an image side of the first lens substrate with a predetermined distance, wherein a lens or lenses with a positive or negative power is formed on at least one of an object side surface and an image side surface of the second lens substrate.
9. The image pickup lens of any one of Items 2 through 5, 7, and 8,
wherein an image side surface of the second lens is in an aspheric shape.
10. The image pickup lens of Item 8, further comprising:
a third lens substrate being a parallel flat plate, arranged at the image side of the second lens substrate with a predetermined distance, wherein a lens or lenses with a positive or negative power is formed on at least one of an object side surface and an image side surface of the third lens substrate.
11. The image pickup lens of Item 8 or 10,
wherein at least one m-th lens selected from a third lens and lenses arranged at a closer position to the image side than the third lens, has a negative power and has a focal length fm satisfying a condition of the expression (25).

[Math. 8]

$$-0.7 \leq \frac{f_1}{fm} < 0 \tag{25}$$

In the expression, m satisfies m≧3, and $f_1$ is a focal length of the first lens.
12. The image pickup lens of Item 11,
wherein an Abbe number $v_m$ of the m-th lens satisfies a condition of the expression (26).
[Math. 9]

$$20 \leq vm \leq 50 \tag{26}$$

13. The image pickup lens of Item 11 or 12,
wherein a lens substrate arranged at a closest position to the image side comprises a lens on an image side thereof, and an image side surface of the lens has a negative refractive power.
14. The image pickup lens of any one of Items 8, and 10 through 12, further comprising:
a third lens with a negative refractive power, arranged on an object side surface of the second lens substrate.
15. The image pickup lens of any one of Items 8, and 10 through 14,
wherein a lens surface arranged at a closest position to the image side is an aspheric surface, and
a value calculated by normalizing an amount of an aspheric sag of the lens surface arranged at the closest position to the image side by a maximum image height, satisfies a condition of the following expression (5).

[Math. 10]

$$\frac{|X-X_0|}{Y} > 0.14 \tag{5}$$

In the expression, X is a displacement amount of the aspheric surface given by the expression (5.1), and is measured in a perpendicular direction to an optical axis at a height of a principal ray at a maximum image height. In the expression, $X_0$ is a displacement amount of a component of a quadratic surface of revolution in the aspheric surface, given by the expression (5.2), and is measured in the perpendicular direction to the optical axis at the height of the principal ray at the maximum image height. In the expression, Y is the maximum image height.

[Math. 11]

$$X = \frac{h^2/R}{1+\sqrt{1-(1+K)h^2/R^2}} + \sum A_i h^i \tag{5.1}$$

-continued

[Math. 12]

$$X_0 = \frac{h^2/R}{1+\sqrt{1-(1+K)h^2/R^2}} \quad (5.2)$$

Herein, Ai is a i-th order aspheric surface coefficient of the lens surface arranged at the closest position to the image side, where i=2, 4, 6 ..., R is a paraxial curvature radius of the lens surface arranged at the closest position to the image side, K is a conic constant the lens surface arranged at the closest position to the image side, and h is a height of a principal ray at the maximum image height and is measured in the perpendicular direction to the optical axis.

16. The image pickup lens of any one of Items 8, and 10 through 15,
   wherein a lens formed on the second lens substrate comprises a resin material.

17. The image pickup lens of any one of Items 10 through 16,
   wherein a lens formed on the third lens substrate comprises a resin material.

18. The image pickup lens of any one of Items 2 through 5, and 7 through 17,
   wherein a value calculated by normalizing a focal length $f_{S1}$ of an object side surface of the first lens by a focal length f of a total lens system, satisfies a condition of the following expression (3).

[Math. 13]

$$0.6 \le \frac{f_{s1}}{f} \le 1.0 \quad (3)$$

In the expression, $f_{S1}$ is a focal length of an object side surface of the first lens, and f is a focal length of the total lens system.

19. The image pickup lens of any one of Items 1 through 18,
   wherein a Petzval's sum of a total lens system satisfies a condition of the following expression (4).

[Math. 14]

$$\sum_j \frac{1}{f_j n_j} \le 0.14 \quad (4)$$

In the expression, $f_j$ is a focal length of a j-th lens, and $n_j$ is a refractive index of the j-th lens.

20. The image pickup lens of any one of Items 1 through 19, further comprising:
   an aperture stop formed on a surface of any one of a lens substrate or lens substrates in the image pickup lens.

21. The image pickup lens of Item 20,
   wherein the aperture stop is arranged at a position between the first lens substrate and the first lens.

22. The image pickup lens of any one of Items 2 through 5 and 7 through 21,
   wherein a refractive index n1 of the first lens and a refractive index n2 of the first lens substrate satisfy a condition of the following expression (9).

[Math. 15]

$$n_1 < n_2 \quad (9)$$

23. The image pickup lens of any one of Items 2 through 5 and 7 through 22,
   wherein an Abbe number V0 of the first lens substrate satisfies a condition of the following expression (10).

[Math. 16]

$$_0 \le 60 \quad (10)$$

24. The image pickup lens of any one of Items 2 through 5 and 7 through 21,
   wherein a refractive index n1 of the first lens, a refractive index n2 of the first lens substrate, and an Abbe number v0 of the first lens substrate satisfy a condition of the following expressions (11) and (12).

[Math. 17]

$$n_2 < n_1 \quad (11)$$

[Math. 18]

$$v_0 > 50 \quad (12)$$

25. The image pickup lens of any one of Items 2 through 5 and 7 through 24,
   wherein each of the first lens and the second lens comprises a resin material.

26. The image pickup lens of Item 25,
   wherein the difference of the Abbe numbers v1 and v2 satisfies a condition of the following expression (8).

[Math. 19]

$$10 < (v1-v2) < 40 \quad (8)$$

27. The image pickup lens of any one of Items 16 through 26,
   wherein inorganic fine particles with a size of 30 nanometers or less are dispersed into the resin material.

28. The image pickup lens of any one of Items 16 through 27,
   wherein the resin material is a curable resin.

29. The image pickup lens of Item 28,
   wherein the resin material is a UV curing resin.

30. The image pickup lens of any one of Items 1 through 29,
   1 wherein a surface coming in contact with the air of each of lenses in the image pickup lens, is in an aspheric shape.

31. An image pickup lens, where a lens group is assumed to comprise a lens substrate being a parallel flat plate and a lens or lenses formed on at least one of an object side surface and image side surface of the lens substrate, the image pickup lens comprising:
   a lens group; and
   an optical member being a parallel flat plate, arranged at an image side of the lens group with a predetermined distance,
   wherein the lens group comprises:
   a first lens substrate;
   a first lens with an Abbe number v1 and a positive refractive power, formed on an object side surface of the first lens substrate, an object side surface of the first lens being a convex surface facing the object side; and
   a second lens with an Abbe number v2 and a negative refractive power, formed on an image side surface of the first lens substrate, an image side surface of the second lens being a concave surface facing the image side,
   a difference of the Abbe numbers v1 and v2 satisfies a condition of the following expression (2), and the optical member satisfies a condition of the following expression (6).

[Math. 20]

$$10 < (v1 - v2) < 70 \quad (2)$$

[Math. 21]

$$\frac{D_g}{f} \ge 0.1 \quad (6)$$

In the expression, Dg is a thickness of the optical member, and f is a focal length of a total lens system.

32. An image pickup lens, where a lens group is assumed to comprise a lens substrate being a parallel flat plate and a lens or lenses formed on at least one of an object side surface and image side surface of the lens substrate, the image pickup lens comprising:

a lens group; and
an optical member being a parallel flat plate, arranged at an image side of the lens group with a predetermined distance,
wherein the lens group comprises:
a first lens substrate;
a first lens with an Abbe number v1 and a positive refractive power, formed on an object side surface of the first lens substrate, an object side surface of the first lens being a convex surface facing the object side; and
a second lens with an Abbe number v2 and a negative refractive power, formed on an image side surface of the first lens substrate, the image side surface of the second lens being a concave surface facing the image side,
a difference of the Abbe numbers v1 and v2 satisfies a condition of the following expression (2), and the optical member satisfies a condition of the following expression (7).

[Math. 22]

$$10 < (v1 - v2) < 70 \qquad (2)$$

[Math. 23]

$$0.13 > \frac{l_2 - l_1}{f} \qquad (7)$$

In the expression, $l_1$ is an optical path length of an axial ray from the second lens to an image plane, $l_2$ is an optical path length of a principal ray at a maximum image height from the second lens to the image plane, and f is a focal length of a total lens system.

33. An image pickup apparatus comprising:
an image pickup lens of any one of Items 1 through 32; and
an image sensor photoelectrically converting an object image formed by the image pickup lens.

34. A mobile terminal comprising: an image pickup apparatus of Item 33.

ADVANTAGEOUS EFFECTS OF INVENTION

According to the present invention, there are provided a first lens with positive refractive power formed on a surface of a first lens substrate facing the object side and the second lens with negative refractive power formed on a surface of the first lens substrate facing the image side, wherein a difference between Abbe numbers of the first lens and the second lens exceeds 10, by which chromatic aberration is corrected satisfactorily and the total length of the optical system is shortened, without employing a diffractive surface.

REFERENCE SIGNS LIST

Figure 1:
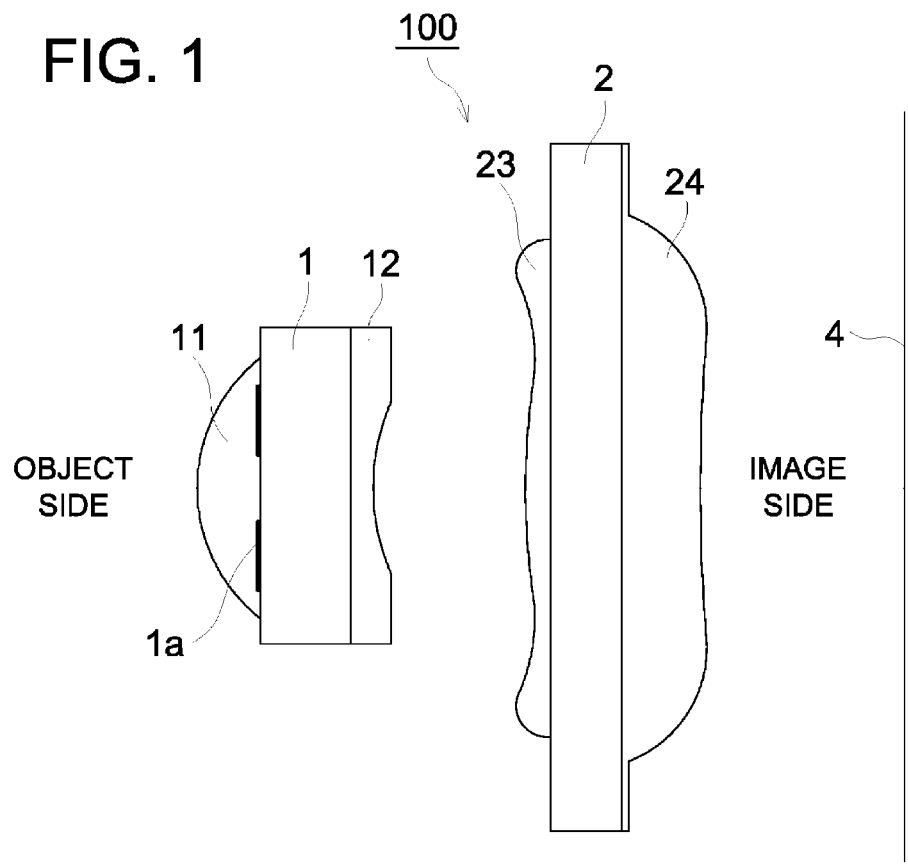
FIG. 1 is a diagram showing the structure of an image pickup lens relating to First Embodiment and First Example.
Each of FIGS. 2a and 2b is an enlarged diagram of the first lens and the second lens of the image pickup lens.

100 Image pickup lens
1 First lens substrate
1a Aperture stop
11 First lens
12 Second lens
2 Second lens substrate
23 Third lens
24 Fourth lens
3 Third lens substrate
35 Fifth lens
36 Sixth lens
4 Image sensor
7 Optical member
8 Lens A
9 Lens B

BEST MODE FOR CARRYING OUT THE INVENTION

Preferred embodiments for a technology of an image pickup lens relating to the invention will be explained specifically as follows, referring to the drawings. Incidentally, the invention will be explained based on the illustrated embodiments, to which, however, the invention is not limited. Further, parts or sections which are the same or which correspond to each other between respective embodiments are given the same signs, and overlapping explanations will be omitted.

Embodiment 1

FIG. 1 is a diagram showing an image pickup lens relating to Embodiment 1.

Image pickup lens 100 is arranged in an image pickup apparatus. In the image pickup apparatus, there is arranged an image sensor of a CCD type or of a CMOS type. An image of an object image is formed on image sensor 4 by the image pickup lens 100. The image pickup apparatus is arranged in a mobile terminal such as a cell-phone and a PDA.

In the image pickup lens 100 relating to the present embodiment, first lens substrate 1 is arranged on the side of an object representing a photographic subject, and second lens substrate 2 is arranged on the image side that is behind the first lens substrate 1. The first lens substrate 1 and the second lens substrate 2 are arranged with the predetermined distance between them. The first lens substrate 1 and the second lens substrate 2 are formed into parallel flat plates. On the image side of the second lens substrate 2, there is arranged image sensor 4 of a CCD type or of a CMOS type which photoelectrically converts an image of the object.

There is formed first lens 11 on a surface of the first lens substrate 1 facing the object side, and is formed second lens 12 on a surface of the first lens substrate facing the image side. Further, there is formed third lens 23 on a surface of the second lens substrate 2 facing the object side, and is formed fourth lens 24 on a surface of the second lens substrate 2 facing the image side. As a lens section, there are arranged first lens 11, second lens 12, third lens 23 and fourth lens 24, in this order from the object side. Each of the first lens 11, the second lens 12, the third lens 23 and the fourth lens 24 employs a resin material as a lens material. By using a resin material for each lens, it is possible to lower the cost and to manufacture the lenses easily.

These lenses 11, 12, 23 and 24 are formed on lens substrates 1 and 2 through a photo curing method and a heat curing method, by using a mold. After that, a group of lenses integrated with lens substrates is automatically mounted on a circuit substrate by the following process: the lens group is combined with a wafer of a solid-state imaging device and is cut. On an outer edge of the cut, solder is arranged, where the outer edge is to come in contact with a circuit substrate. Then, the lens group is subjected to a reflow process which is operated at high temperatures such as 250° C. through 300° C., to be automatically mounted on the circuit substrate. A surface of each of the lenses 11, 12, 23 and 24 that is in contact with air, namely, a surface that is not in contact with the first lens substrate 1 or with the second lens substrate 2 is formed into an aspheric surface. By forming all surfaces which are in contact with air into aspheric surfaces, it is possible to realize an optical system having an aberration property that is more excellent. The aspheric surface is made by forming a dropped curable resin with an aspheric-surface mold into an aspheric shape, and by hardening it. The curable resin in this case includes heat curing resin and UV curing resin. When UV curing resin is employed as a resin material, it is possible to make a large number of lenses at one time when forming lenses on lens substrates 1 and 2 and then radiating UV rays on the lenses. Such the material is well matched with a replica method. In addition, since UV curing resin is excellent in heat resistance property, an image pickup lens 100 employing this resin can withstand a reflow process. Therefore, the process can be greatly simplified and it is suitable for mass production of inexpensive image pickup lenses 100.

Image pickup lens 100 relating to the present embodiment controls a change in refractive index caused by temperature changes by dispersing inorganic fine particles with a size of 30 nanometers or less into such the resin material. The size is more preferably 20 nanometers or less, and is further more preferably 15 nanometers or less, which does not cause a problem of stray light due to nano-particles.

In this case, the change in refractive index due to a temperature will be explained in detail. Refractive index change A due to a temperature is indicated by the following expression (23), by differentiating the refractive index n based on Lorentz-Lorentz equation with temperature t.

[Math. 24]

$$\frac{dn}{dt} = \frac{(n^2+2)(n^2-1)}{6n}\left\{(-3\alpha) + \frac{1}{[R]}\frac{\partial[R]}{\partial t}\right\} \quad (23)$$

In the aforesaid expression, α represents a linear expansion coefficient, and [R] represents molecular refraction.

In the case of plastic materials, contribution of the second term is smaller than that of the first term in the expression (23) in general, and the contribution can be ignored. For example, in the case of PMMA resins, the linear expansion coefficient α is $7\times10^{-5}$. When this is substituted in the aforesaid expression, the equation of $dn/dt=-1.2\times10^{-4}$ [/° C.] is set up, which mostly agree with an actual measurement.

With respect to this refractive index change, it has been found recently that a change of plastic materials due to a temperature can be made small by mixing inorganic fine particles in a plastic material. In the detailed explanation, when fine particles are mixed in a transparent plastic material, light generally scatters and transmittance is lowered. The material has been difficult to use as an optical material. However, it is possible to avoid light from scattering substantially, by making a size of the fine particles to be smaller than a wavelength of a transmitting light flux. The refractive index of a plastic material is lowered with the temperature rise, but the refractive index of inorganic particles is raised with the temperature rise. Therefore, it is possible to control the refractive index change to be mostly the same as an influence to the position of a paraxial image point due to changes of a lens surface form. Specifically, by dispersing inorganic particles with maximum size of 30 nanometers or less in a plastic material representing a base material, it is provided a plastic material with extremely low dependence of refractive index on the temperature. For example, by dispersing fine particles of niobium oxide ($Nb_2O_5$) in acrylic resin, it is possible to make the refractive index change caused by temperature change to be small. Further, there are known materials wherein a dependence of the refractive index on the temperature is low by using nanocompsite. When a difference in the linear expansion coefficient between a lens holding plate (for example, the first lens substrate 1) and a lens section (for example, first lens 11 and second lens 12) causes a reduction of a paraxial curvature radius of the lens section and it affects the position of the paraxial image point in a lens holding structure in the embodiment relating to the present invention, these technologies enable that a shift of the focus point is satisfactorily corrected by employing a resin material with the dependence of refractive index on the temperature in the amount by which the effect to the position of the paraxial image point can be canceled. For example, Unexamined Japanese Patent Application Publication No. 2007-126636 discloses an optical material that satisfies a condition of the following Expression (24).

[Math. 25]

$$1300 \times 10^{-7} \geq \alpha \geq 250 \times 10^{-7} \qquad (24)$$

By providing resin structure wherein a refractive index is hardly fluctuated based on a temperature change, employing the optical material satisfying the condition of Expression (24), it is possible to realize an image pickup lens having strong durability for temperatures.

Further, image sensor 4 is formed in a way where a plurality of semiconductor elements having photoelectric conversion functions are formed on one side of a disk-shaped wafer, and electrodes are arranged on the other side so that voltage for driving an image pickup apparatus and a supply of clocks may be received.

The image pickup apparatus can be obtained easily in the matter that lens substrates 1 and 2 on which lenses 11, 12, 23 and 24 are formed are arranged to face image sensor 4, lattice-shaped spacers are arranged between the first lens substrate 1 and the second lens substrate 2 and between the second lens substrate 2 and image sensor 4, and they are diced.

Further, between the first lens substrate 1 and the first lens substrate 1, there is arranged aperture stop 1a that shields visible light contributing to image forming. This aperture stop 1a is formed by a coating method such as a spreading method and a vacuum deposition. This aperture stop 1a can be formed easily by forming a film on the lens substrate. By forming aperture stop 1a between the first lens 11 and the first lens substrate 1, it is possible to realize an optical system that is more telecentric for the image sensor 4. Further, on a surface of the lens substrate representing either the first lens substrate 1 or the second lens substrate 2, there is formed a film of an infrared-ray blocking filter. By forming this film of an infrared-ray blocking filter on a surface of the lens substrate, it is possible to easily form a filter which blocks infrared ray.

The first lens 11 is convex and has positive refractive power. The second lens 12 is concave and has negative refractive power. The third lens 23 is convex and has negative refractive power. The fourth lens 24 is concave and has positive refractive power.

Lens materials for the first lens 11 and for the second lens 12 are selected so that both lenses may have different Abbe numbers from each other. Abbe number is a constant indicating optical dispersion of a lens material, and it shows an extent of refraction of beams with different wavelengths in different directions.

Materials of image pickup lens 100 are selected so that a difference between Abbe number v1 of the first lens 11 and Abbe number v2 of the second lens 12 (v1–v2) may exceed 10.

Figure 2A:
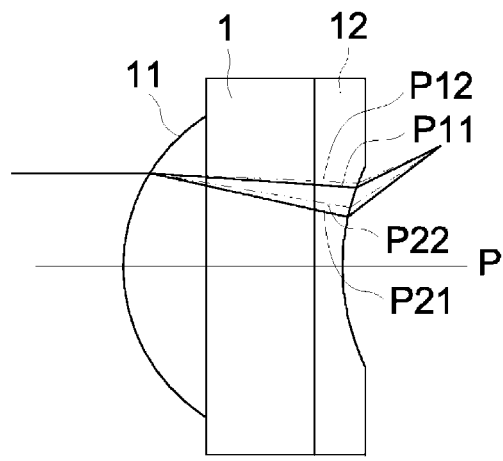
Figure 2B:
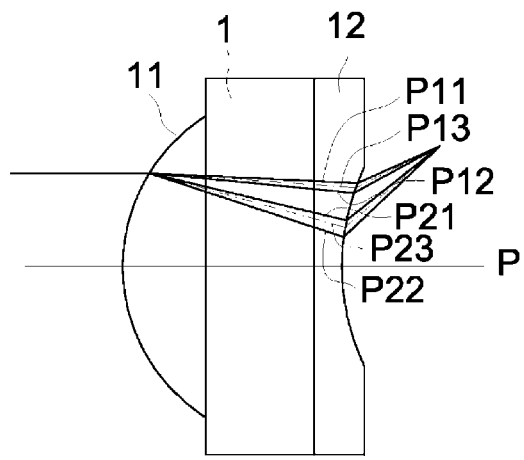

Each of FIGS. 2a and 2b is an enlarged diagram of the first lens 11 and the second lens 12 of the image pickup lens 100 whose materials are selected so that the difference (v1–v2) between Abbe number v1 of the first lens 11 and Abbe number v2 of the second lens 12 may exceed 10. Incidentally, each of FIGS. 2a and 2b is shown exaggeratedly.

As for beams shown in FIG. 2a, when beams having plural wavelengths enter the first lens 11 having positive refractive power, beam P21 whose wavelength is shorter than that of beam P11 having a longer wavelength is much refracted toward the optical axis P side. So, an optical path of the beam P21 having a shorter wavelength appears at the closer position to the optical axis P, and beam P11 having a longer wavelength appears to be outside the aforesaid optical path. Namely, if beams having plural wavelengths enter the first lens 11 having positive refractive power, the beams are separated toward the optical axis P.

When second lens 12 having negative refractive power and having a concave surface that faces the image side is arranged on the image side of the first lens 11, beam P21 having a shorter wavelength enters the second lens 12 to be closer to optical axis P side, and beam P11 having a longer wavelength enters to be outside of the beam P21, on the second lens. Then, the beam P21 having a shorter wavelength is refracted to the outside of the optical axis P more than the beam P11 having a longer wavelength. Namely, the beams are separated toward the optical axis P once when entering the first lens 11, then, they are collected rapidly toward the outside of the optical axis P when entering the image side surface of the second lens 12. Thereby, chromatic aberration caused when the beams enters the first lens 11 having positive refractive power can be corrected.

When a difference between Abbe number v1 of first lens 11 and Abbe number v2 of second lens 12 (dv=v1–v2) exceeds 10, an extent of the collection of beams in the second lens 12 with negative refractive power is greater than that of separation of beams in the first lens 11 with positive refractive power, thus, the separated beams are collected rapidly and chromatic aberration can be corrected through a shorter optical path.

Namely, it is preferable that the difference dv between the Abbe number v1 of the first lens 11 and the Abbe number v2 of the second lens 12 satisfies the following conditions.

When the difference dv in Abbe number between the first lens 11 with positive refractive power and the second lens 12 with negative refractive power exceeds 10, chromatic aberration can be corrected satisfactorily, but when the difference dv is 10 or less, it is difficult to correct chromatic aberration. Meanwhile, when the difference dv in Abbe number is 70 or more, it is difficult to combine lens materials suitable for a mobile terminal, on the points of cost and mass productivity.

When resin materials are used for the first lens 11 and the second lens 12, it is necessary, from characteristics of resin lens materials, that the difference dv in Abbe number is less than 40.

Further, the image pickup lens 100 corrects its chromatic aberration by providing the first lens 11 with positive refractive power on a surface of the first lens substrate 1 facing the object side and the second lens 12 with negative refractive power on a surface of the first lens substrate 1 facing the image side. In other words, it has the structure to cancel chromatic aberration caused by the first lens 11 with positive refractive power and chromatic aberration caused by the second lens 12 with negative refractive power each other. Since the first lens substrate 1 is a parallel flat plate, chromatic aberration caused by the first lens 11 can be controlled to be small, as will be stated later. Such the structure is most effective for correcting chromatic aberration, when resins whose dispersion is extremely great or is extremely small cannot be used for the lens system for the purpose of mass production because the materials are expensive.

Now, there will be explained a mechanism to control chromatic aberration caused by the first lens 11 to be small by the first lens substrate 1. With respect to the first lens substrate 1, it is preferable that refractive index n2 of the first lens substrate 1 is greater than refractive index n1 of the first lens 11. As is shown in FIG. 2a, beam P22 having a shorter wavelength is generally refracted more largely by the object side surface of the first lens 11 with positive refractive power, than beam P12 having a longer wavelength. In this case, with respect to beams entering the object side surface of the first lens substrate 1, an incident angle of the beam P22 having a shorter wavelength to enter the object side surface of the first lens substrate 1, is greater than that of beam P12 having a longer wavelength. Further, as for a refractive index ratio of the first lens 11 with positive refractive power to the first lens substrate 1, the refractive index ratio for beam P22 having a shorter wavelength is also greater than that for beam P12 having a longer wavelength. As is understood from Snell's low, a difference between an optical path of beam P22 having a shorter wavelength and an optical path of beam P12 having a longer wavelength is made to be small by the effects of both factors. In other words, chromatic aberration can be controlled to be small. In addition, the first lens substrate 1 has a prescribed thickness, and when beams having different wavelengths pass the thickness in the condition that the dispersion is controlled as described above, the dispersion is more controlled compared with an occasion where the first lens substrate 1 is not present.

Explaining in detail, beams are separated into the upper part and the lower part (P21, P11) by the first lens 11 with positive refractive power formed on the object side surface of the first lens substrate 1 as shown in FIG. 2a. When there is no action of a parallel flat plate (first lens substrate 1), the beam travels straight to the image side surface of the second lens 12 to be refracted on the image side surface of the second lens 12. On the other hand, when refractive index n2 of the parallel flat plate (first lens substrate 1) is greater than refractive index n1 of the first lens 11 with positive refractive power (P22, P12), dispersion of beams having different wavelengths is controlled by refraction on the object side surface of the parallel flat plate (first lens substrate 1), and the beams travel by an amount equivalent to a thickness of the parallel flat plate (first lens substrate 1), whereby, the dispersion is controlled to be smaller than an occasion where the parallel flat plate (first lens substrate 1) is not present.

More preferably, when refractive index n2 of the first lens substrate 1 is greater than refractive index n1 of the first lens 11, it is preferable that Abbe number v0 of the first lens substrate 1 is small (for example, v0≦60). In other words, it is preferable to be smaller than Abbe number v1 of the first lens 11. Abbe number is a number indicating dispersion obtained from refractive indexes for F line, C line and d line. A small Abbe number means a large difference in refractive indexes between, for example, F line and C line, and it can increase an effect that the aforesaid beam having a shorter wavelength is be refracted further more greatly.

Further, when refractive index n2 of the first lens substrate 1 is smaller than refractive index n1 of the first lens 11, it is preferable that Abbe number v0 of the first lens substrate 1 is great (for example, v0>50). When refractive index n2 of the first lens substrate 1 is smaller than refractive index n1 of the first lens 11, the parallel flat plate (first lens substrate 1) enlarges dispersion of beams having different wavelengths caused by the first lens 11 with positive refractive power as shown in FIG. 2b, which is not preferable. However, it is possible to control chromatic aberration to be small by making Abbe number v0 of the parallel flat plate (first lens substrate 1) to be great, namely, by selecting materials which make a difference in refractive indexes between F line and C line to be small. Such the structure represents a method that is effective in a wafer scale lens.

Explaining in detail, beams are separated into the upper part and the lower part (P21, P11) by the object side surface of the first lens 11 with positive refractive power formed on the object side surface of the first lens substrate 1 as shown in FIG. 2b. When there is no action of a parallel flat plate (first lens substrate 1), the beams travel straight to the surface of the second lens 12 to be refracted on the image side surface of the second lens 12. On the other hand, when refractive index n2 of the parallel flat plate (first lens substrate 1) is smaller than refractive index n1 of the first lens 11 with positive refractive power (P22, P12), dispersion of the beams having a different wavelength is enlarged by their refraction on the object side surface of the parallel flat plate (first lens substrate 1). However, when refractive index n2 of the parallel flat plate (first lens substrate 1) is smaller than refractive index n1 of the first lens 11 with positive refractive power, and when Abbe number v0 of the parallel flat plate (first lens substrate 1) is great (P23, P13), dispersion is controlled to be smaller by the large Abbe number v0 than an occasion where Abbe number v0 is small.

Further, since the first lens substrate 1 is a parallel flat plate, the substrate is easily processed, and power is not present on a boundary face between the first lens 11 and the second lens 12, thereby, an influence on a focal position on the image plane caused by its surface accuracy is small. In addition, this structure matches with a wafer scale lens. Owing to the aforesaid structure, cost becomes low, and deterioration of MTF caused by chromatic aberration can be controlled to be small.

In the image pickup lens 100 wherein there are provided first lens 11 with positive refractive power and second lens 12 with negative refractive power, and the difference dv between Abbe number v1 of the first lens 11 and Abbe number v2 of the second lens 12 exceeds 10, it is preferable that a ratio of a focal length of the first lens 11 to a focal length of the total lens system is made to be from 0.6 to 1.0.

When a ratio $f_R$ of the focal length of the first lens 11 to the focal length of the total lens system is 0.6 or higher, distortion is corrected satisfactorily. When the ratio is less than 0.6, correction of spherical aberration and astigmatism becomes difficult. If the ratio of the focal length of the first lens 11 to the focal length of the total lens system is 1.0 or lower, it is possible to construct the total optical system to be short. If the ratio is more than 1.0, the total optical system becomes long in size. In each lens in the invention, a lens formed on the object side surface of the lens substrate provides a focal length in case that the object side of the lens is filled with air and the image side of the lens is filled with the medium of the lens substrate. Meanwhile, a lens formed on the image side surface of the lens substrate provides a focal length in case that the object side of the lens is filled with a medium of the lens substrate, and the image side of the lens is filled with the air. As for a lens which are not cemented with another, the focal length on the object side surface represents a focal length in the case that the object side of the lens surface is filled with air and the image side of the lens surface is filled with a medium of the lens, and the focal length on the image side surface represents a focal length in the case that the object side of the lens surface is filled with the medium of the lens and the image side of the lens surface is filled with the air, so as to correspond to the above.

In the image pickup lens 100, the second lens substrate 2 is arranged at the image side of the first lens 12, and a lens or lenses with at least positive or negative refractive power is arranged on one side or both sides of the second lens substrate 2. Thereby, Petzval's sum can be controlled, and astigmatism can be corrected satisfactorily. Further, when an additional lens substrate is provided at the image side of fourth lens 24, it is possible to control the Petzval's sum to be smaller and to correct the astigmatism more satisfactorily, by forming at least a lens with positive or negative refractive power on one side or on both sides of the lens substrate.

The Petzval's sum represents an expression indicating relationship between a planar object and a curvature of field for the planar object. It is necessary to optimize combination of focal lengths and refractive powers of lens materials of respective lenses, to control the curvature of field. It is preferable that the Petzval's sum of the image pickup lens 100 is made be 0.14 or less. By making the Petzval's sum to be 0.14 or less, astigmatism can be corrected satisfactorily even in an optical system with a short total optical length. If the Petzval's sum exceeds 0.14, it is difficult to correct astigmatism.

It is preferable that value Sv obtained by normalizing an amount of an aspheric sag of the lens surface closest to the image side in the image pickup lens 100, by the maximum image height, namely, value Sv obtained by normalizing an amount of an aspheric sag of the image side surface of fourth lens 24 in the present embodiment by the maximum image height, is made to be 0.14 or more. In this case, an amount of an aspheric sag means a value measured at a height of a principal ray at the maximum image height and measured at a height in the direction perpendicular to an optical axis. The maximum image height means a half length of the diagonal line of a solid-state imaging device in a rectangular shape.

By making this value Sv to be 0.14, it is possible to secure an excellent aberration property in an optical system with the short total optical length, and to keep an angle of incidence for an image sensor such as CCD to be small, in an area where an image height is great. If the value Sv is 0.14 or less, it is difficult to correct distortion, and an angle of incidence for an image sensor such as CCD becomes large in an area where an image height is great, and shading is caused.

Further, when $m^{th}$ lens represents a lens at the $m^{th}$ position (where, $m \geq 3$) which is the third lens or a lens arranged at the image side of the third lens in the image pickup lens 100, it is preferable that the $m^{th}$ lens has negative power, and that a ratio of focal length $f_1$ of the first lens to focal length $f_m$ of the $m^{th}$ lens is made to be from −0.7 to 0.

As for axial chromatic aberration, it is given by the following expression (27), and chromatic aberration can be corrected by arranging the $m^{th}$ lens with negative power wherein a ratio of focal length $f_1$ of the first lens to focal length $f_m$ of the $m^{th}$ lens satisfies the range which is not less than −0.7 and not more than 0. If the ratio is less than −0.7, it is difficult to correct chromatic aberration, and if the ratio is more than 0, it hardly corrects chromatic aberration.

[Math. 26]

$$\sum_i \left(\frac{h_i}{h_1}\right)^2 \frac{1}{v_i f_i} \tag{27}$$

Further, it is preferable that Abbe number $v_m$ of $i^{th}$ lens is made to be from 20 to 50. If it exceeds 50, it is difficult to correct chromatic aberration, and if it is less than 20, excessive correction of chromatic aberration is caused, depending on power of the lens with negative power, resulting in difficult correction of chromatic aberration.

The image pickup lens 100 exhibits the total length which is 1.2 times or less as long as the focal length, and an excellent aberration correction function even when the total optical length is still shorter, by following the conditions: the difference in Abbe number dv, relationship between the refractive index n1 of the first lens 11 and the refractive index n2 of first lens substrate 1, value $f_R$ obtained by normalizing the focal length $f_{S1}$ of the object side lens surface of first lens 11 by the focal length f of the total lens system, Petzval's sum pn, aspheric sag amount Sv on the surface closest to the image side, and a ratio of the focal length $f_1$ of the first lens to the focal length $f_m$ of the $m^{th}$ lens.

Further, when the image side surface of the lens closest to the image side has negative refractive power, it is possible to arrange the position of a rear principal point closer to the object side. In image pickup lenses having the same focal lengths, an image pickup lens in which the image side principal point is positioned at a position closer to the object side, becomes more compact, which is preferable.

Embodiment 2

Figure 16:
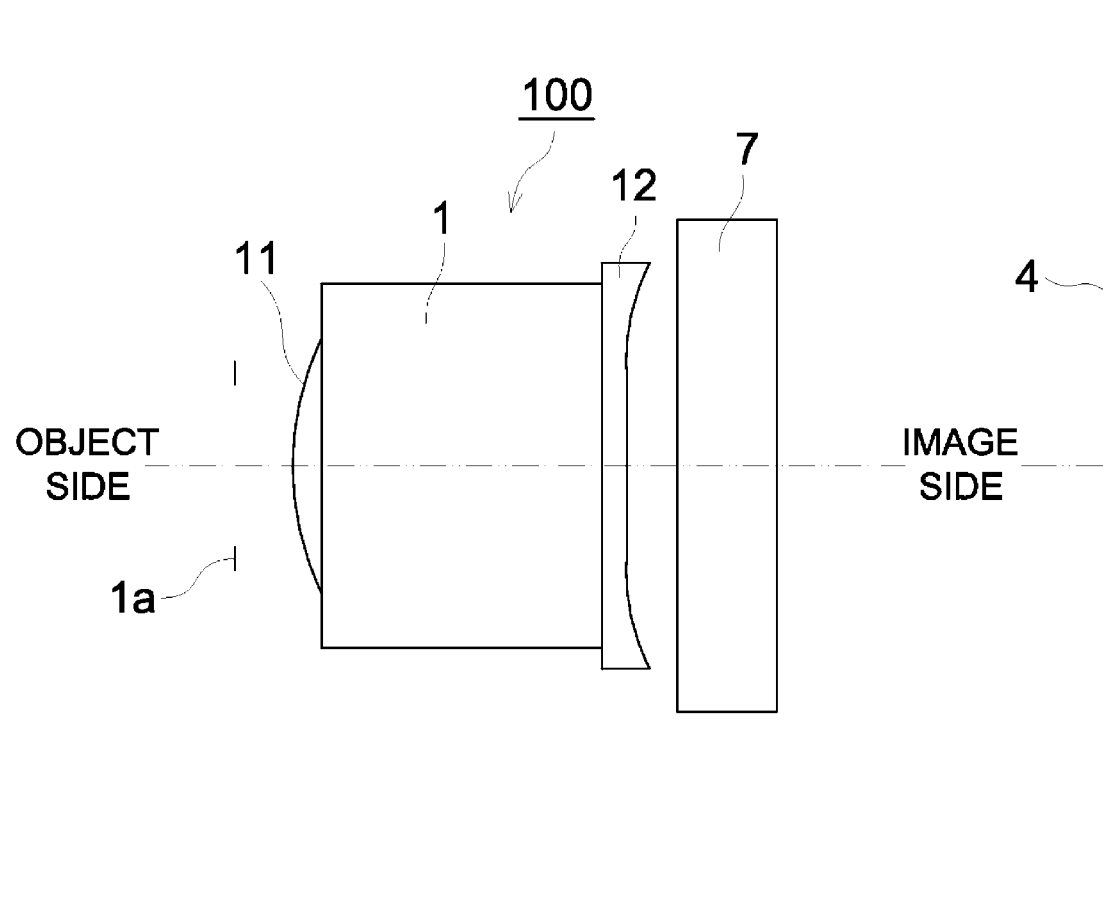
FIG. 16 is a diagram showing the structure of an image pickup lens relating to Embodiment 2 and Eighth Example.

FIG. 16 is a diagram showing an image pickup lens relating to Embodiment 2.

In image pickup lens 100 relating to Embodiment 2, there are arranged an aperture stop 1a on the object side, first lens substrate 1 on the image side and the rear of the aperture stop, and optical member 7 in a form of a parallel flat plate on the image side and the rear of the first lens substrate. On the first lens substrate 1, first lens 11 and second lens 12 which are the same as those in Embodiment 1 are formed. In image pickup lens 100 of such the structure, optical member 7 arranged at the closest position to the image side causes negative distortion to reduce positive distortion caused by the negative power of the second lens 12. Further, when curvature of field is caused, it keeps a sagittal image plane and a meridional image plane in a balanced manner. The wording saying that "when curvature of field is caused" in this case means a situation wherein both of the sagittal image plane and the meridional image plane are inclined toward the negative direction.

The effect of the kept image planes in a balanced manner by optical member 7 will be explained as follows. It is known that the optical member 7 generates astigmatism based on the following expression (13).

[Math. 27]

$$\frac{D_g}{2n}\left(1 - \frac{con^2 U}{con^2 U'}\right)\frac{conU}{conU'} \tag{13}$$

In the aforesaid expression, U represents an incident angle of a beam that enters optical member 7, U' represents an outgoing angle of a beam that emerges from the optical member 7, Dg represents a thickness of the optical member 7, and n represents a refractive index of the optical member 7.

Owing to the foregoing, it is also known that the sagittal image plane and the meridional image plane are changed at a ratio of about 1:3. In other words, though there is generated a difference between the sagittal image plane and the meridional image plane, the sagittal image plane can be improved, and the meridional image plane can be kept to be in a permissible level that it can be regarded as an excellent image plane, because the meridional image plane is covering the paraxial image plane.

In this case, it is preferable that the ratio of the thickness of the optical member 7 to the focal length of the total lens system is made to be 0.1 or more. The reason for this is that positive distortion generated by negative power of second lens 12 is canceled with negative distortion generated by optical member 7. In addition, if a thickness of the optical member 7 is greater, an amount of negative distortions generated by the optical member 7 is larger, and the cancelled amount becomes larger.

If ratio $D_R$ of a thickness of the optical member 7 to a focal length of the total lens system is 0.1 or less, a thickness of the optical member 7 is thin, which is unsuitable for manufacturing. In addition, correction of distortion becomes too small to be ineffective.

With respect to the optical member 7, it is preferable that a ratio of a difference in optical path length between a principal ray at the maximum image height and an axial ray to a focal length of the total lens system is made to be less than 0.13. It provides the optical member a function to reduce the difference in optical path length between the axial ray and the principal ray of the maximum image height to be small. In other words, a distance to arrive at the image plane becomes short under Snell laws, which means that distortion can be made small by refraction. If ratio $_R$ of the difference in optical path length between the axial ray and the principal ray of the maximum image height to the focal length of the total lens system is 0.13 or more, a function to correct the distortion becomes small, or the distortion generated by image pickup lens 100 in the present embodiment becomes still greater.

It is possible for image pickup lens 100 to have excellent property to correct aberrations by following various conditions such as the ratio $D_R$ of the thickness of optical member 7 to the focal length of the total lens system, and the ratio $1_R$ of the difference in optical path length between the principal ray at the maximum image height and the axial ray to the focal length of the total lens system.

VARIATION EXAMPLE

Figure 22:
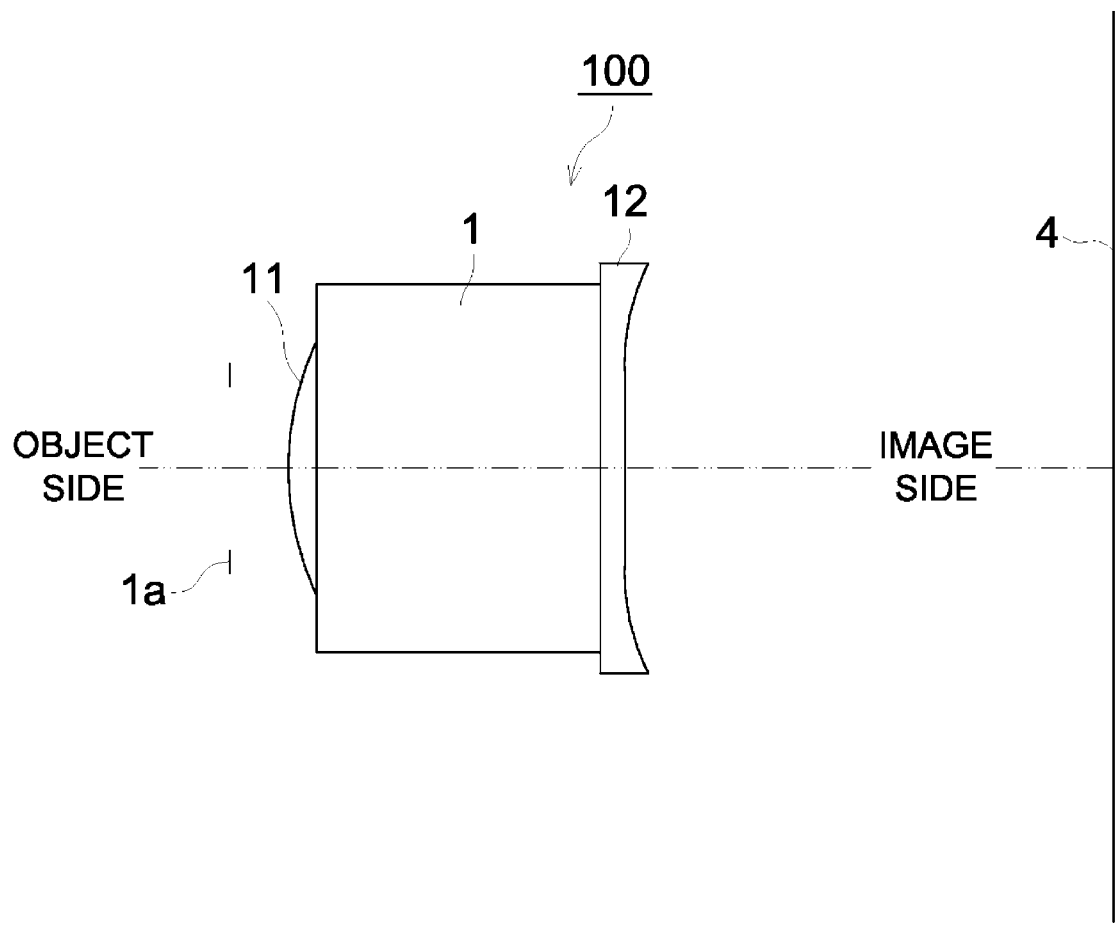
FIG. 22 is a diagram showing the structure of an image pickup lens relating to Eleventh Example based on variation examples of Embodiment 1 and Embodiment 2.

FIG. 22 is a diagram showing an image pickup lens relating to a variation example of Embodiment 1 and Embodiment 2.

In image pickup lens 100 relating to the variation example, there are arranged aperture stop 1a on the object side and first lens substrate 1 on the image side and the rear of the aperture stop. On the first lens substrate 1, first lens 11 and second lens 12 which are the same as those in Embodiment 1 and Embodiment 2 are formed. There are not arranged the second lens substrate 2 shown in Embodiment 1 and optical member 7 shown in Embodiment 2. Further, the image side surface of the second lens 12 is formed into an aspheric surface.

The image pickup lens 100 having such the structure can controls axial chromatic aberration and magnification chromatic aberration to be low in spite of its simple structure, by satisfying a condition of the expression (1) or expression (2) of the difference dv between Abbe number v1 of the first lens 11 and Abbe number v2 of the second lens 12, which is the same as occasions of Embodiment 1 and Embodiment 2. Further, by forming the image side surface of the second lens 12 into an aspheric shape, distortion and a curvature of field can be controlled.

EXAMPLE

Data and measurement results of aberrations of respective examples and variation examples of image pickup lens 100 relating to Embodiment 1 and Embodiment 2 will be shown below. The examples use the following signs.
R: Curvature radius of lens (mm)
D: Axial distance of lens surfaces (mm)
Nd: Refractive index of lens
v: Abbe number of lens In each example, a form of an aspheric surface is represented by the following expression (14) which is an expression of a displacement amount X of the aspheric surface, where a tip of the surface is the origin, the X axis extends in a direction of the optical axis, and h is a height along a perpendicular direction to the optical axis.

[Math. 28]

$$X = \frac{h^2/R}{1 + \sqrt{1-(1+K)h^2/R^2}} + \sum A_i h^i \quad (14)$$

In the aforesaid expression, $A_i$ represents an aspheric surface coefficient of $i^{th}$ order (where i=4, 6, 8 . . . ), and K represents a conic constant.

Aberrations were measured and the difference dv between Abbe number v1 of the first lens 11 and Abbe number v2 of the second lens 12 was evaluated, based on a form of the aspheric surface and on data of working examples. Namely, the following expression (15) was evaluated for each example.

[Math. 29]

$$dv = v1 - v2 \quad (15)$$

Further, in each example, the ratio $f_R$ was evaluated, where the value of $f_R$ is a ratio of the focal length of the first lens 11 to the focal length of the total lens system in image pickup lens 100 wherein Abbe number of the first lens 11 is different from that of the second lens 12. Namely, the following expression (16) was evaluated for each example.

[Math. 30]

$$f_R = \frac{f_{S1}}{f} \quad (16)$$

In the aforesaid expression, $f_{S1}$ represents a focal length of the object side surface on of the first lens 11, and f represents a focal length of the total lens system.

Further, in each example, Petzval's sum pn in image pickup lens 100 wherein Abbe number of the first lens 11 is different from that of the second lens 12, was evaluated. Namely, the following expression (17) was evaluated for each example.

[Math. 31]

$$pn = \sum_j \frac{1}{f_j n_j} \quad (17)$$

In the aforesaid expression, $f_j$ represents a focal length of $j^{th}$ lens, and $n_j$ represents a refractive index of the $j^{th}$ lens.

Further, in Examples 1 through 7 and Example 16, value Sv was evaluated, where the value Sv is calculated by normalizing an amount of an aspheric sag of the lens surface arranged at the closest position to the image side of image pickup lens 100 wherein Abbe number of the first lens 11 is different from that of the second lens 12, by the maximum image height. Namely, the following expression (18) was evaluated for Examples 1 through 7 and Example 16.

[Math. 32]

$$Sv = \frac{|X - X_0|}{Y} \quad (18)$$

In the aforesaid expression, X represents a displacement amount of an aspheric surface given by the following expression (19), and it is a value at a height in the direction perpendicular to the optical axis of a principal ray at the maximum image height.

$X_0$ represents a displacement amount of a component of quadratic surface of revolution of the aspheric surface given by the following expression (20), and it is a value at the height in the direction perpendicular to the optical axis of a principal ray at the maximum image height.

Y represents the maximum image height.

[Math. 33]

$$X = \frac{h^2/R}{1 + \sqrt{1-(1+K)h^2/R^2}} + \sum A_i h^i \quad (19)$$

[Math. 34]

$$X_0 = \frac{h^2/R}{1 + \sqrt{1-(1+K)h^2/R^2}} \quad (20)$$

In the aforesaid expression, A, represents $i^{th}$ order aspheric surface coefficient of the lens surface closest to the image side, R represents a curvature radius of the lens surface closest to the image side, and K represents a conic constant of the lens surface closest to the image side.

Further, in Examples 1 through 7 and Example 16, a ratio of the focal length $f_1$ of the first lens to the focal length $f_m$ of the $m^{th}$ lens was evaluated. Namely, the following expression (25) was evaluated for Examples 1 through 7 and Example 16.

[Math. 35]

$$-0.7 \le \frac{f_1}{f_m} < 0 \quad (25)$$

Further, in Examples 8 through 10, Example 14 and Example 15, the value of $D_R$ was evaluated, where the value $D_R$ is a ratio of a thickness of parallel flat plate 7 to the focal length of the total lens system in image pickup lens 100 wherein Abbe number of the first lens 11 is different from that of the second lens 12. Namely, the following expression (21) was evaluated in Examples 8 through 10, Example 14 and Example 15.

[Math. 36]

$$D_R = \frac{D_g}{f} \quad (21)$$

Further, in Examples 8 through 11, Example 14 and Example 15, the value of $1_R$ was evaluated, where the value $1_R$ is a ratio of a difference between an optical path length of a axial ray and an optical path length of a principal ray at the maximum image height to the focal length of the total lens system in image pickup lens 100 wherein Abbe number of the first lens 11 is different from that of the second lens 12. Namely, the following expression (22) was evaluated in Examples 8 through 11, Example 14 and Example 15.

[Math. 37]

$$l_R = \frac{l_2 - l_1}{f} \quad (22)$$

First Example

Figure 3:
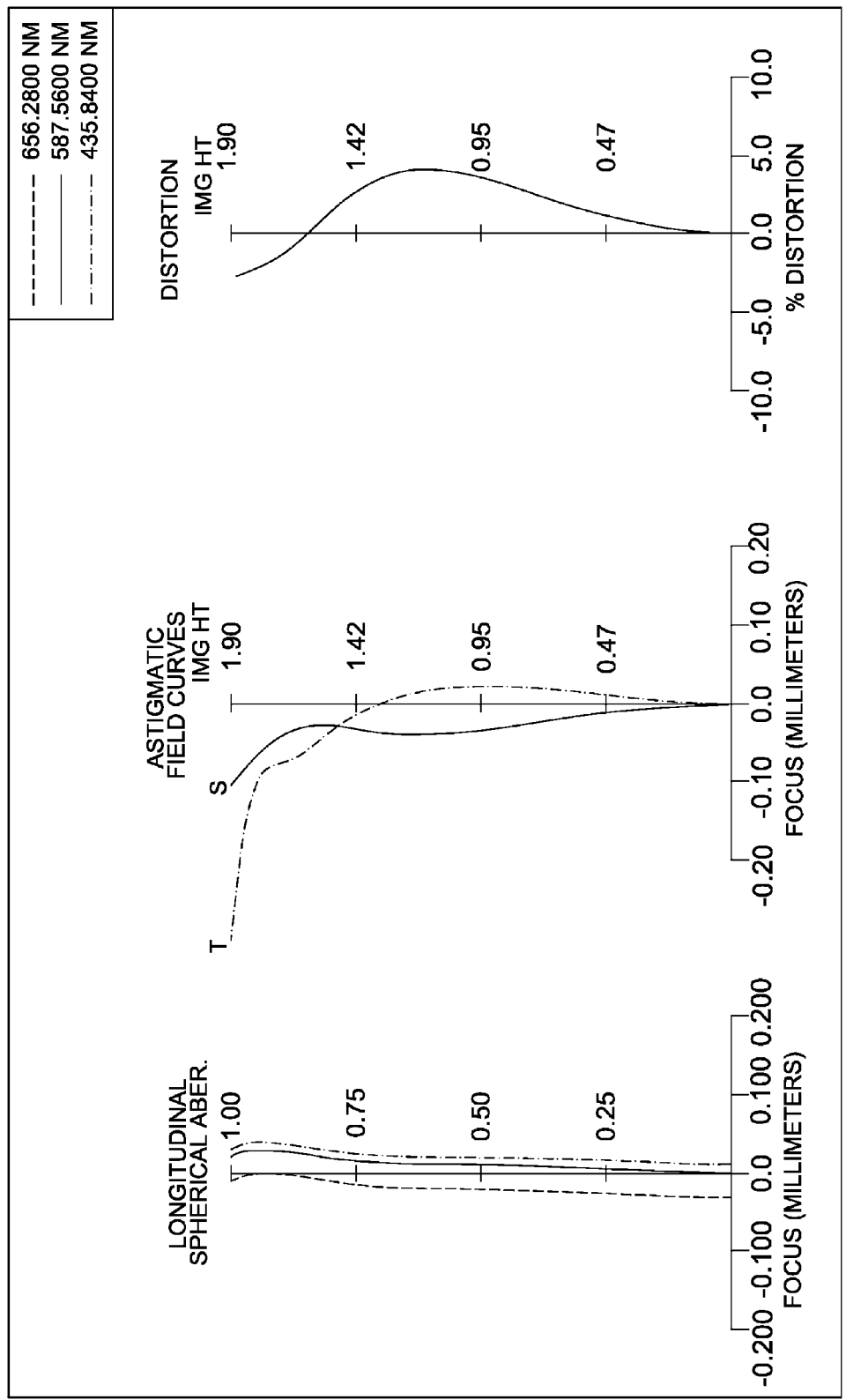
FIG. 3 is an aberration diagram of an image pickup lens relating to First Example.

Data of relating to the First Example of image pickup lens 100 based on Embodiment 1 are shown in Table 1 and Table 2. An illustration of the image pickup lens 100 relating to the first example will be omitted because it is the same as the image pickup lens 100 relating to Embodiment 1 in terms of structure. Further, an aberration diagram of the image pickup lens 100 providing the data is shown in FIG. 3.

With respect to the image pickup lens 100 relating to the first example, Abbe number v1 of the first lens 11 is 54.00, and Abbe number v2 of the second lens 12 is 29.00, as shown in Tables.

In Table 1, Surface No. 1 represents the object side surface of the first lens 11, Surface No. 2 represents the image side surface of the first lens 11, Surface No. 3 represents the object side surface of the second lens 12, Surface No. 4 represents the image side surface of the second lens 12, Surface No. 5 represents the object side surface of the third lens 23, Surface No. 6 represents the image side surface of the third lens 23, Surface No. 7 represents the object side surface of the fourth lens 24, and Surface No. 8 represents the image side surface of the fourth lens 24. Further, mark * in the tables shows an aspheric surface. Sign (ape) in the tables shows that aperture stop 1*a* is formed on the lens surface indicated by that surface number.

Second Example

Figure 4:
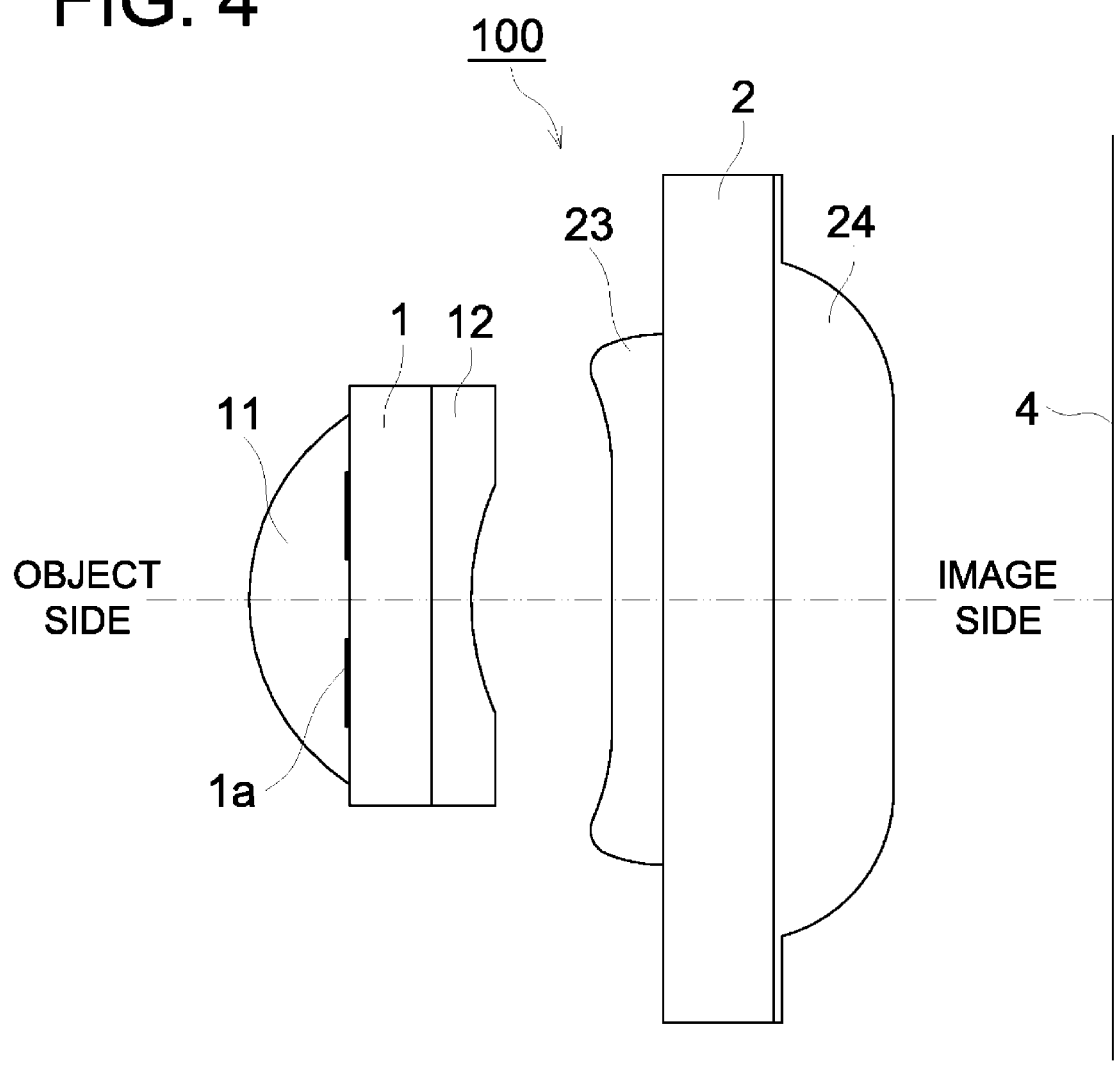
FIG. 4 is a diagram showing the structure of an image pickup lens relating to Second Example based on Embodiment 1.

FIG. 4 is a schematic diagram relating to the second example of image pickup lens 100 based on Embodiment 1.

Figure 5:
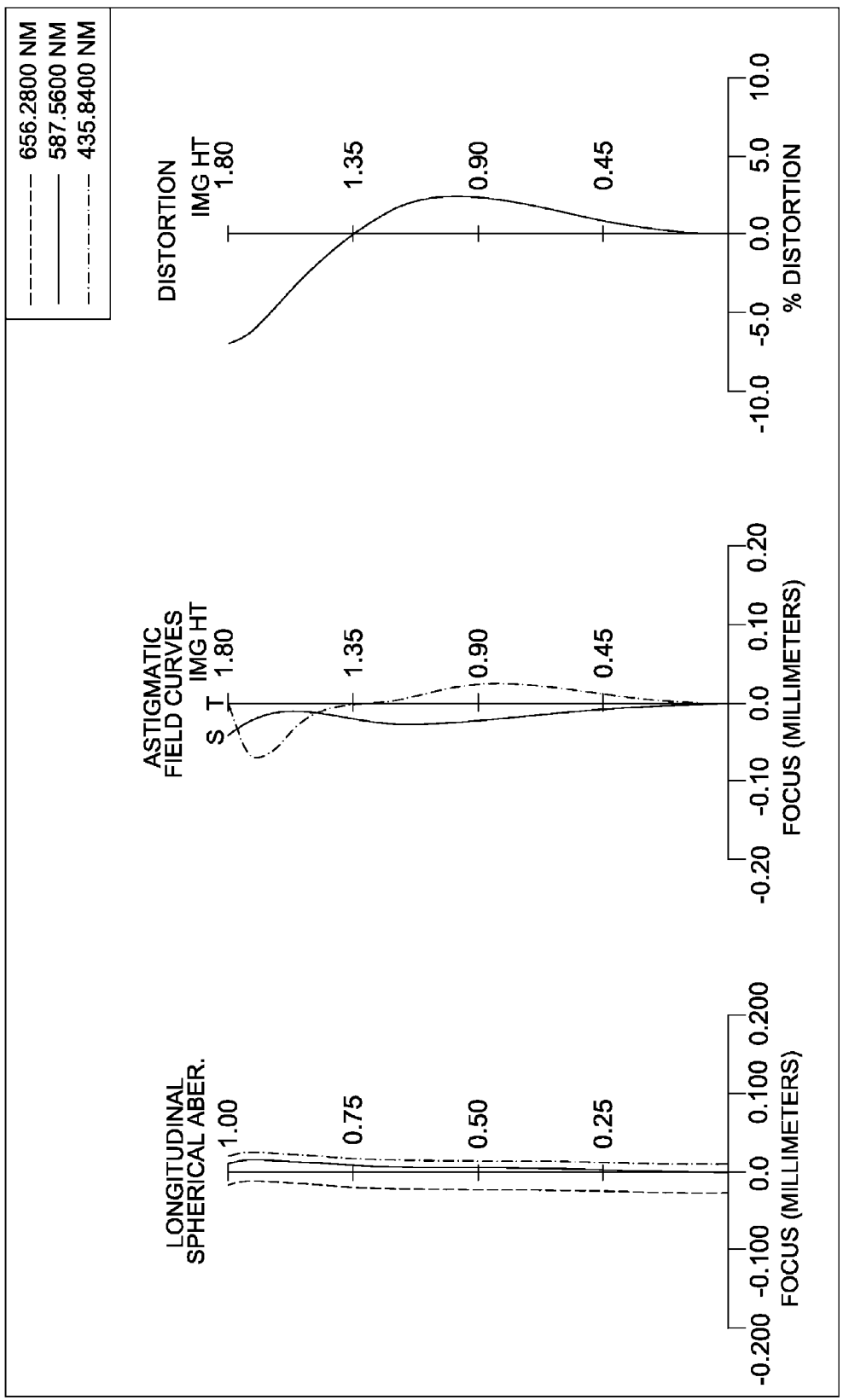
FIG. 5 is an aberration diagram of an image pickup lens relating to Second Example.

An arrangement of lens substrates and lenses is the same as that shown in Embodiment 1. Table 3 and Table 4 show data of a working example of image pickup lens 100 including this optical system. FIG. 5 shows an aberration diagram of the image pickup lens including this optical system and providing data of the working example.

With respect to the image pickup lens 100 relating to the second example, Abbe number v1 of the first lens 11 is 55.72, and Abbe number v2 of the second lens 12 is 30.23, as shown in Tables.

TABLE 1

| Surface No. | R | D | Nd | v |
|---|---|---|---|---|
| 1* | 0.911 | 0.290 | 1.50710 | 54.00 |
| 2 (ape) | ∞ | 0.390 | 1.48749 | 70.44 |
| 3 | ∞ | 0.110 | 1.57370 | 29.00 |
| 4* | 1.564 | 0.684 | | |
| 5* | 3.611 | 0.115 | 1.50710 | 54.00 |
| 6 | ∞ | 0.304 | 1.48749 | 70.44 |
| 7 | ∞ | 0.355 | 1.50710 | 54.00 |
| 8* | 5.353 | 0.928 | | |
| 9 | ∞ | | | |
| BF | Fno | HFOV | TL | |
| 0.928 | 2.8 | 30.63 | 3.177 | |

TABLE 3

| Surface No. | R | D | Nd | v |
|---|---|---|---|---|
| 1* | 0.893 | 0.361 | 1.53048 | 55.72 |
| 2(ape) | ∞ | 0.302 | 1.49974 | 62.16 |
| 3 | ∞ | 0.159 | 1.58340 | 30.23 |
| 4* | 1.459 | 0.508 | | |
| 5* | 9.342 | 0.187 | 1.53048 | 55.72 |
| 6 | ∞ | 0.411 | 1.49974 | 62.16 |
| 7 | ∞ | 0.441 | 1.53048 | 55.72 |
| 8* | 17.669 | 0.809 | | |
| 9 | ∞ | | | |
| BF | Fno | HFOV | TL | |
| 0.8086 | 2.8 | 30.96 | 3.177 | |

TABLE 2

Aspheric surface coefficient

| ** | K | A | B | C | D | E | F | G | H | I |
|---|---|---|---|---|---|---|---|---|---|---|
| 1 | 6.08E−03 | −4.68E−03 | 9.08E−02 | −9.80E−02 | −5.25E−01 | −6.08E−01 | 5.71E+00 | 0.00E+00 | 0.00E+00 | 0.00E+00 |
| 4 | 5.15E+00 | 7.41E−02 | 1.47E−01 | 7.91E−02 | 1.48E−01 | −1.24E+00 | −1.42E+00 | 0.00E+00 | 0.00E+00 | 0.00E+00 |
| 5 | −4.71E+01 | −7.85E−02 | −4.45E−02 | −2.47E−02 | −3.66E−06 | 1.20E−02 | 1.39E−02 | 0.00E+00 | 0.00E+00 | 0.00E+00 |
| 8 | 4.12E−01 | −6.53E−02 | −2.39E−02 | −8.17E−03 | 2.68E−03 | −1.28E−03 | −5.39E−04 | 0.00E+00 | 0.00E+00 | 0.00E+00 |

**Surface No.

TABLE 4

Aspheric surface coefficient

| ** | K | A | B | C | D | E | F | G | H | I |
|---|---|---|---|---|---|---|---|---|---|---|
| 1 | −1.09E−02 | −5.00E−03 | 9.04E−02 | −1.75E−01 | −3.06E−01 | −1.32E−01 | 5.97E+00 | −7.17E+00 | 5.00E+00 | −6.89E−03 |
| 4 | 4.09E+00 | 1.01E−01 | 2.25E−01 | 1.25E−03 | 3.27E+00 | −3.52E+00 | 2.75E−01 | −8.80E−01 | −4.84E+01 | −2.70E+01 |
| 5 | −3.70E+02 | −1.60E−01 | −1.94E−02 | −2.97E−02 | −6.92E−02 | −9.81E−02 | 3.33E−02 | 3.63E−01 | 0.00E+00 | 0.00E+00 |
| 8 | 9.93E+01 | −5.49E−02 | −4.07E−02 | −8.86E−03 | 1.03E−03 | 1.44E−03 | −9.40E−05 | −1.15E−03 | 0.00E+00 | 0.00E+00 |

**Surface No.

Third Example

Figure 6:
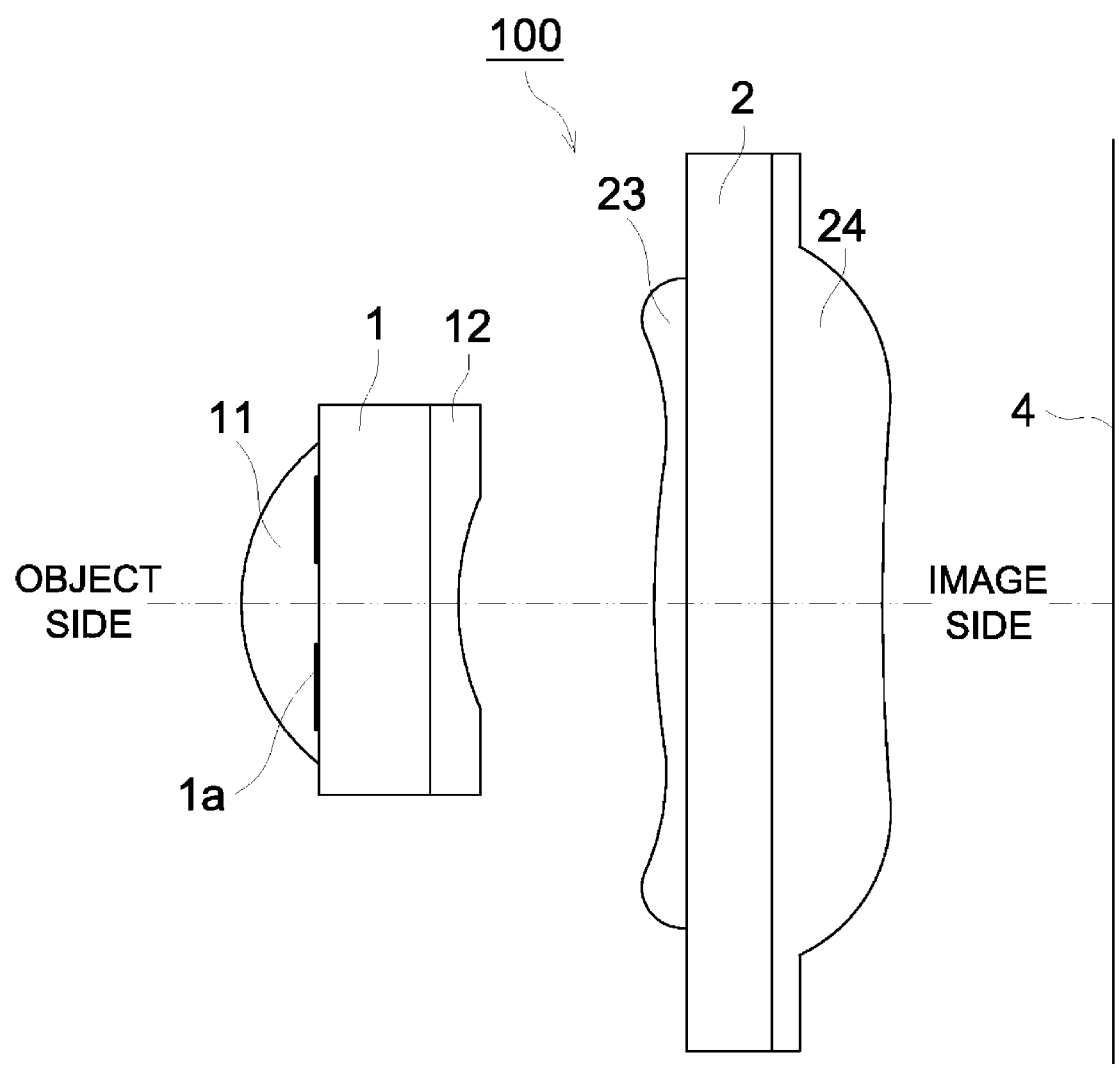
FIG. 6 is a diagram showing the structure of an image pickup lens relating to Third Example based on Embodiment 1.

FIG. 6 is a schematic diagram relating to the third example of image pickup lens 100 based on Embodiment 1.

Figure 7:
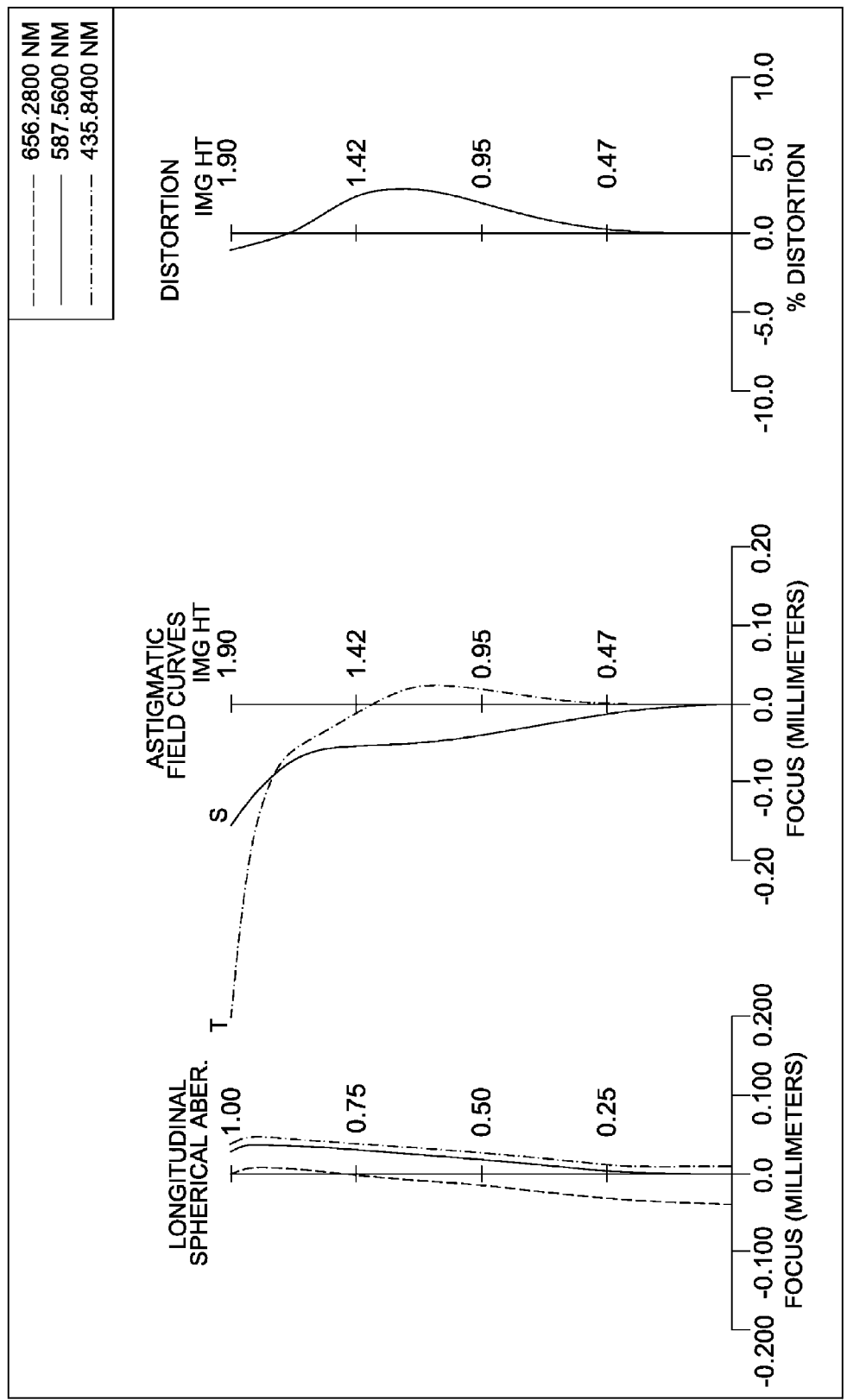
FIG. 7 is an aberration diagram of an image pickup lens relating to Third Example.

An arrangement of lens substrates and lenses is the same as that shown in Embodiment 1. Table 5 and Table 6 show data of a working example of image pickup lens 100 including this optical system. FIG. 7 shows an aberration diagram of an image pickup lens including this optical system and providing data of the working example.

With respect to the image pickup lens 100 relating to the third example, Abbe number v1 of the first lens 11 is 54.00, and Abbe number v2 of the second lens 12 is 29.00, as shown in Tables.

Fourth Example

Figure 8:
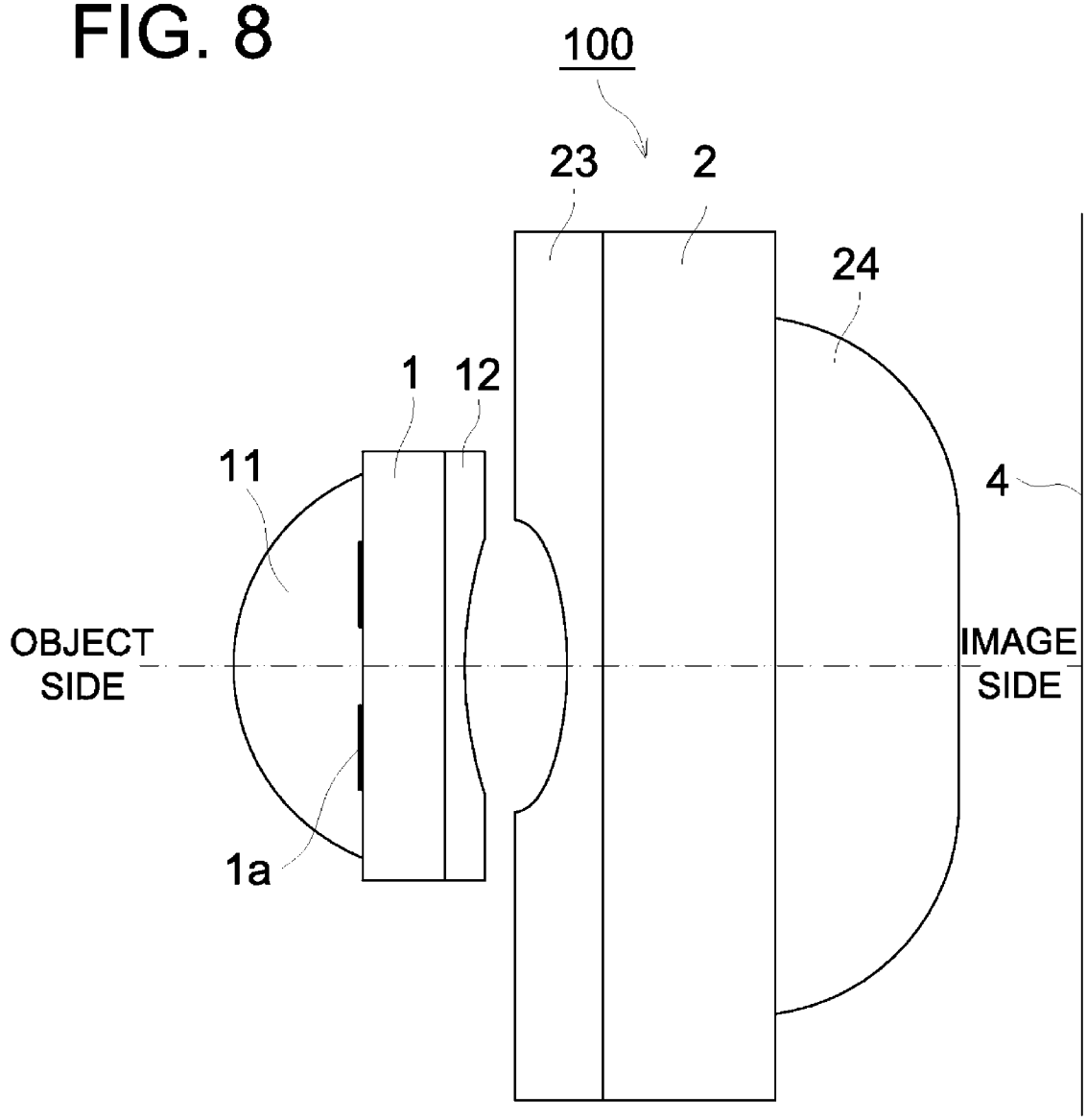
FIG. 8 is a diagram showing the structure of an image pickup lens relating to Fourth Example based on Embodiment 1.

FIG. 8 is a schematic diagram relating to the fourth example of image pickup lens 100 based on Embodiment 1.

Figure 9:
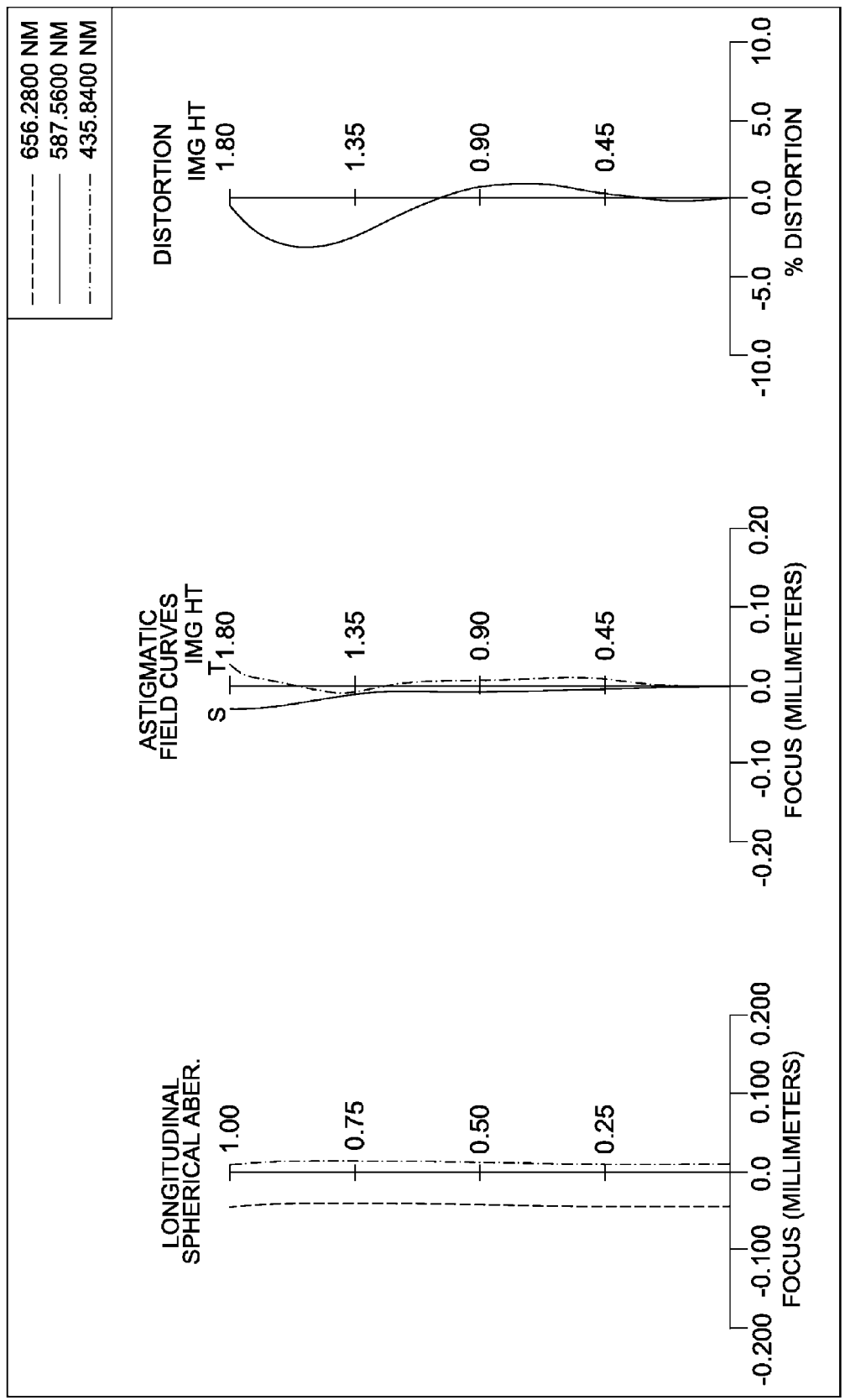
FIG. 9 is an aberration diagram of an image pickup lens relating to Fourth Example.

An arrangement of lens substrates and lenses is the same as that shown in Embodiment 1. Table 7 and Table 8 show data of a working example of image pickup lens 100 including this optical system. FIG. 9 shows an aberration diagram of an image pickup lens including this optical system and providing data of the working example.

With respect to the image pickup lens 100 relating to the fourth example, Abbe number v1 of the first lens 11 is 54.00, and Abbe number v2 of the second lens 12 is 29.00, as shown in Tables.

TABLE 5

| Surface No. | R | D | Nd | v |
|---|---|---|---|---|
| 1* | 0.938 | 0.310 | 1.50710 | 54.00 |
| 2(ape) | ∞ | 0.379 | 1.48752 | 70.42 |
| 3 | ∞ | 0.100 | 1.57370 | 29.00 |
| 4* | 1.740 | 0.734 | | |
| 5* | 3.356 | 0.124 | 1.50710 | 54.00 |
| 6 | ∞ | 0.303 | 1.48752 | 70.42 |
| 7 | ∞ | 0.416 | 1.50710 | 54.00 |
| 8* | 4.230 | 0.810 | | |
| 9 | ∞ | | | |

| BF | Fno | HFOV | TL |
|---|---|---|---|
| 0.8105 | 2.8 | 31.15 | 3.177 |

TABLE 7

| Surface No. | R | D | Nd | v |
|---|---|---|---|---|
| 1* | 0.808 | 0.489 | 1.50710 | 54.00 |
| 2(ape) | ∞ | 0.300 | 1.64924 | 29.92 |
| 3 | ∞ | 0.080 | 1.57370 | 29.00 |
| 4* | 2.301 | 0.373 | | |
| 5* | −1.948 | 0.100 | 1.50710 | 54.00 |
| 6 | ∞ | 0.695 | 1.64924 | 29.92 |
| 7 | ∞ | 0.680 | 1.50710 | 54.00 |
| 8* | 18.783 | 0.463 | | |
| 9 | ∞ | | | |

| BF | Fno | HFOV | TL |
|---|---|---|---|
| 0.4625 | 2.8 | 30.56 | 3.179 |

TABLE 6

Aspheric surface coefficient

| Surface No. | K | A | B | C | D | E | F | G | H | I |
|---|---|---|---|---|---|---|---|---|---|---|
| 1 | 3.23E−03 | −5.96E−03 | 9.10E−02 | −3.15E−02 | −3.97E−01 | −4.04E−01 | 3.91E+00 | 0.00E+00 | 0.00E+00 | 0.00E+00 |
| 4 | 5.82E+00 | 1.04E−01 | 1.63E−01 | −3.99E−02 | 1.97E−01 | 2.73E−01 | −7.07E−01 | 0.00E+00 | 0.00E+00 | 0.00E+00 |
| 5 | −4.41E+01 | −6.96E−02 | −2.97E−02 | −9.84E−03 | 4.86E−03 | 7.38E−03 | 2.52E−03 | 0.00E+00 | 0.00E+00 | 0.00E+00 |
| 8 | −5.87E+01 | −3.94E−02 | −7.25E−03 | −1.25E−02 | 1.82E−03 | −6.82E−04 | 1.41E−04 | 0.00E+00 | 0.00E+00 | 0.00E+00 |

TABLE 8

Aspheric surface coefficient

| ** | K | A | B | C | D | E | F | G | H | I |
|---|---|---|---|---|---|---|---|---|---|---|
| 1 | −1.20E−01 | 1.30E−02 | 2.66E−02 | 1.51E−01 | −1.54E−01 | −2.05E−01 | 2.63E+00 | −3.72E+00 | 3.33E+00 | 2.59E+00 |
| 4 | 1.63E+01 | 3.20E−02 | 2.71E−01 | −9.96E−01 | 1.63E+00 | −2.38E+00 | 7.12E+01 | −3.52E+00 | −4.13E+01 | −5.28E+02 |
| 5 | 1.04E+01 | −4.11E−01 | 3.07E−01 | −4.63E+00 | 9.15E+00 | −4.59E+00 | −7.14E+01 | −2.51E+01 | −6.52E+01 | −1.88E+02 |
| 8 | −3.60E+04 | −3.72E−02 | −1.36E−01 | 5.58E−02 | 2.95E−03 | −1.45E−02 | −4.84E−03 | 4.32E−03 | 2.28E−03 | −1.37E−03 |

**: Surface No.

Fifth Example

Figure 10:
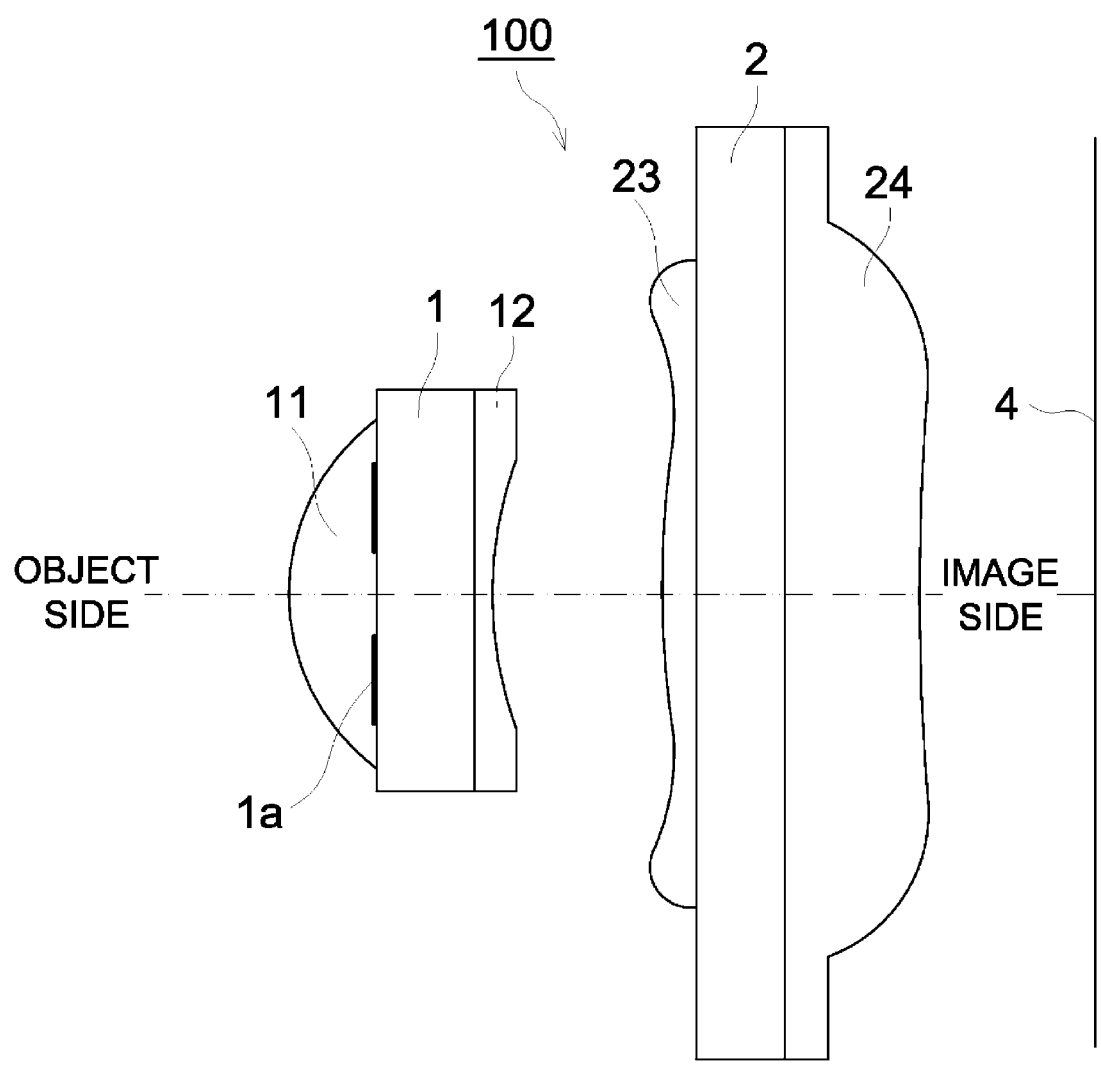
FIG. 10 is a diagram showing the structure of an image pickup lens relating to Fifth Example based on Embodiment 1.

FIG. 10 is a schematic diagram relating to the fifth example of image pickup lens 100 based on Embodiment 1.

Figure 11:
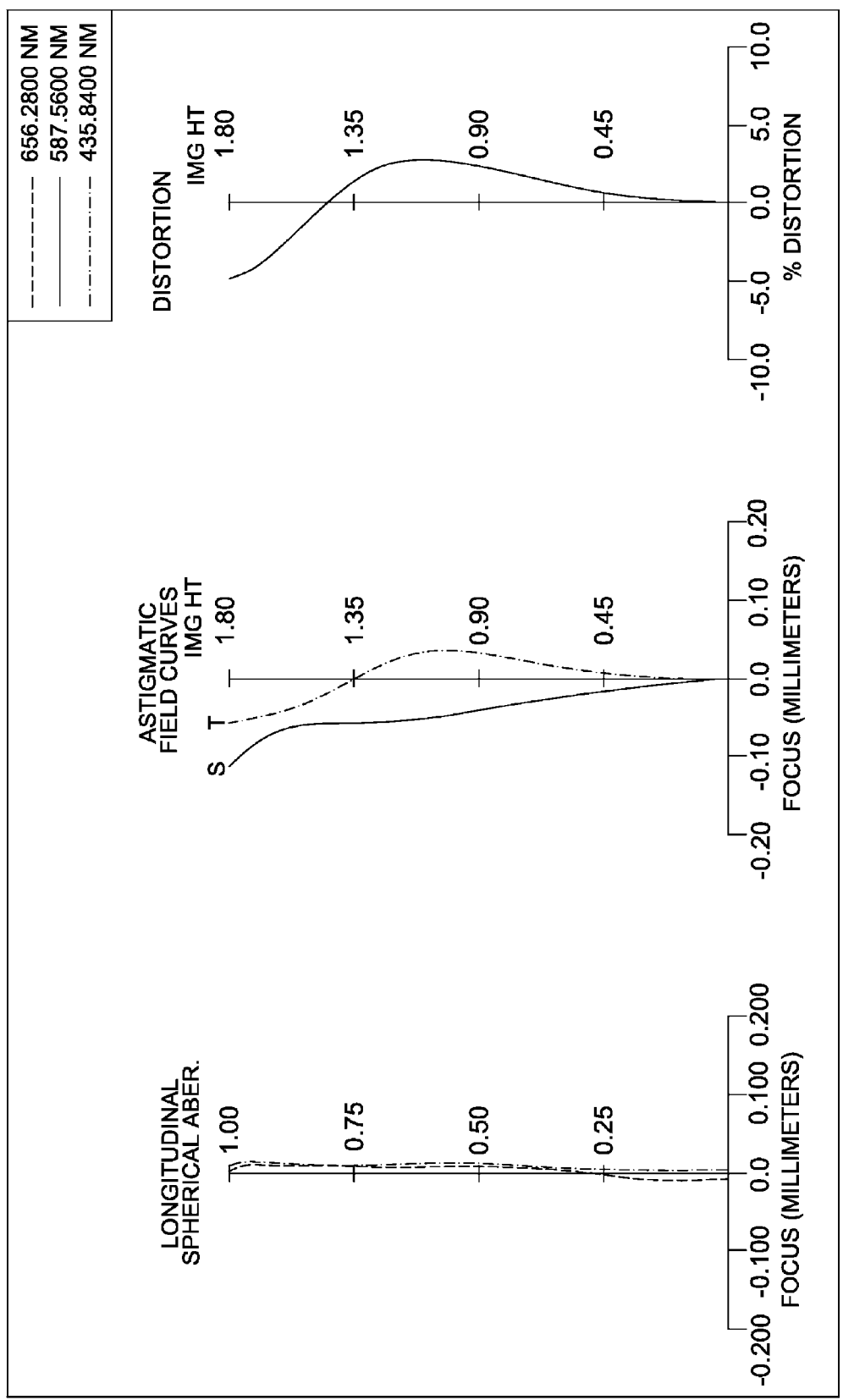
FIG. 11 is an aberration diagram of an image pickup lens relating to Fifth Example.

An arrangement of lens substrates and lenses is the same as that shown in Embodiment 1. Table 9 and Table 10 show data of a working example of image pickup lens 100 including this optical system. FIG. 11 shows an aberration diagram of an image pickup lens including this optical system and providing data of the working example.

With respect to the image pickup lens 100 relating to the fifth example, Abbe number v1 of the first lens 11 is 70.45, and Abbe number v2 of the second lens 12 is 31.16, as shown in Tables.

TABLE 9

| Surface No. | R | D | Nd | v |
|---|---|---|---|---|
| 1* | 0.934 | 0.362 | 1.48749 | 70.45 |
| 2(ape) | ∞ | 0.427 | 1.68855 | 47.43 |
| 3 | ∞ | 0.074 | 1.68893 | 31.16 |
| 4* | 2.194 | 0.726 | | |
| 5* | 4.356 | 0.124 | 1.53048 | 55.72 |
| 6 | ∞ | 0.362 | 1.68855 | 47.43 |
| 7 | ∞ | 0.619 | 1.53048 | 55.72 |
| 8* | 6.134 | 0.753 | | |
| 9 | ∞ | | | |

| BF | Fno | HFOV | TL |
|---|---|---|---|
| 0.7526 | 2.8 | 30.43 | 3.448 | image sensor 4 of a CCD type or a CMOS type at the image side of the third lens substrate 3.

The first lens substrate 1 includes a first lens 11 formed on its object side surface and a second lens 12 formed on its image side surface. Further, the second lens substrate 2 includes a third lens 23 formed on its object side surface and a fourth lens 24 formed on its image side surface. The third lens substrate 3 includes a fifth lens 35 formed on its object side surface and a sixth lens 36 formed on its image side surface.

As a lens section, the first lens 11, the second lens 12, the third lens 23, the fourth lens 24, the fifth lens 35, and the sixth lens 36 are arranged, in this order from the object side. A surface coming in contact with the air of each of the lenses 11, 12, 23, 24, 35, and 36 is formed into an aspheric surface. Each of the lenses 11, 12, 23, 24, 35, and 36 employs a resin material as its lens material.

Further, there is arranged an aperture stop 1a between the first lens 11 and the first lens substrate 1, where the aperture stop shields visible light contributing to image forming.

The first lens 11 has a positive refractive power. The second lens 12 has a negative refractive power. The third lens 23 has a negative refractive power. The fourth lens 24 has a positive refractive power. The fifth lens 35 has a negative refractive power. The sixth lens 36 has a positive refractive power.

The manufacturing method of the image pickup lens 100 is the same as that of the first example.

Figure 13:
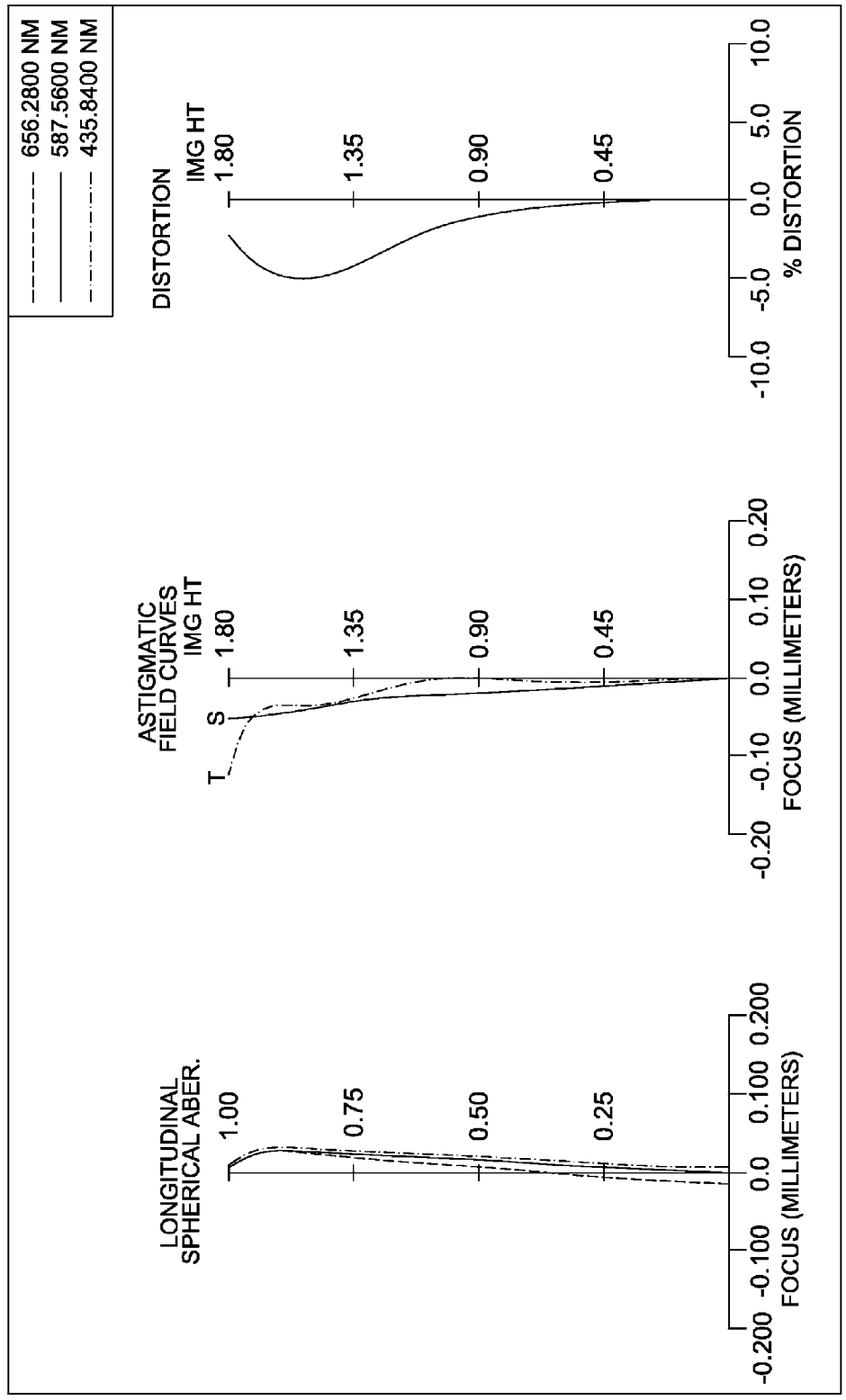
FIG. 13 is an aberration diagram of an image pickup lens relating to Sixth Example.

Tables 11 and 12 shows data of a working example of the image pickup lens 100 including this optical system. FIG. 13 shows an aberration diagram of the image pickup lens including this optical system and providing data of the working example.

TABLE 10

Aspheric surface coefficient

| ** | K | A | B | C | D | E | F | G | H | I |
|---|---|---|---|---|---|---|---|---|---|---|
| 1 | 1.78E−02 | −2.99E−03 | 1.01E−01 | −6.96E−03 | −3.67E−01 | −4.39E−01 | 3.39E+00 | 0.00E+00 | 0.00E+00 | 0.00E+00 |
| 4 | 6.32E+00 | 1.17E−01 | 2.15E−01 | 1.70E−01 | 1.01E+00 | 9.13E−01 | −3.45E+00 | 0.00E+00 | 0.00E+00 | 0.00E+00 |
| 5 | −4.52E+01 | −7.05E−02 | −2.74E−02 | −9.45E−03 | 2.67E−03 | 6.76E−03 | 2.96E−03 | 0.00E+00 | 0.00E+00 | 0.00E+00 |
| 8 | −9.45E+00 | −3.51E−02 | −7.32E−03 | −1.25E−02 | 1.77E−03 | −6.39E−04 | 2.11E−04 | 0.00E+00 | 0.00E+00 | 0.00E+00 |

**: Surface No.

Sixth Example

Figure 12:
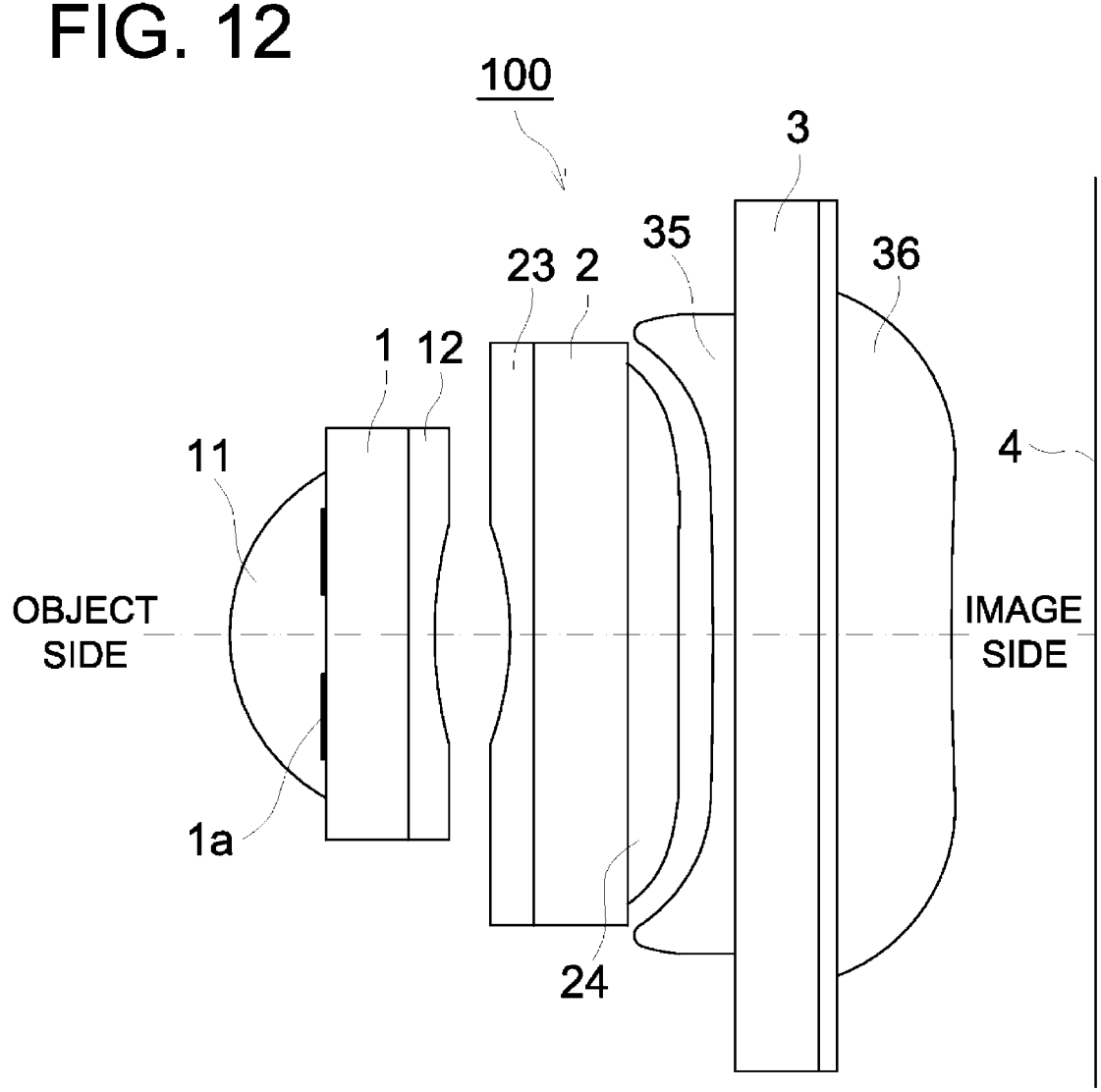
FIG. 12 is a diagram showing the structure of an image pickup lens relating to Sixth Example based on Embodiment 1.

FIG. 12 is a schematic diagram relating to the sixth example of image pickup lens 100 based on Embodiment 1.

In the image pickup lens 100 relating to the sixth example, there are arranged a first lens substrate 1 at the object side, and a second lens substrate 2 at the image side of the first lens substrate. Further, there is arranged a third lens substrate 3 at the image side of the second lens substrate 2. The first lens substrate 1 and the second lens substrate 2 are arranged with the predetermined distance between them. The second lens substrate 2 and the third lens substrate 3 are arranged with the predetermined distance between them. Each of the first lens substrate 1, the second lens substrate 2, and the third lens substrate 3 is a parallel flat plate. Further, there is arranged an With respect to the image pickup lens 100 relating to the sixth example, Abbe number v1 of the first lens 11 is 54.00, and Abbe number v2 of the second lens 12 is 26.00, as shown in Tables.

TABLE 11

| Surface No. | R | D | Nd | v |
|---|---|---|---|---|
| 1* | 0.758 | 0.360 | 1.50710 | 54.00 |
| 2(ape) | ∞ | 0.303 | 1.84078 | 40.83 |
| 3 | ∞ | 0.114 | 1.61000 | 26.00 |
| 4* | 2.606 | 0.281 | | |
| 5* | −1.751 | 0.095 | 1.61000 | 26.00 |
| 6 | ∞ | 0.360 | 1.84078 | 40.83 |

TABLE 11-continued

| | | | | |
|---|---|---|---|---|
| 7 | ∞ | 0.198 | 1.61000 | 26.00 |
| 8* | −33.387 | 0.110 | | |
| 9* | 7.682 | 0.110 | 1.53048 | 55.72 |
| 10 | ∞ | 0.312 | 1.84078 | 40.83 |
| 11 | ∞ | 0.510 | 1.53048 | 55.72 |
| 12* | 5.749 | 0.528 | | |
| 13 | ∞ | | | |

| BF | Fno | HFOV | TL |
|---|---|---|---|
| 0.5282 | 2.8 | 30.64 | 3.28 |

TABLE 12

Aspheric surface coefficient

| ** | K | A | B | C | D | E | F | G | H | I |
|---|---|---|---|---|---|---|---|---|---|---|
| 1 | 1.52E−02 | −8.73E−03 | 1.07E−01 | −1.83E−01 | 6.94E−01 | −2.14E+00 | 8.57E+00 | 0.00E+00 | 0.00E+00 | 0.00E+00 |
| 4 | 2.72E+01 | 3.43E−02 | −4.99E−01 | 1.14E+00 | −9.83E−01 | −1.15E+01 | −1.45E+01 | −2.16E+02 | 8.29E+02 | 0.00E+00 |
| 5 | 1.11E+01 | −1.82E−01 | −1.14E+00 | 2.31E+00 | −1.22E+01 | 3.69E+00 | 2.58E+01 | −3.77E+00 | −1.62E+03 | −2.05E+03 |
| 8 | 0.00E+00 | −7.36E−02 | −2.57E−02 | −1.62E−02 | −2.96E−02 | 0.00E+00 | 0.00E+00 | 0.00E+00 | 0.00E+00 | 0.00E+00 |
| 9 | −5.44E+02 | −1.09E−01 | −2.61E−03 | −8.62E−03 | −1.58E−02 | −1.89E−02 | −1.65E−02 | −1.02E−02 | 6.72E−04 | 1.60E−02 |
| 12 | −1.31E+02 | −1.39E−01 | 2.93E−02 | −2.37E−02 | −1.76E−02 | 8.83E−03 | 5.73E−03 | −3.87E−03 | 5.37E−05 | 1.47E−04 |

**: Surface No.

In Table 11, Surface No. 9 represents the object side surface of the fifth lens 35, Surface No. 10 represents the image side surface of the fifth lens 35, Surface No. 11 shows the object side surface of the sixth lens 36, Surface No. 12 shows an image side surface of the sixth lens 36. Further, mark * represents an aspheric surface.

Seventh Example

Figure 14:
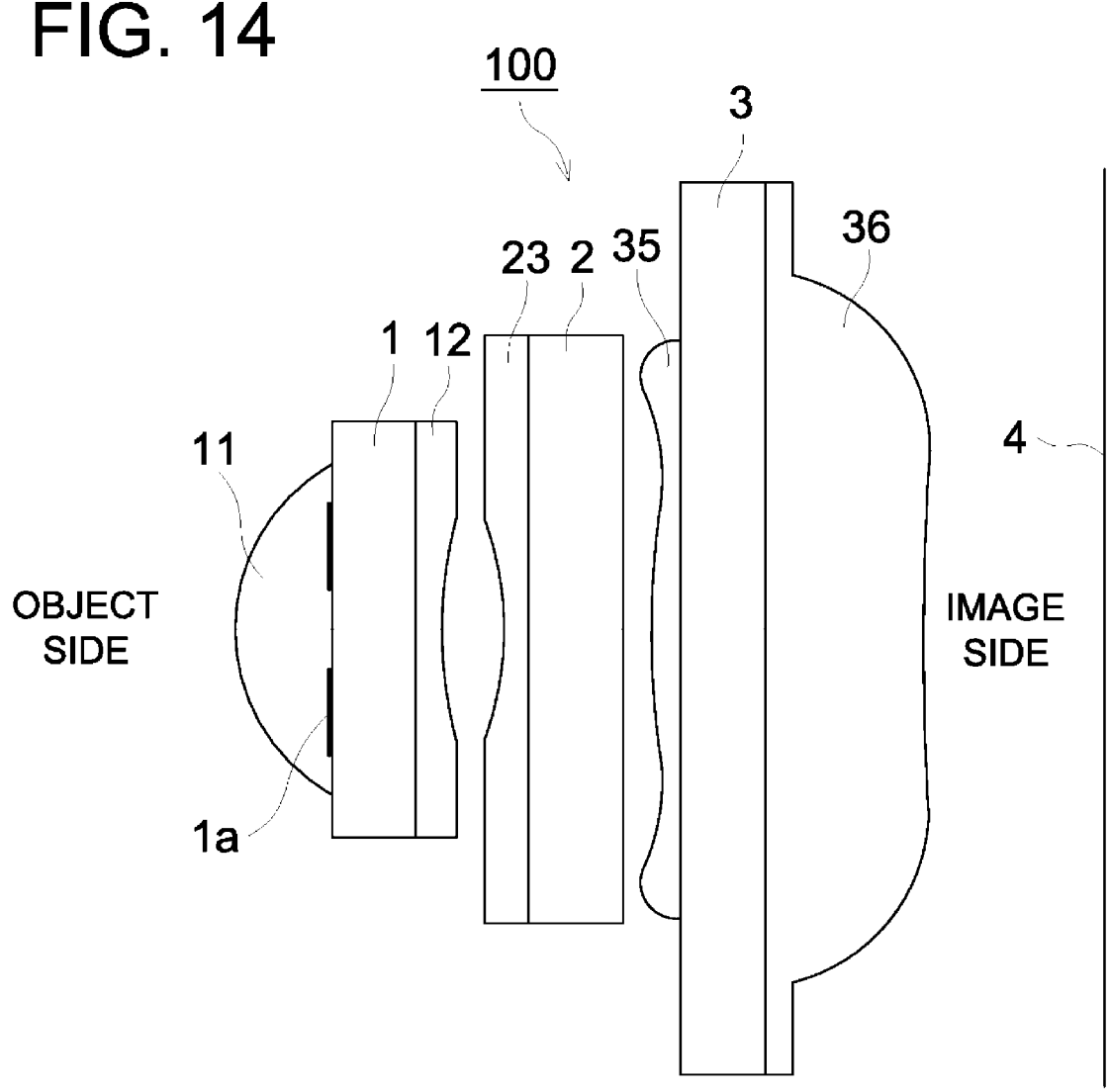
FIG. 14 is a diagram showing the structure of an image pickup lens relating to Seventh Example based on Embodiment 1.

FIG. 14 is a schematic diagram relating to the seventh example of image pickup lens 100 based on Embodiment 1.

As for the arrangement of lens substrates and lenses, there are arranged a first lens substrate 1 at the object side, and a second lens substrate 2 at the image side of the first lens substrate. Further, there is arranged a third lens substrate 3 at the image side of the second lens substrate 2. The first lens substrate 1 and the second lens substrate 2 are arranged with the predetermined distance between them. The second lens substrate 2 and the third lens substrate 3 are arranged with the predetermined distance between them. Each of the first lens substrate 1, the second lens substrate 2, and the third lens substrate 3 is a parallel flat plate. Further, there is arranged an image sensor 4 of a CCD type or a CMOS type at the image side of the third lens substrate 3.

The first lens substrate 1 includes a first lens 11 formed on its object side surface and a second lens 12 formed on its image side surface. Further, the second lens substrate 2 includes a third lens 23 formed on its object side surface. The third lens substrate 3 includes a fifth lens 35 formed on its object side surface and a sixth lens 36 formed on its image side surface. There is no lens on the image side surface of the second lens substrate 2.

Figure 15:
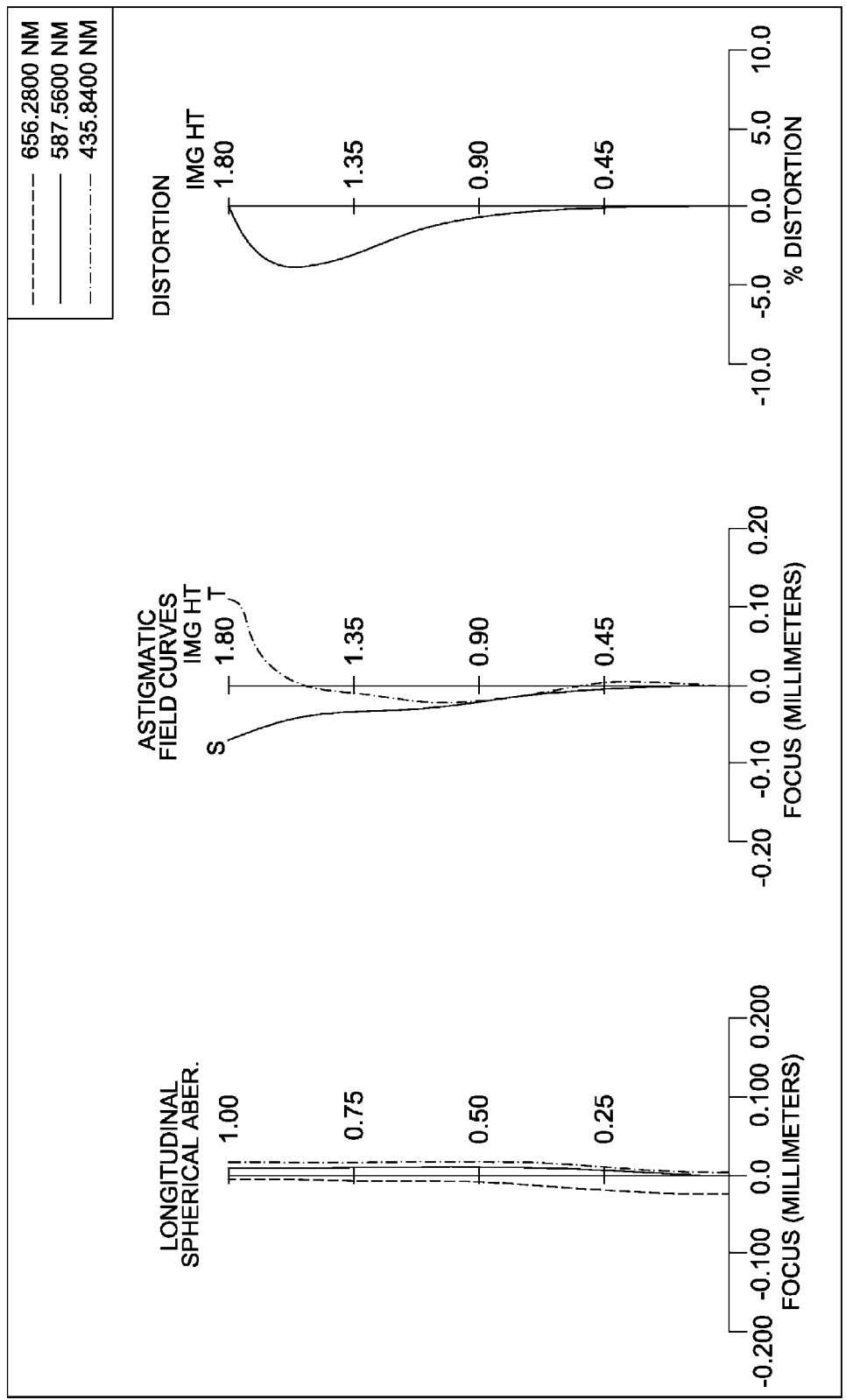
FIG. 15 is an aberration diagram of an image pickup lens relating to Seventh Example.

Tables 13 and 14 show data of a working example of the image pickup lens 100 including this optical system. FIG. 15 shows an aberration diagram of the image pickup lens including this optical system and providing data of the working example.

With respect to the image pickup lens 100 relating to the seventh example, Abbe number v1 of the first lens 11 is 54.00, and Abbe number v2 of the second lens 12 is 29.00, as shown in Tables.

TABLE 13

| Surface No. | R | D | Nd | v |
|---|---|---|---|---|
| 1* | 0.798 | 0.339 | 1.50710 | 54.00 |
| 2(ape) | ∞ | 0.308 | 1.55082 | 43.35 |
| 3 | ∞ | 0.109 | 1.57370 | 29.00 |
| 4* | 2.618 | 0.207 | | |
| 5* | −1.816 | 0.099 | 1.57370 | 29.00 |
| 6 | ∞ | 0.375 | 1.55082 | 43.35 |
| 7 | ∞ | 0.000 | 1.58749 | 30.07 |
| 8 | ∞ | 0.100 | | |
| 9* | 3.325 | 0.104 | 1.50710 | 54.00 |
| 10 | ∞ | 0.304 | 1.55308 | 43.28 |
| 11 | ∞ | 0.572 | 1.50710 | 54.00 |
| 12* | 3.856 | 0.658 | | |
| 13 | ∞ | | | |

| BF | Fno | HFOV | TL |
|---|---|---|---|
| 0.6582 | 2.8 | 30.88 | 3.176 |

TABLE 14

Aspheric surface coefficient

| ** | K | A | B | C | D | E | F | G | H | I |
|---|---|---|---|---|---|---|---|---|---|---|
| 1 | 1.95E−02 | −7.50E−04 | 1.22E−01 | −1.64E−01 | 8.90E−01 | −2.19E+00 | 4.90E+00 | 0.00E+00 | 0.00E+00 | 0.00E+00 |
| 4 | 2.43E+01 | 1.22E−01 | −4.91E−01 | 1.15E+00 | 2.30E+00 | −8.87E+00 | −3.57E+00 | −1.85E+02 | 8.43E+02 | 0.00E+00 |
| 5 | 1.09E+01 | 2.12E−01 | −1.32E+00 | 1.69E+00 | −3.12E+00 | 2.70E+00 | 2.82E+01 | 4.19E+01 | −1.28E+03 | 5.02E+00 |
| 9 | −1.36E+02 | −1.18E−01 | −4.71E−02 | 1.00E−03 | −3.52E−02 | −6.31E−03 | −2.61E−04 | 1.40E−02 | 3.75E−02 | 2.89E−02 |
| 12 | −1.06E+02 | −1.22E−01 | 1.34E−02 | −1.88E−02 | −1.51E−02 | 7.97E−03 | 4.14E−03 | −3.86E−03 | 2.95E−04 | 7.25E−05 |

**: Surface No.

Eighth Example

FIG. 16 is a schematic diagram relating to the eighth example of image pickup lens 100 based on Embodiment 2.

In the image pickup lens 100 relating to the eighth example, there are arranged a first lens substrate 1 at the object side, and an optical member 7 formed in a parallel flat plate and arranged at the image side of the first lens substrate. The first lens substrate 1 and the optical member 7 are arranged with the predetermined distance between them. Further, there is arranged an image sensor 4 of a CCD type or a CMOS type at the image side of the optical member 7.

The first lens substrate 1 includes a first lens 11 formed on its object side surface and a second lens 12 formed on its image side surface. There are no lenses on the object side surface and the image side surface of the optical member 7.

As a lens section, the first lens 11, and the second lens 12 are arranged, in this order from the object side. A surface coming in contact with the air of each of the lenses 11 and 12 is formed in an aspheric surface. Each of the lenses 11 and 12 employs a resin material as its lens material.

Further, there is arranged an aperture stop 1a between the first lens 11 and the first lens substrate 1, where the aperture stop shields visible light contributing to image forming.

The first lens 11 has a positive refractive power. The second lens 12 has a negative refractive power.

Figure 17:
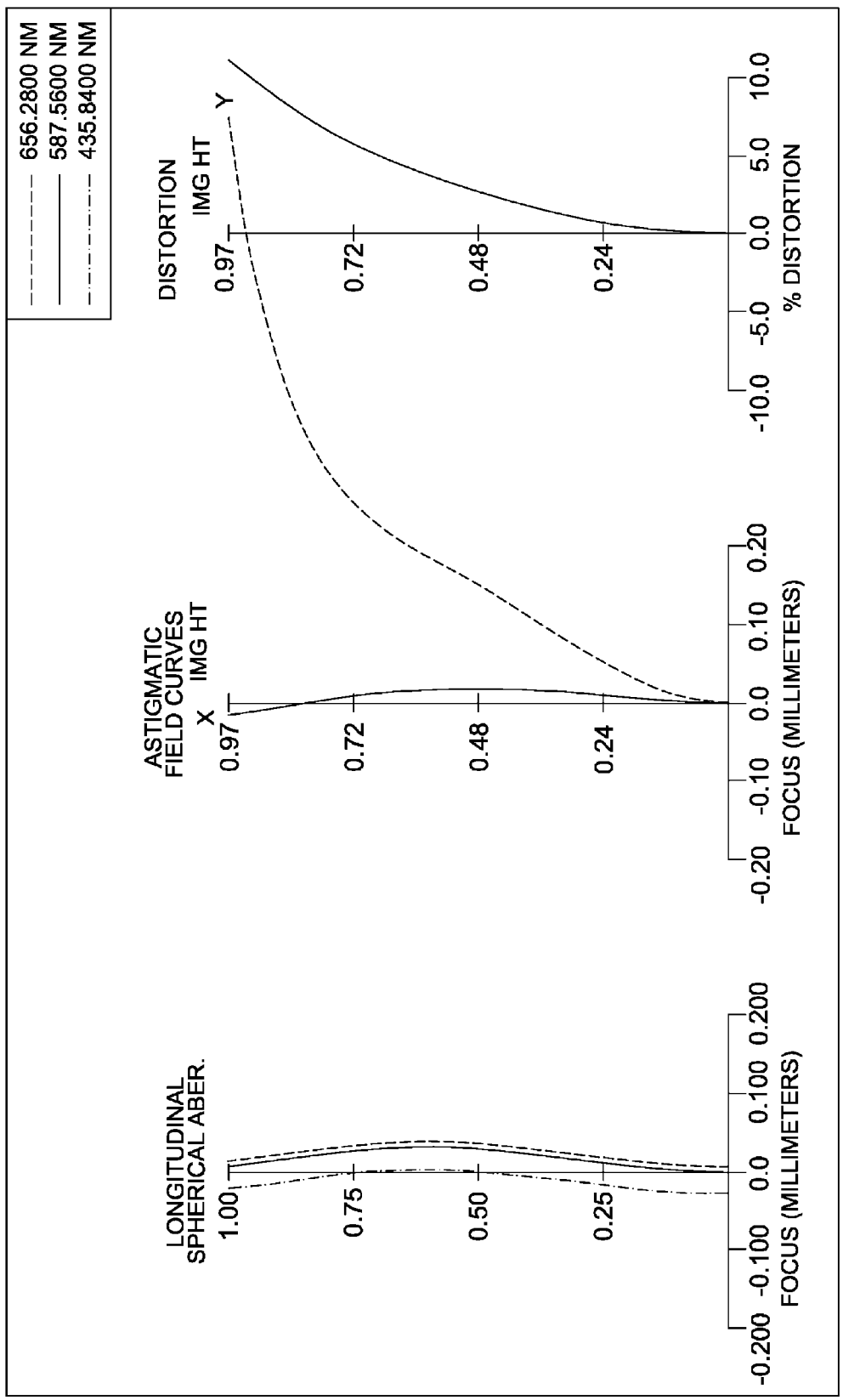
FIG. 17 is an aberration diagram of an image pickup lens relating to Eighth Example.

Tables 15 and 16 shows data of a working example of the image pickup lens 100 including this optical system. FIG. 17 shows an aberration diagram of an image pickup lens including this optical system and providing data of the working example.

Ninth Example

Figure 18:
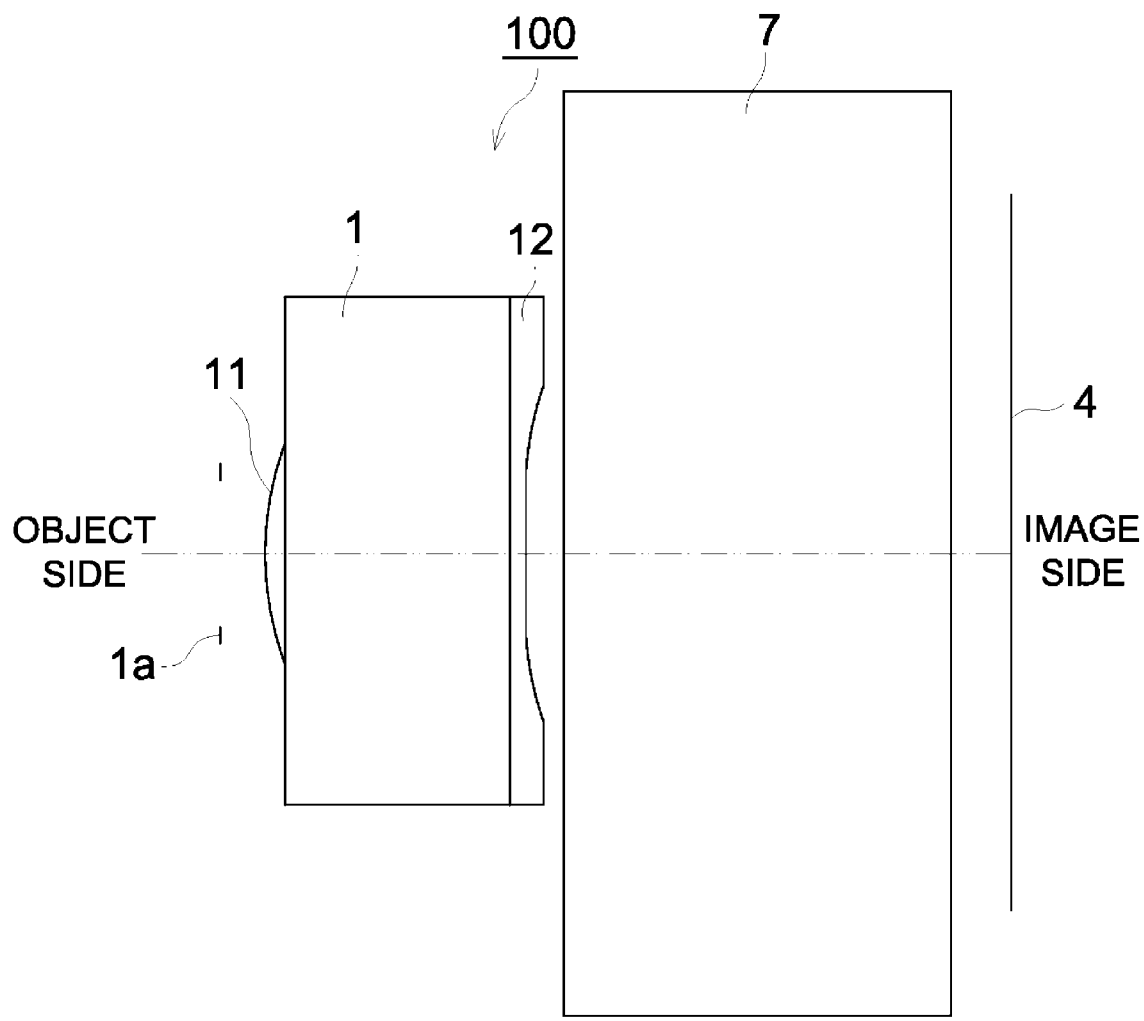
FIG. 18 is a diagram showing the structure of an image pickup lens relating to Ninth Example based on Embodiment 2.

FIG. 18 is a schematic diagram relating to the ninth example of image pickup lens 100 based on Embodiment 2.

Figure 19:
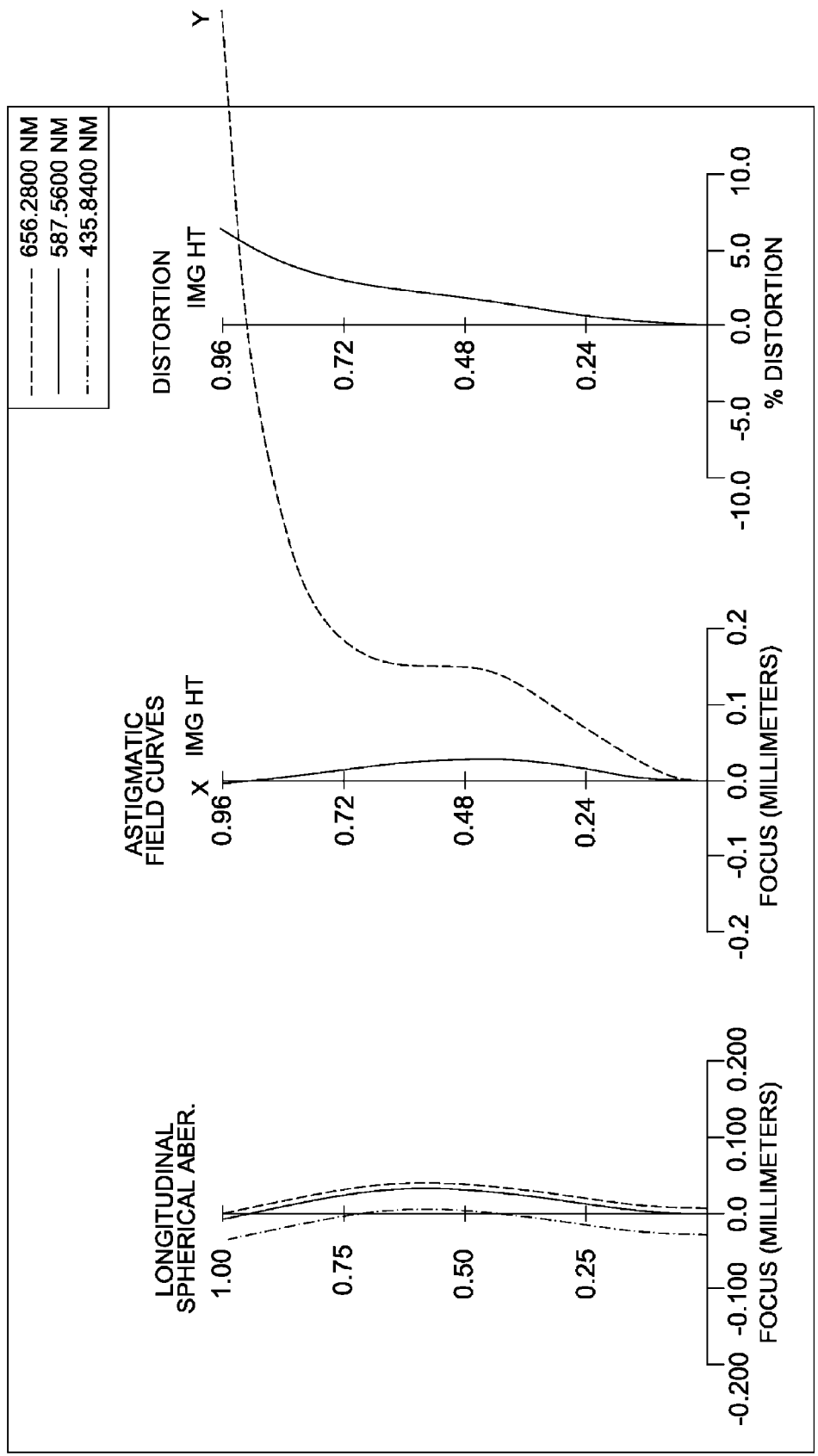
FIG. 19 is an aberration diagram of an image pickup lens relating to Ninth Example.

An arrangement of lens substrates and lenses is the same as that shown in Embodiment 2. Table 17 and Table show data of a working example of image pickup lens 100 including this optical system. FIG. 19 shows an aberration diagram of an image pickup lens including this optical system and providing data of the working example.

With respect to the image pickup lens 100 relating to the ninth example, Abbe number v1 of the first lens 11 is 54.00, and Abbe number v2 of the second lens 12 is 29.00, as shown in Tables.

TABLE 17

| Surface No. | R | D | Nd | ν |
|---|---|---|---|---|
| 1(ape) |  | 0.116 |  |  |
| 2* | 0.740 | 0.050 | 1.50710 | 54.00 |
| 3 | ∞ | 0.570 | 1.52470 | 56.20 |
| 4 | ∞ | 0.050 | 1.57370 | 29.00 |
| 5* | −1.816 | 0.100 |  |  |
| 6 | ∞ | 0.994 | 1.51633 | 64.10 |
| 7 | ∞ | 0.120 |  |  |
|  | BF | Fno | HFOV | TL |
|  | 1.0465 | 2.8 | 31.25937 | 2.17 |

TABLE 18

Aspheric surface coefficient

| ** | K | A | B | C | D | E | F | G | H | I |
|---|---|---|---|---|---|---|---|---|---|---|
| 2 | −3.55E−01 | −6.59E−01 | 5.00E+01 | −7.06E+02 | 3.16E+03 | 0.00E+00 | 0.00E+00 | 0.00E+00 | 0.00E+00 | 0.00E+00 |
| 5 | 2.37E+03 | 2.47E+00 | −1.88E+01 | 1.34E+02 | −3.21E+02 | 0.00E+00 | 0.00E+00 | 0.00E+00 | 0.00E+00 | 0.00E+00 |

**: Surface No.

With respect to the image pickup lens 100 relating to the eighth example, Abbe number v1 of the first lens 11 is 54.00, and Abbe number v2 of the second lens 12 is 29.00, as shown in Tables.

TABLE 15

| Surface No. | R | D | Nd | ν |
|---|---|---|---|---|
| 1(ape) |  | 0.116 |  |  |
| 2* | 0.730 | 0.050 | 1.50710 | 54.00 |
| 3 | ∞ | 0.570 | 1.52470 | 56.20 |
| 4 | ∞ | 0.050 | 1.57370 | 29.00 |
| 5* | −1.816 | 0.100 |  |  |
| 6 | ∞ | 0.200 | 1.51633 | 64.10 |
| 7 | ∞ | 0.120 |  |  |
|  | BF | Fno | HFOV | TL |
|  | 1.0258 | 2.8 | 30.81321 | 1.91 |

The present example shows the case in which the optical member 7 is thicker than that of the eighth example, which exhibits an excellent function to control distortion of the optical member 7 to be small and corrects the distortion with keeping the better aberration property than that of the eighth example.

Tenth Example

Figure 20:
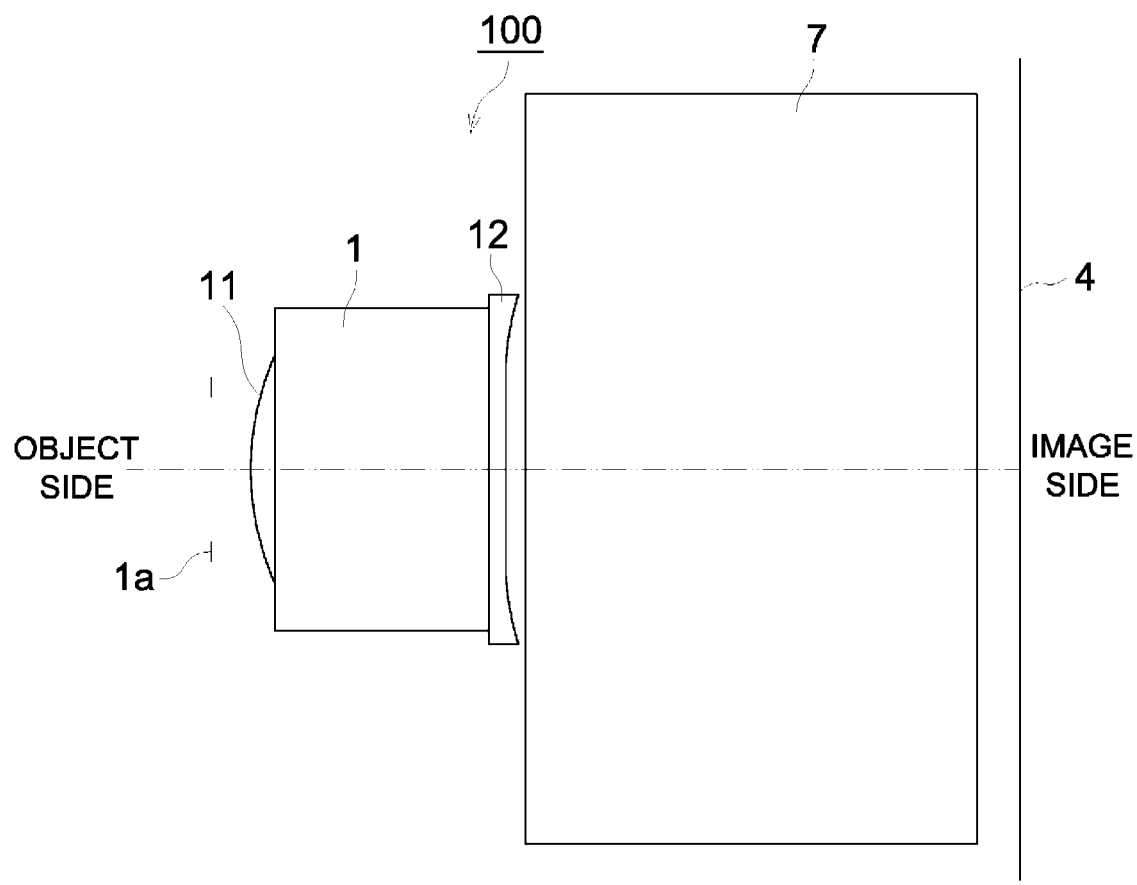
FIG. 20 is a diagram showing the structure of an image pickup lens relating to Tenth Example based on Embodiment 2.

FIG. 20 is a schematic diagram relating to the tenth example of image pickup lens 100 based on Embodiment 2.

Figure 21:
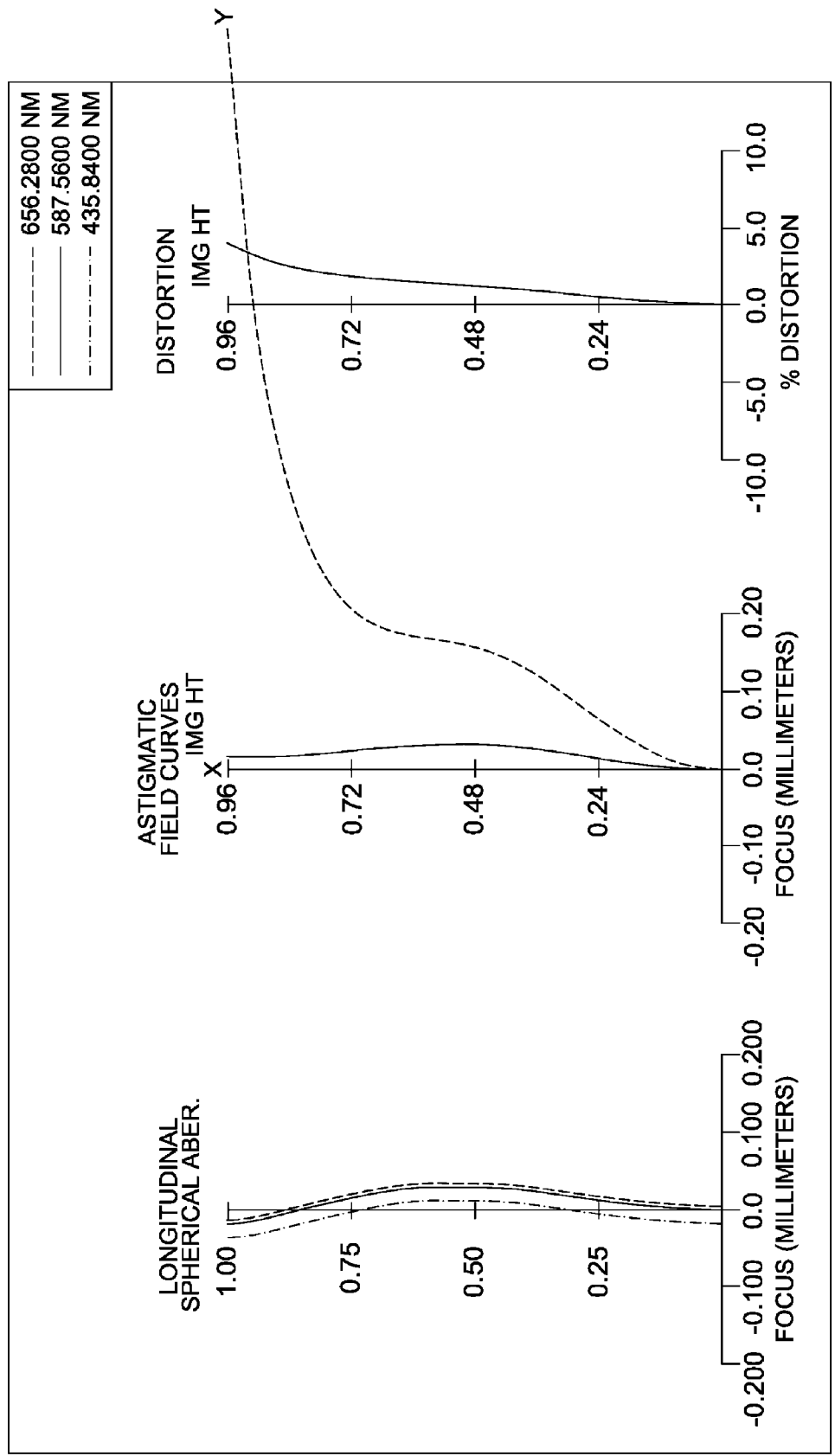
FIG. 21 is an aberration diagram of an image pickup lens relating to Tenth Example.

An arrangement of lens substrates and lenses is the same as that shown in Embodiment 2. Table 19 and Table 20 show data of a working example of image pickup lens 100 including this optical system. FIG. 21 shows an aberration diagram of an image pickup lens including this optical system and providing data of the working example.

TABLE 16

Aspheric surface coefficient

| ** | K | A | B | C | D | E | F | G | H | I |
|---|---|---|---|---|---|---|---|---|---|---|
| 2 | −6.46E−01 | −6.59E−01 | 5.00E+01 | −7.06E+02 | 3.16E+03 | 0.00E+00 | 0.00E+00 | 0.00E+00 | 0.00E+00 | 0.00E+00 |
| 5 | −2.61E+04 | 2.50E+00 | −1.16E+01 | 7.11E+01 | −1.71E+02 | 0.00E+00 | 0.00E+00 | 0.00E+00 | 0.00E+00 | 0.00E+00 |

**: Surface No.

With respect to the image pickup lens 100 relating to the tenth example, Abbe number v1 of the first lens 11 is 70.45, and Abbe number v2 of the second lens 12 is 31.16, as shown in Tables.

TABLE 19

| Surface No. | R | D | Nd | v |
|---|---|---|---|---|
| 1(ape) | | 0.116 | | |
| 2* | 0.740 | 0.050 | 1.48749 | 70.45 |
| 3 | ∞ | 0.570 | 1.52470 | 56.20 |
| 4 | ∞ | 0.050 | 1.57370 | 31.16 |
| 5* | −1.816 | 0.100 | | |
| 6 | ∞ | 1.200 | 1.51633 | 64.10 |
| 7 | ∞ | 0.120 | | |
| BF | Fno | HFOV | TL | |
| 1.1077 | 2.8 | 29.4479 | 2.33 | |

TABLE 20

Aspheric surface coefficient

| ** | K | A | B | C | D | E | F | G | H | I |
|---|---|---|---|---|---|---|---|---|---|---|
| 2 | −1.89E−01 | −6.59E−01 | 5.00E+01 | −7.06E+02 | 3.16E+03 | 0.00E+00 | 0.00E+00 | 0.00E+00 | 0.00E+00 | 0.00E+00 |
| 5 | −2.61E+04 | 2.47E+00 | −1.88E+01 | 1.34E+02 | −3.21E+02 | 0.00E+00 | 0.00E+00 | 0.00E+00 | 0.00E+00 | 0.00E+00 |

**: Surface No.

In the present example, distortion is controlled to be smaller than that of the ninth example, by making thicker the optical member 7.

Eleventh Example

FIG. 22 is a schematic diagram relating to the eleventh example of image pickup lens 100 based on a variation example of Embodiment 1 and Embodiment 2.

In the image pickup lens 100 relating to the eleventh example, there is arranged just the first lens substrate. Further, there is arranged an image sensor 4 of a CCD type or a CMOS type at the image side of the first lens substrate 1.

The first lens substrate 1 includes a first lens 11 formed on its object side surface and a second lens 12 formed on its image side surface.

As a lens section, the first lens 11, and the second lens 12 are arranged, in this order from the object side. A surface coming in contact with the air of each of the lenses 11 and 12 is formed into an aspheric surface. Each of the lenses 11 and 12 employs a resin material as its lens material.

Further, there is arranged an aperture stop 1a on the image side of the first lens 11, where the aperture stop shields visible light contributing to image forming.

The first lens 11 has a positive refractive power. The second lens 12 has a negative refractive power.

Figure 23:
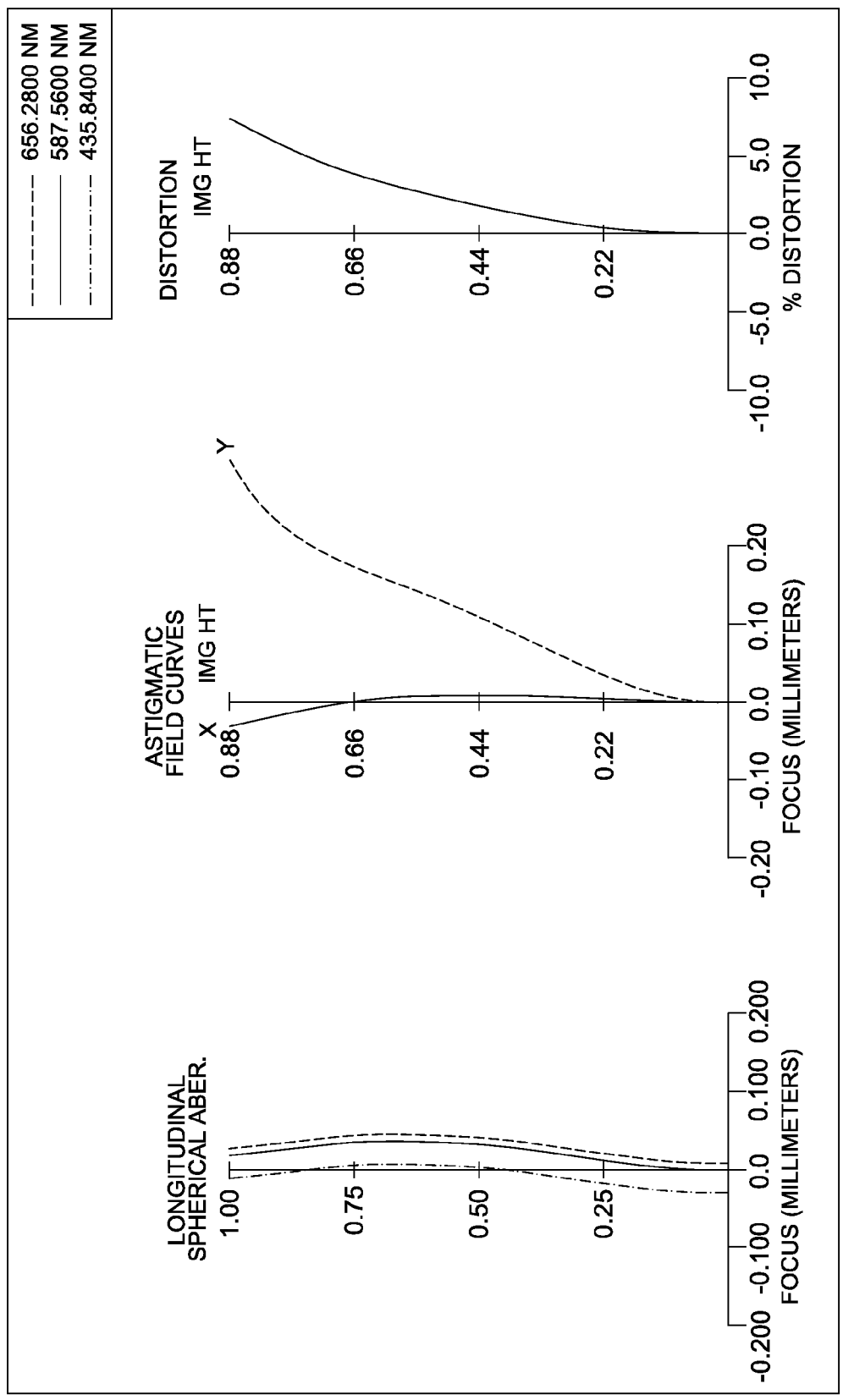
FIG. 23 is an aberration diagram of an image pickup lens relating to Eleventh Example.

Tables 21 and 22 show data of a working example of the image pickup lens 100 including this optical system. FIG. 23 shows an aberration diagram of an image pickup lens including this optical system and providing data of the working example.

With respect to the image pickup lens 100 relating to the eleventh example, Abbe number v1 of the first lens 11 is 54.00, and Abbe number v2 of the second lens 12 is 29.00, as shown in Tables.

TABLE 21

| Surface No. | R | D | Nd | v |
|---|---|---|---|---|
| 1(ape) | | 0.116 | | |
| 2* | 0.730 | 0.050 | 1.50710 | 54.00 |
| 3 | ∞ | 0.570 | 1.67700 | 56.20 |

TABLE 21-continued

| 4 | ∞ | 0.050 | 1.57370 | 29.00 |
|---|---|---|---|---|
| 5* | −1.816 | 1.061 | | |
| BF | Fno | HFOV | TL | |
| 1.0258 | 2.8 | 30.81321 | 1.91 | |

TABLE 22

Aspheric surface coefficient

| ** | K | A | B | C | D | E | F | G | H | I |
|---|---|---|---|---|---|---|---|---|---|---|
| 2 | −6.46E−01 | −6.59E−01 | 5.00E+01 | −7.06E+02 | 3.16E+03 | 0.00E+00 | 0.00E+00 | 0.00E+00 | 0.00E+00 | 0.00E+00 |
| 5 | −2.61E+04 | 2.50E+00 | −1.16E+01 | 7.11E+01 | −1.71E+02 | 0.00E+00 | 0.00E+00 | 0.00E+00 | 0.00E+00 | 0.00E+00 |

**: Surface No.

Twelfth Example

Figure 24:
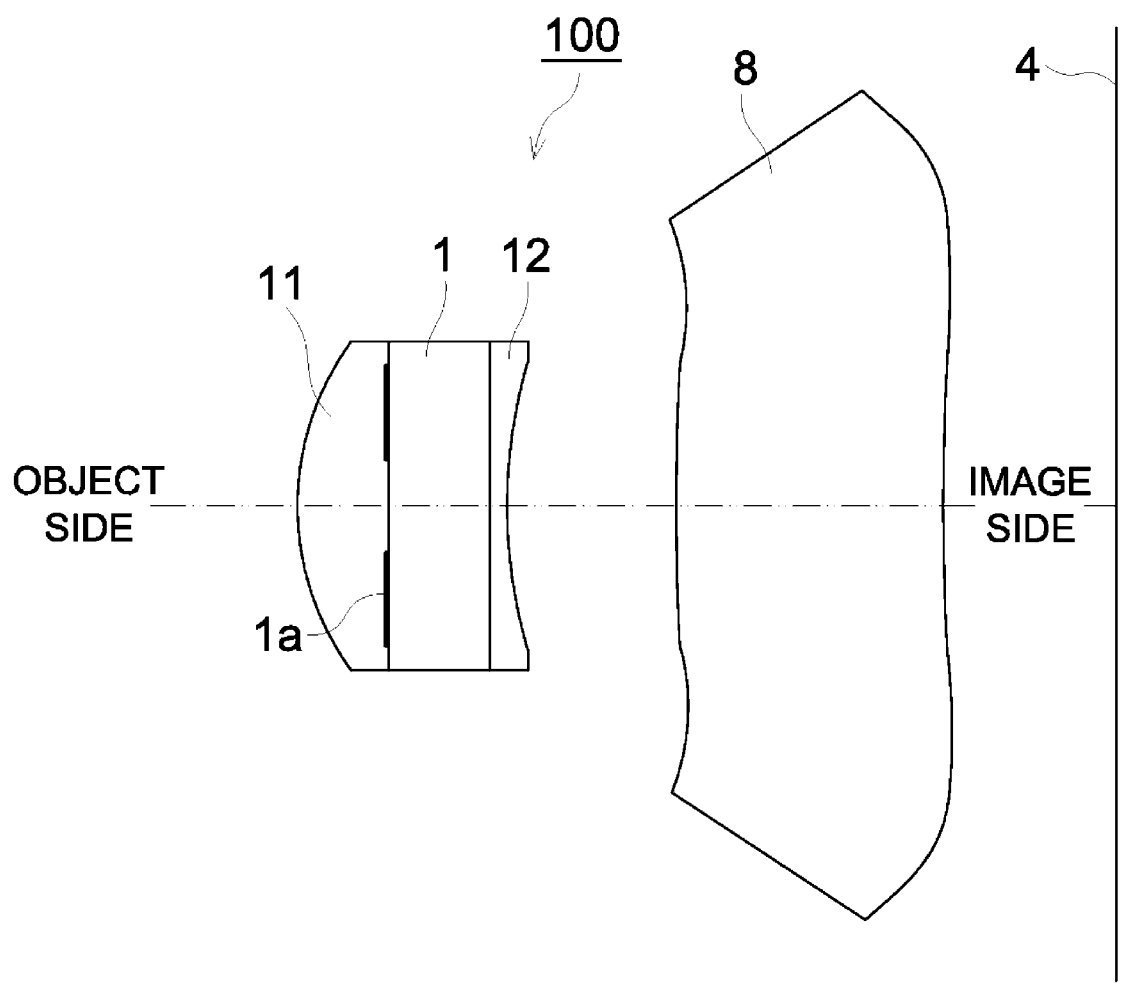
FIG. 24 is a diagram showing the structure of an image pickup lens relating to Twelfth Example based on Embodiment 1.

FIG. 24 is a schematic diagram relating to the twelfth example of image pickup lens 100 based on Embodiment 1.

In the image pickup lens 100 relating to the twelfth example, there are arranged a first lens substrate 1 at the object side, and a lens A 8 at the image side of the first lens substrate 1. The first lens substrate 1 and the lens A 8 are arranged with the predetermined distance between them. Further, there is arranged an image sensor 4 of a CCD type or a CMOS type at the image side of the lens A 8.

The first lens substrate 1 includes a first lens 11 formed on its object side surface and a second lens 12 formed on its image side surface.

As a lens section, the first lens 11, the second lens 12, and lens A 8 are arranged, in this order from the object side. A surface coming in contact with the air of each of the lenses 11, 12, and 8 is formed into an aspheric surface. Each of the lenses 11 and 12 employs a resin material as its lens material.

Further, there is arranged an aperture stop 1a between the first lens 11 and the first substrate 1, where the aperture stop shields visible light contributing to image forming.

The first lens 11 has a positive refractive power. The second lens 12 has a negative refractive power.

The refractive index n2 of the first substrate 1 is greater than the refractive index of n1 of the first lens 11.

Figure 25:
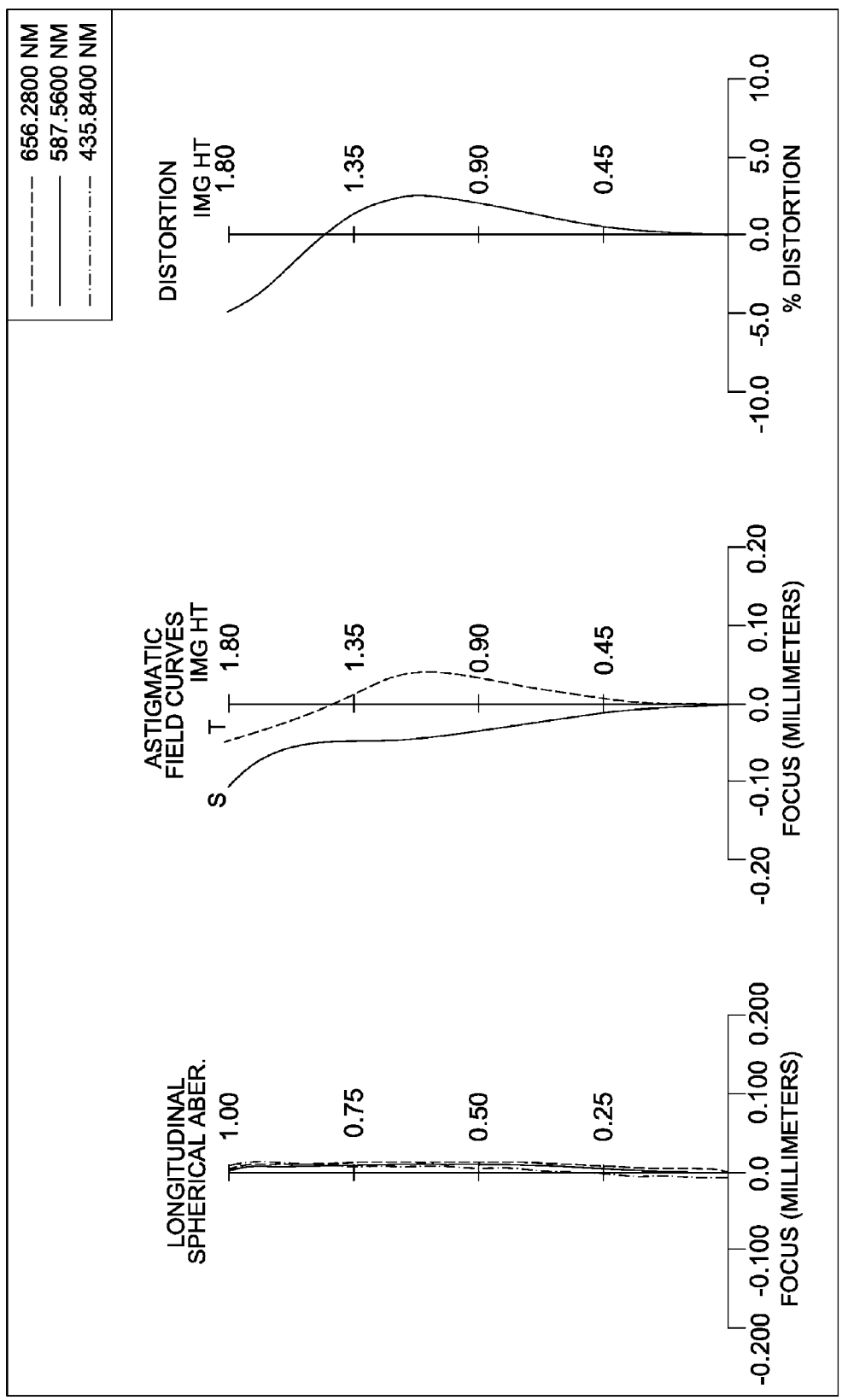
FIG. 25 is an aberration diagram of an image pickup lens relating to Twelfth Example.

Tables 23 and 24 show data of a working example of the image pickup lens 100 including this optical system. FIG. 25 shows an aberration diagram of an image pickup lens including this optical system and providing data of the working example.

With respect to the image pickup lens 100 relating to the twelfth example, Abbe number v1 of the first lens 11 is 70.45, and Abbe number v2 of the second lens 12 is 31.16, as shown in Tables.

TABLE 23

| Surface No. | R     | D     | Nd      | v     |
|-------------|-------|-------|---------|-------|
| 1(ape)      | 0.934 | 0.362 | 1.48749 | 70.45 |
| 2*          | ∞     | 0.427 | 1.68855 | 47.43 |
| 3           | ∞     | 0.074 | 1.68893 | 31.16 |
| 4           | 2.194 | 0.726 |         |       |
| 5*          | 4.356 | 1.106 | 1.53048 | 55.72 |
| 6*          | 6.134 | 0.728 |         |       |

| BF     | Fno | HFOV  | TL   |
|--------|-----|-------|------|
| 0.7275 | 2.8 | 30.48 | 3.42 |

The first lens substrate 1 includes a first lens 11 formed on its object side surface and a second lens 12 formed on its image side surface.

As a lens section, the first lens 11, the second lens 12, lens A 8, and lens B 9 are arranged, in this order from the object side. A surface coming in contact with the air of each of the lenses 11, 12, 8, and 9 is formed into an aspheric surface. Each of the lenses 11, 12, and 9 employs a resin material as its lens material. The lens 8 employs a glass material as its lens material.

Further, there is arranged an aperture stop 1a between the first lens 11 and the first substrate 1, where the aperture stop shields visible light contributing to image forming.

The first lens 11 has a positive refractive power. The second lens 12 has a negative refractive power.

The refractive index n2 of the first substrate 1 is greater than the refractive index of n1 of the first lens 11.

Figure 27:
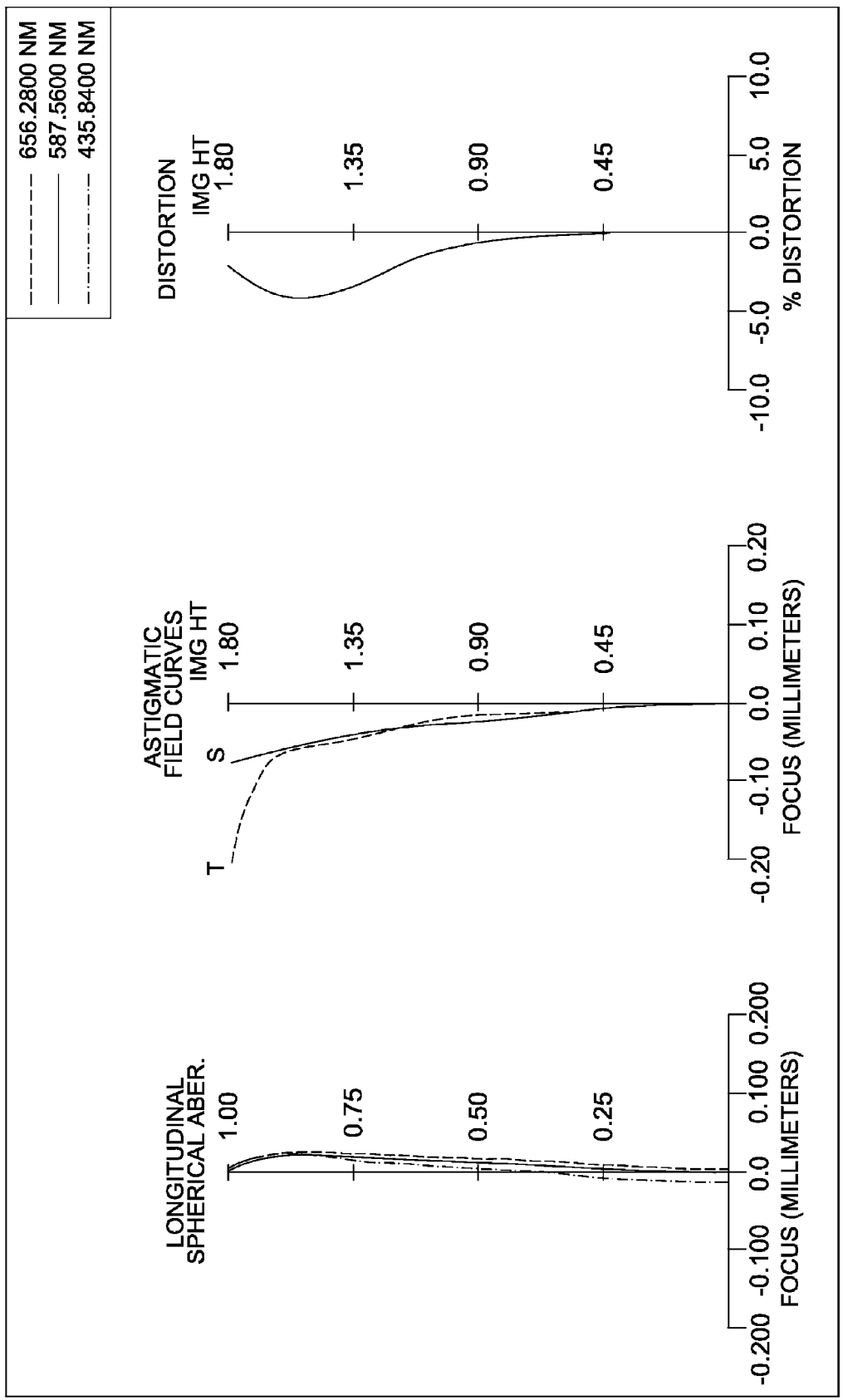
FIG. 27 is an aberration diagram of an image pickup lens relating to Thirteenth Example.

Tables 25 and 26 show data of a working example of the image pickup lens 100 including this optical system. FIG. 27 shows an aberration diagram of an image pickup lens including this optical system and providing data of the working example.

With respect to the image pickup lens 100 relating to the thirteenth example, Abbe number v1 of the first lens 11 is 54.00, and Abbe number v2 of the second lens is 26.00, as shown in Tables.

TABLE 25

| Surface No. | R       | D     | Nd      | v     |
|-------------|---------|-------|---------|-------|
| 1*          | 0.758   | 0.360 | 1.50710 | 54.00 |
| 2(ape)      | ∞       | 0.303 | 1.84078 | 40.83 |
| 3           | ∞       | 0.114 | 1.61000 | 26.00 |
| 4*          | 2.606   | 0.281 |         |       |
| 5*          | -1.751  | 0.652 | 1.61000 | 26.00 |
| 6*          | -33.387 | 0.110 |         |       |
| 7*          | 7.682   | 0.820 | 1.53048 | 55.72 |
| 8*          | 5.749   | 0.546 |         |       |

| BF     | Fno | HFOV  | TL    |
|--------|-----|-------|-------|
| 0.5458 | 2.8 | 30.54 | 3.186 |

TABLE 24

Aspheric surface coefficient

| ** | K        | A         | B         | C         | D         | E         | F         | G        | H        | I        |
|----|----------|-----------|-----------|-----------|-----------|-----------|-----------|----------|----------|----------|
| 1  | 1.78E-02 | -2.99E-03 | 1.01E-01  | -6.96E-03 | -3.67E-01 | -4.39E-01 | 3.39E+00  | 0.00E+00 | 0.00E+00 | 0.00E+00 |
| 4  | 6.32E+00 | 1.17E-01  | 2.15E-01  | 1.70E-01  | 1.01E+00  | 9.13E-01  | -3.45E+00 | 0.00E+00 | 0.00E+00 | 0.00E+00 |
| 5  | -4.52E+01| -7.05E-02 | -2.74E-02 | -9.45E-03 | 2.67E-03  | 6.76E-03  | 2.96E-03  | 0.00E+00 | 0.00E+00 | 0.00E+00 |
| 6  | -9.45E+00| -3.51E-02 | -7.32E-03 | -1.25E-02 | 1.77E-03  | -6.39E-04 | 2.11E-04  | 0.00E+00 | 0.00E+00 | 0.00E+00 |

**: Surface No.

Thirteenth Example

Figure 26:
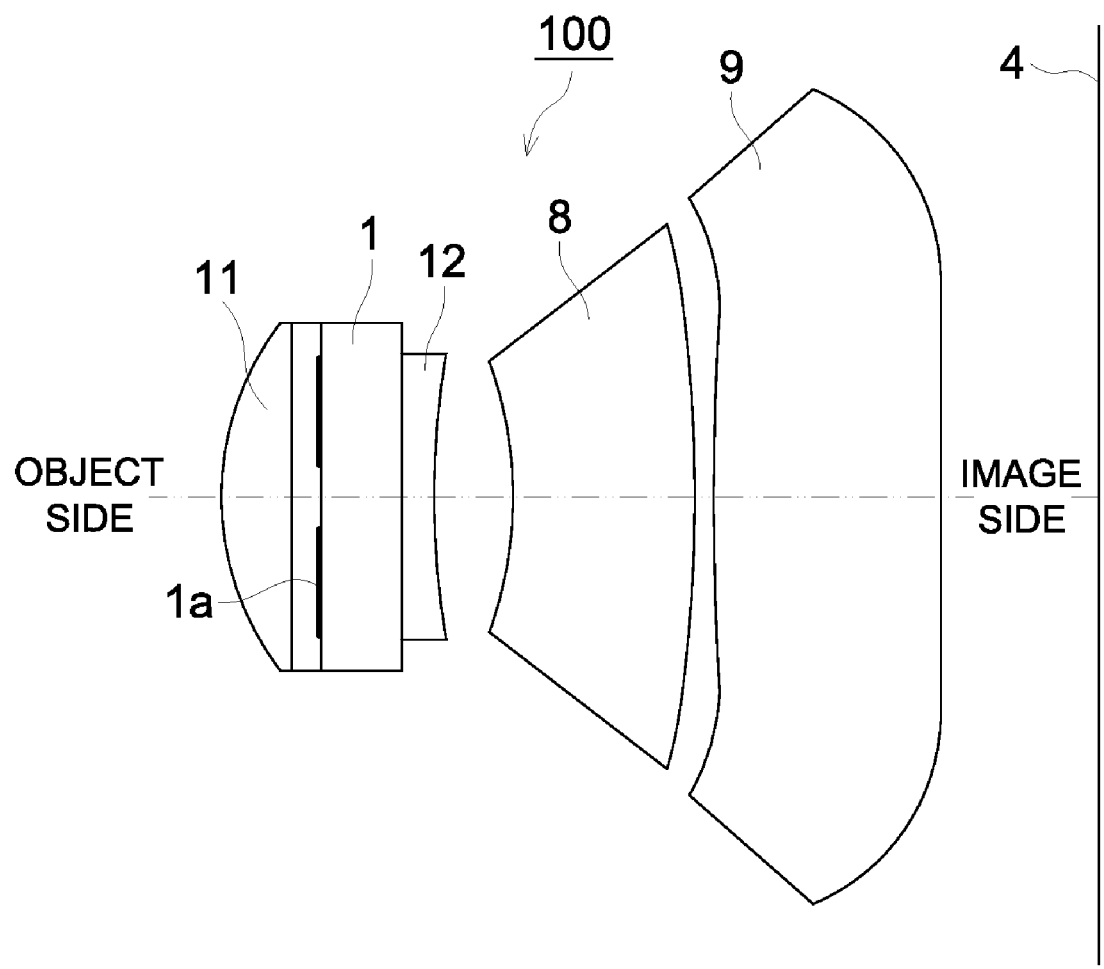
FIG. 26 is a diagram showing the structure of an image pickup lens relating to Thirteenth Example based on Embodiment 1.

FIG. 26 is a schematic diagram relating to the thirteenth example of image pickup lens 100 based on Embodiment 1.

In the image pickup lens 100 relating to the thirteenth example, there are arranged a first lens substrate 1 at the object side, and a lens A 8 at the image side of the first lens substrate 1. Further, there is arranged a lens B 9 at the image side of the lens A 8. The first lens substrate 1 and the lens A 8 are arranged with the predetermined distance between them. The lens A 8 and the lens B 9 are arranged with the predetermined distance between them. Further, there is arranged an image sensor 4 of a CCD type or a CMOS type at the image side of the lens B 9.

TABLE 26

Aspheric surface coefficient

| ** | K | A | B | C | D | E | F | G | H | I |
|---|---|---|---|---|---|---|---|---|---|---|
| 1 | 1.52E−02 | −8.73E−03 | 1.07E−01 | −1.83E−01 | 6.94E−01 | −2.14E+00 | 8.57E+00 | 0.00E+00 | 0.00E+00 | 0.00E+00 |
| 4 | 2.72E+01 | 3.43E−02 | −4.99E−01 | 1.14E+00 | −9.83E−01 | −1.15E+01 | −1.45E+01 | −2.16E+02 | 8.29E+02 | 0.00E+00 |
| 5 | 1.11E+01 | −1.82E−01 | −1.14E+00 | 2.31E+00 | −1.22E+01 | 3.69E+00 | 2.58E+01 | −3.77E+00 | −1.62E+03 | −2.05E+03 |
| 6 | 0.00E+00 | −7.36E−02 | −2.57E−02 | −1.62E−02 | −2.96E−02 | 0.00E+00 | 0.00E+00 | 0.00E+00 | 0.00E+00 | 0.00E+00 |
| 7 | −5.44E+02 | −1.09E−01 | −2.61E−03 | −8.62E−03 | −1.58E−02 | −1.89E−02 | −1.65E−02 | −1.02E−02 | 6.72E−04 | 1.60E−02 |
| 8 | −1.31E+02 | −1.39E−01 | 2.93E−02 | −2.37E−02 | −1.76E−02 | 8.83E−03 | 5.73E−03 | −3.87E−03 | 5.37E−05 | 1.47E−04 |

**: Surface No.

Fourteenth Example

Figure 28:
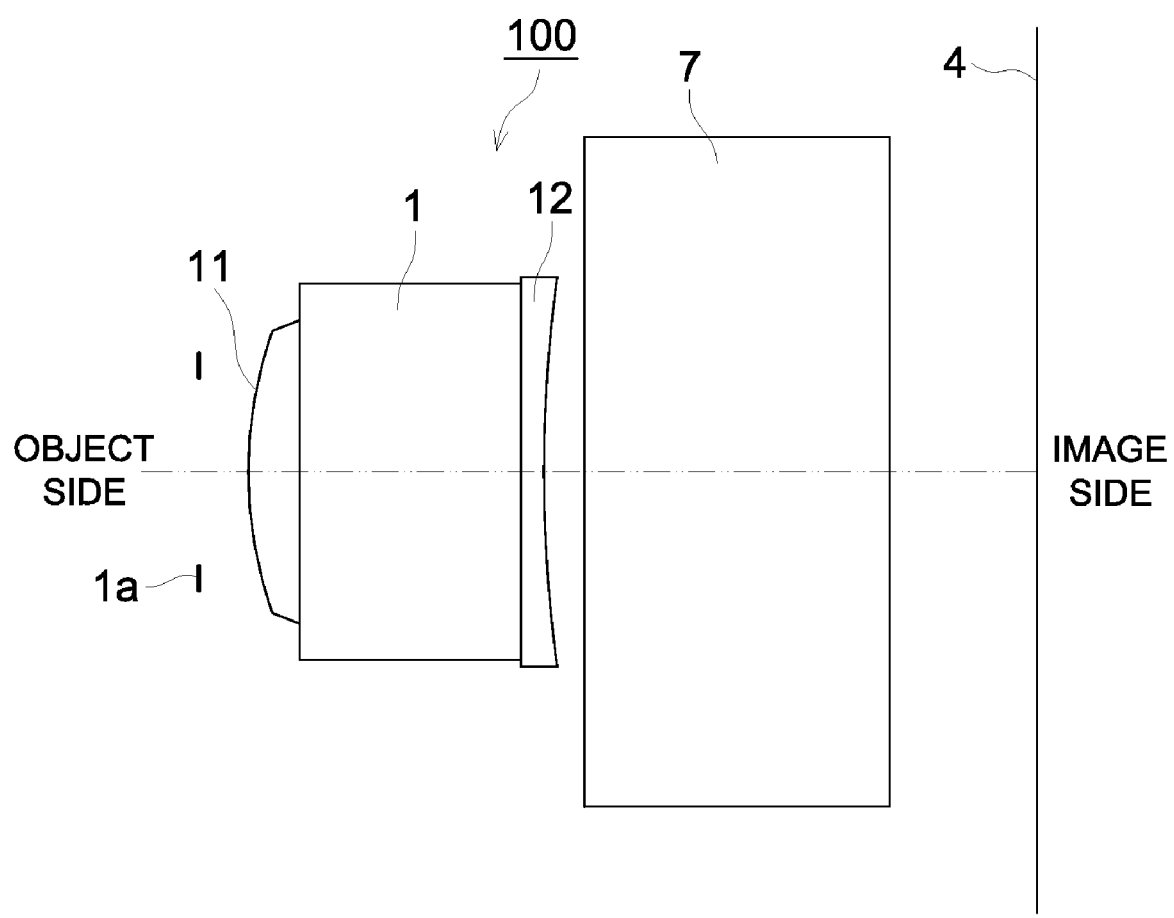
FIG. 28 is a diagram showing the structure of an image pickup lens relating to Fourteenth Example based on Embodiment 2.

FIG. 28 is a schematic diagram relating to the fourteenth example of image pickup lens 100 based on Embodiment 2.

Figure 29:
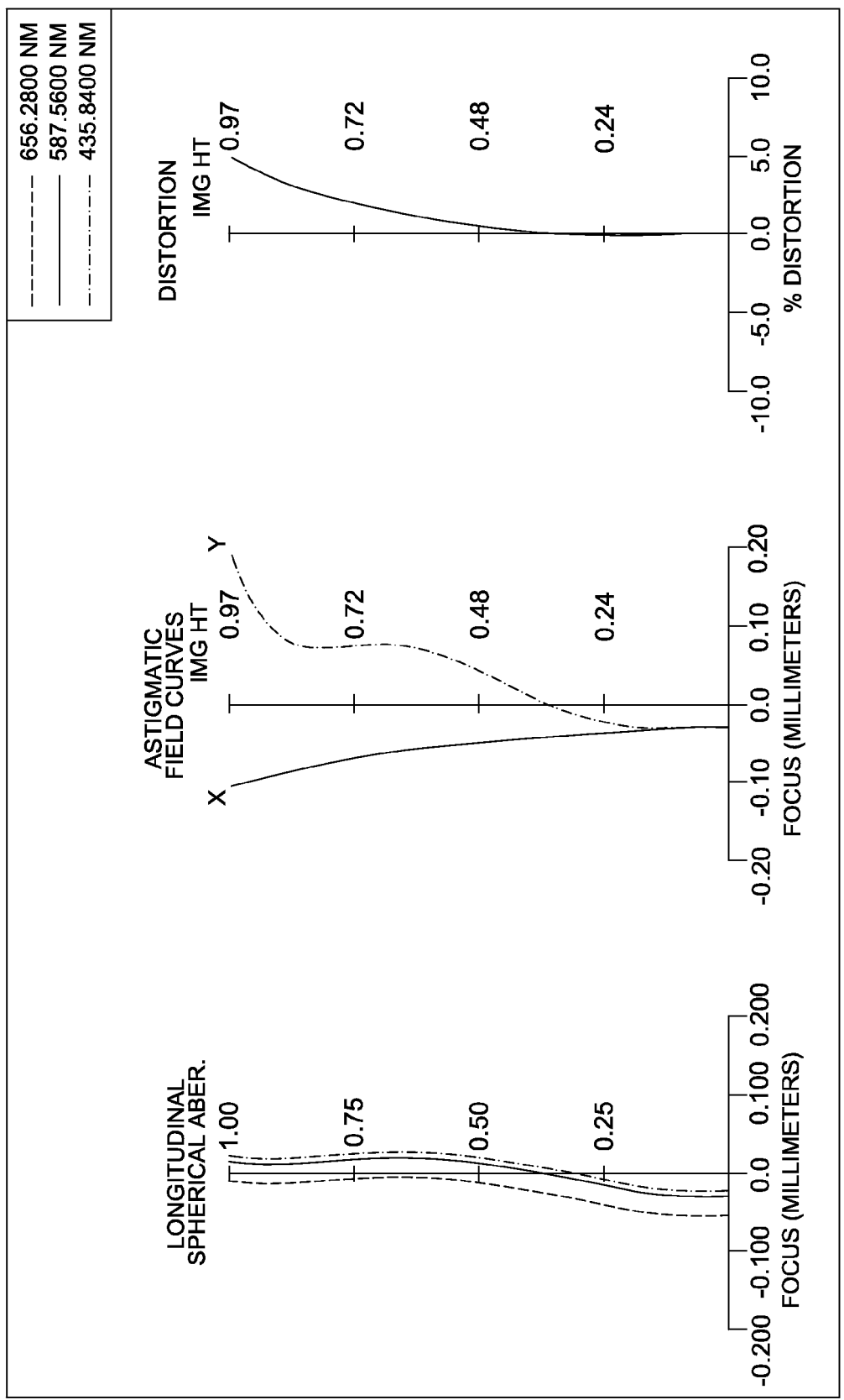
FIG. 29 is an aberration diagram of an image pickup lens relating to Fourteenth Example.

An arrangement of lens substrates and lenses is the same as that shown in Embodiment 2. Table 27 and Table 28 show data of a working example of image pickup lens 100 including this optical system. FIG. 29 shows an aberration diagram of an image pickup lens including this optical system and providing data of the working example.

With respect to the image pickup lens 100 relating to the fourteenth example, Abbe number ν1 of the first lens 11 is 56.60, and Abbe number ν2 of the second lens 12 is 23.00, as shown in Tables.

TABLE 27

| Surface No. | R | D | Nd | ν |
|---|---|---|---|---|
| 1(ape) |  | 0.116 |  |  |
| 2* | 0.730 | 0.120 | 1.43000 | 56.60 |
| 3 | ∞ | 0.500 | 1.51680 | 64.20 |
| 4 | ∞ | 0.050 | 1.63630 | 23.00 |
| 5* | −1.816 | 0.100 |  |  |
| 6 | ∞ | 0.683 | 1.51680 | 64.20 |
|  |  | 0.447 |  |  |

| BF | Fno | HFOV | TL |
|---|---|---|---|
| 0.447 | 2.8 | 31.187 | 2.017 |

TABLE 28

Aspheric surface coefficient

| ** | K | A | B | C | D | E | F | G | H | I |
|---|---|---|---|---|---|---|---|---|---|---|
| 2 | −2.98E+00 | −7.16E−01 | 8.71E+01 | −1.17E+03 | 1.48E+03 | 1.39E+04 | −4.55E+04 | 8.01E+06 | 1.43E+08 | −2.37E+09 |
| 5 | −9.70E+04 | 1.34E+00 | 2.96E+00 | −2.42E+01 | −3.78E+02 | 4.99E+03 | −1.46E+04 | 1.61E+04 | −7.20E+04 | −2.65E+05 |

**: Surface No.

Fifteenth Example

Figure 30:
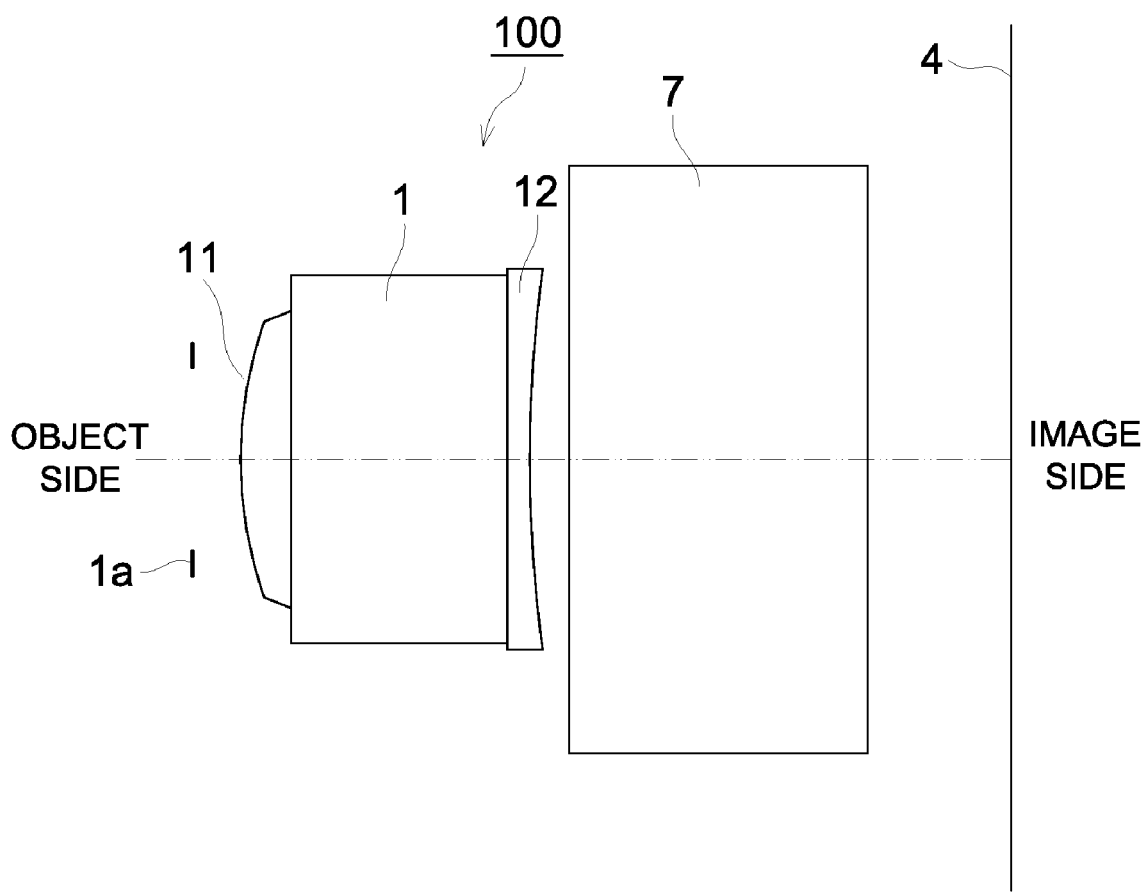
FIG. 30 is a diagram showing the structure of an image pickup lens relating to Fifteenth Example based on Embodiment 2.

FIG. 30 is a schematic diagram relating to the fifteenth example of image pickup lens 100 based on Embodiment 2.

Figure 31:
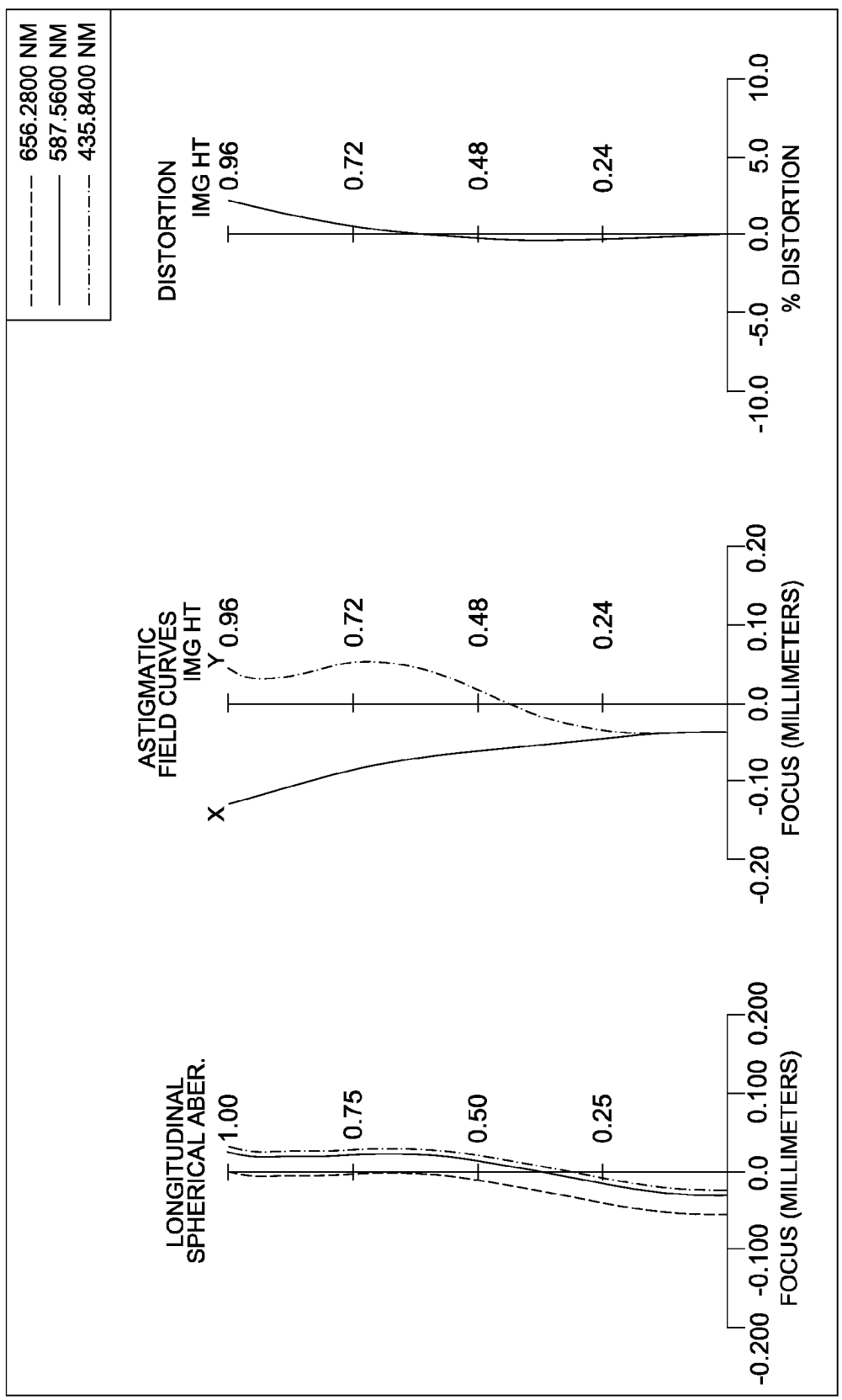
FIG. 31 is an aberration diagram of an image pickup lens relating to Fifteenth Example.

An arrangement of lens substrates and lenses is the same as that shown in Embodiment 2. Table 29 and Table 30 show data of a working example of image pickup lens 100 including this optical system. FIG. 31 shows an aberration diagram of an image pickup lens including this optical system and providing data of the working example.

With respect to the image pickup lens 100 relating to the fifteenth example, Abbe number ν1 of the first lens 11 is 56.60, and Abbe number ν2 of the second lens 12 is 23.00, as shown in Tables.

TABLE 29

| Surface No. | R | D | Nd | ν |
|---|---|---|---|---|
| 1(ape) |  | 0.116 |  |  |
| 2* | 0.730 | 0.120 | 1.43000 | 56.60 |
| 3 | ∞ | 0.500 | 1.71300 | 53.90 |
| 4 | ∞ | 0.050 | 1.63630 | 23.00 |
| 5* | −1.816 | 0.100 |  |  |
| 6 | ∞ | 0.683 | 1.51680 | 64.20 |
|  |  | 0.487 |  |  |

| BF | Fno | HFOV | TL |
|---|---|---|---|
| 0.487 | 2.8 | 31.17 | 2.086 |

TABLE 30

| ** | K | A | B | C | D | E | F | G | H | I |
|---|---|---|---|---|---|---|---|---|---|---|
| 2 | −2.98E+00 | −7.16E−01 | 8.71E+01 | −1.17E+03 | 1.48E+03 | 1.39E+04 | −4.55E+04 | 8.01E+06 | 1.43E+08 | −2.37E+09 |
| 5 | −9.70E+04 | 1.34E+00 | 2.96E+00 | −2.42E+01 | −3.78E+02 | 4.99E+03 | −1.46E+04 | 1.61E+04 | −7.20E+04 | −2.65E+05 |

**: Surface No.

Aspheric surface coefficient (table header)

Sixteenth Example

Figure 32:
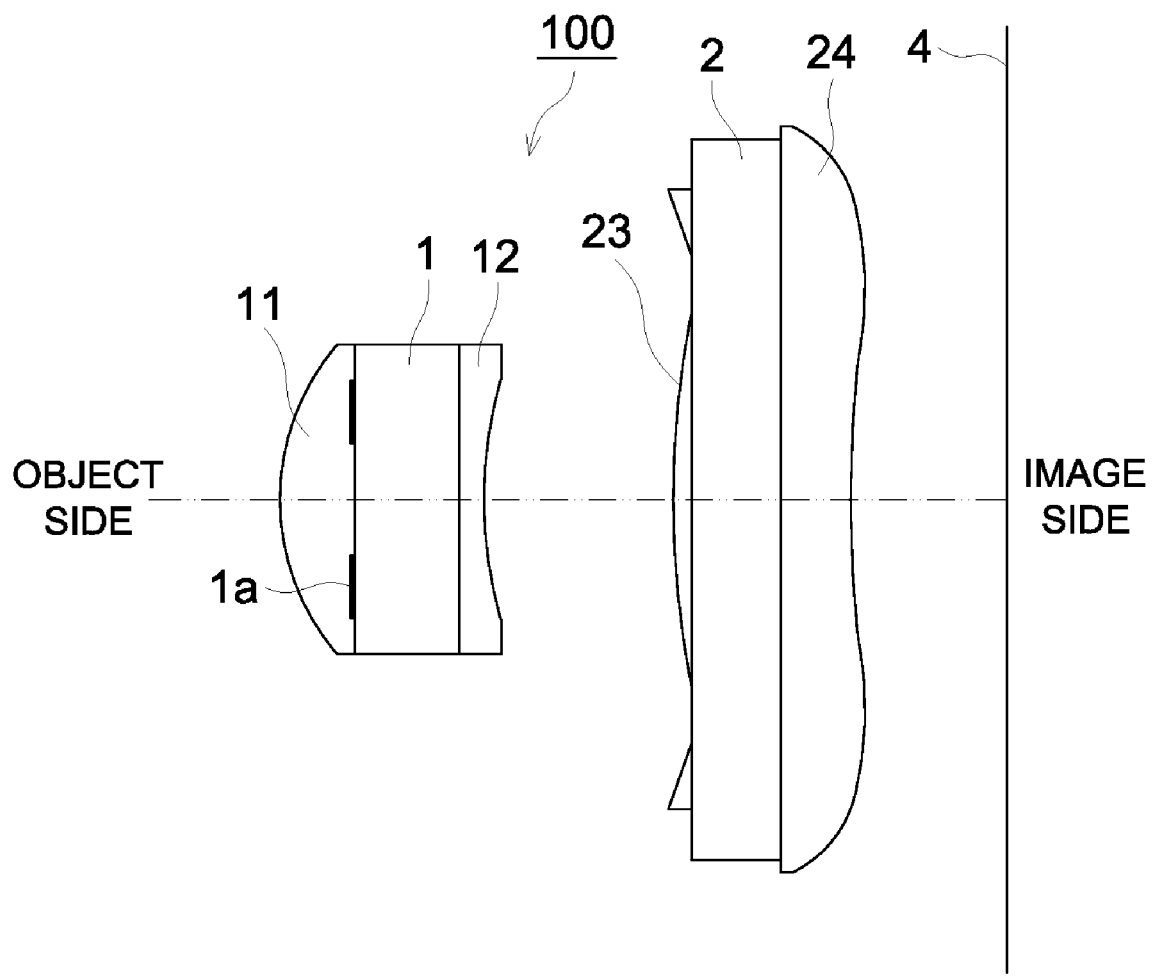
FIG. 32 is a diagram showing the structure of an image pickup lens relating to Sixteenth Example based on Embodiment 1.
Figure 33:
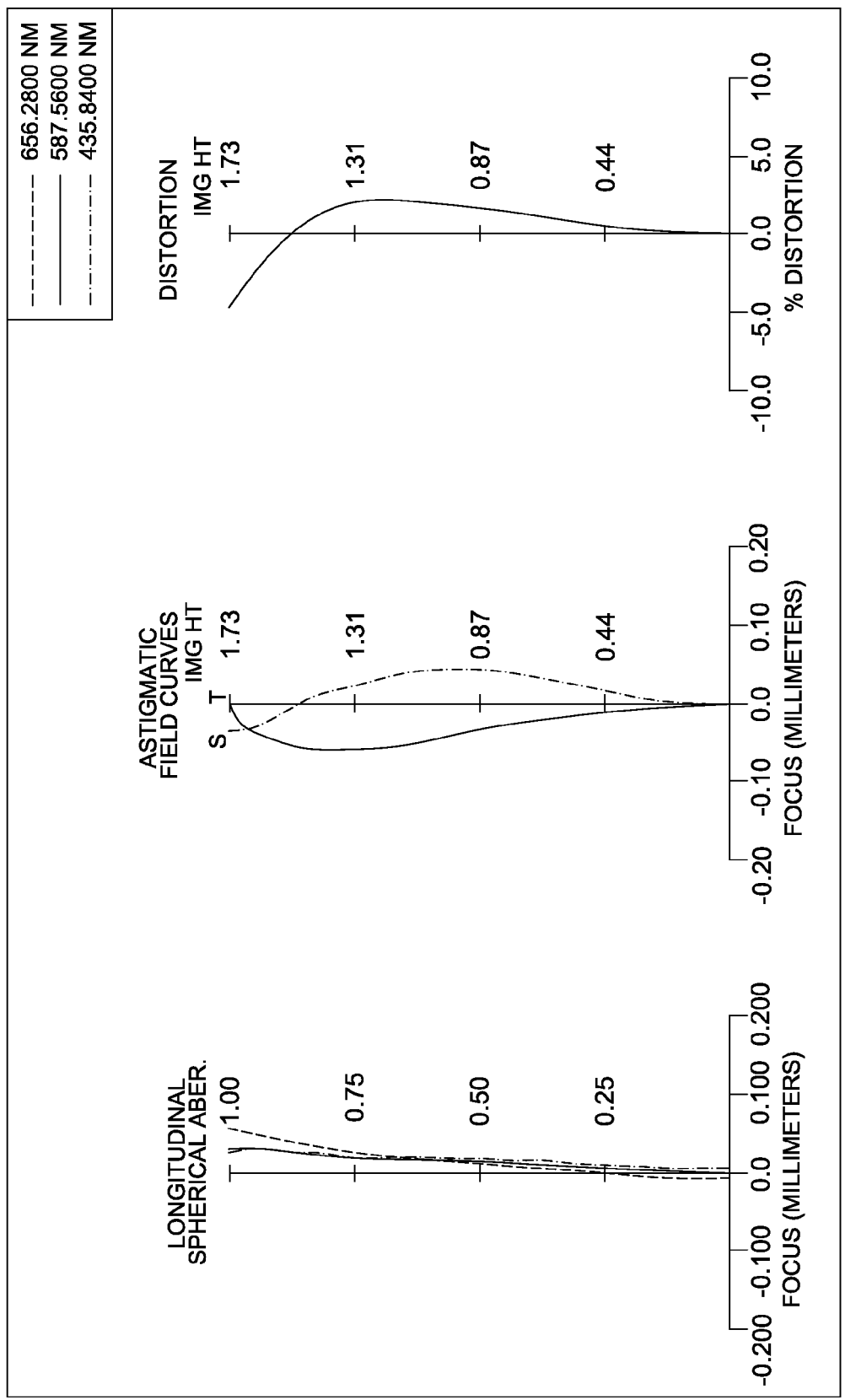
FIG. 33 is an aberration diagram of an image pickup lens relating to Sixteenth Example.

FIG. 32 is a schematic diagram relating to the sixteenth example of image pickup lens 100 based on Embodiment 1. An arrangement of lens substrates and lenses is the same as that shown in Embodiment 1. Table 31 and Table 32 show data of a working example of image pickup lens including this optical system. FIG. 33 shows an aberration diagram of an image pickup lens including this optical system and providing data of the working example.

With respect to the image pickup lens 100 relating to the sixteenth example, Abbe number v1 of the first lens 11 is 56.60, and Abbe number v2 of the second lens 12 is 23.00, as shown in Tables.

TABLE 31

| Surface No. | R | D | Nd | v |
|---|---|---|---|---|
| 1* | 0.791 | 0.250 | 1.43000 | 56.60 |
| 2(ape) | ∞ | 0.353 | 1.71300 | 53.90 |
| 3 | ∞ | 0.086 | 1.63630 | 23.00 |
| 4* | 1.800 | 0.657 | | |
| 5* | 2.636 | 0.060 | 1.63630 | 23.00 |
| 6 | ∞ | 0.300 | 1.71300 | 53.90 |
| 7 | ∞ | 0.256 | 1.63630 | 23.00 |
| 8* | 4.696 | 1.213 | | |

| BF | Fno | HFOV | TL |
|---|---|---|---|
| 1.213 | 2.8 | 31.93 | 3.175 | amount Sv of aspheric sag of a surface arranged at the closest position to the image side (results of calculation of the expression 18), evaluation results of the ratio $D_R$ of a thickness of optical member 7 to the focal length of the total lens system (results of calculation of expression 21), and evaluation results of the ratio $1_R$ of difference in optical path length between a principal ray at the maximum image height and an axial ray to the focal length of the total lens system (results of calculation of the expression 22).

As shown in Table 33 and Table 34, chromatic aberration was corrected satisfactorily when the difference between Abbe number v1 of the first lens 11 and Abbe number v1 of the second lens 12 satisfied the following conditional expression (2).

[Math. 38]

$$10 < (v1 - v2) < 70 \qquad (2)$$

Under the condition of using a resin material for each of the first lens 11 and the second lens 12, chromatic aberration was corrected satisfactorily when the following conditional expression (8) was satisfied, owing to the characteristic of a resin lens material.

[Math. 39]

$$10 < (v1 - v2) < 40 \qquad (8)$$

As shown in Table 33 and Table 34, when a value obtained by normalizing focal length $f_{S1}$ of the object side surface of the first lens 11 by the focal length f of the total lens system

TABLE 32

| ** | K | A | B | C | D | E | F | G | H | I |
|---|---|---|---|---|---|---|---|---|---|---|
| 1 | 3.08E−02 | −3.22E−03 | 1.89E−01 | −7.70E−02 | −7.65E−01 | 1.70E−01 | 9.73E+00 | 0.00E+00 | 0.00E+00 | 0.00E+00 |
| 4 | 7.54E+00 | 8.01E−02 | 2.89E−01 | −7.98E−01 | 6.68E+00 | −1.21E+00 | −1.38E+00 | 0.00E+00 | 0.00E+00 | 0.00E+00 |
| 5 | −1.82E+01 | −6.35E−02 | −4.50E−02 | −2.63E−02 | −2.41E−02 | −1.38E−02 | 3.75E−02 | 3.43E−04 | 7.24E−04 | 1.24E−03 |
| 8 | 5.35E+00 | −6.40E−02 | −5.66E−02 | 4.65E−03 | 2.07E−03 | −3.55E−03 | −4.39E−04 | 2.67E−05 | 3.61E−05 | 3.13E−05 |

**: Surface No.

Aspheric surface coefficient (table header)

Results of Examples

As is shown in an aberration diagram of each example, chromatic aberration is corrected satisfactorily in each example. Table 33 and Table 34 show evaluation results in the present examples: evaluation results in the difference dv between Abbe number v1 of the first lens 11 and Abbe number v2 of the second lens 12 (results of calculation of the expression 15), evaluation results of the ratio $f_R$ of the focal length of the first lens 11 to the focal length of the total lens system (results of calculation of the expression 16), evaluation results of Petzval's sum pn (results of calculation of the expression 17), evaluation results of the ratio $f_1/f_m$ of the focal length $f_1$ of the first lens to the focal length $f_m$ of $m^{th}$ lens (results of calculation of the expression 25), evaluation results of the satisfied the following conditional expression (3), the total optical length was short, and excellent aberration properties were obtained.

[Math. 40]

$$0.6 \le \frac{f_{s1}}{f} \le 1.0 \qquad (3)$$

As shown in Table 33 and Table 34, it is preferable that the Petzval's sum satisfies the following conditional expression (4). By satisfying the following conditional expression (4), astigmatism was corrected satisfactorily in spite of its short total optical length.

[Math. 41]

$$\sum_j \frac{1}{f_j n_j} \leq 0.14 \quad (4)$$

As shown in Table 33 and Table 34, when the ratio $f_1/f_m$ of focal length $f_1$ to focal length $f_m$ of $i^{th}$ lens satisfied the following conditional expression (25), it was possible to obtain excellent aberration properties.

[Math. 42]

$$-0.7 \leq \frac{f_1}{fm} < 0 \quad (25)$$

As shown in Table 33 and Table 34, when a value obtained by normalizing the amount of the aspheric sag of the surface arranged at the closest position to the image side by the maximum image height satisfies the following conditional expression (5), it provides excellent aberration properties in spite of its short total optical length, and an incident angle to an image sensor such as a CCD can be kept to be small in the area where the image height is great.

[Math. 43]

$$\frac{|X - X_0|}{Y} > 0.14 \quad (5)$$

As shown in Table 33 and Table 34, when the ratio of a thickness of optical member 7 to the focal length of the total lens system satisfies the following conditional expression (6), it was possible to obtain a short total optical length and excellent aberration properties.

[Math. 44]

$$\frac{D_g}{f} \geq 0.1 \quad (6)$$

As shown in Table 33 and Table 34, when the ratio of difference in optical path between an axial ray and a principal ray at the maximum image height to the focal length of the total lens system satisfies the following conditional expression (7), it was possible to obtain a short total optical length and excellent aberration properties.

[Math. 45]

$$0.13 > \frac{l_2 - l_1}{f} \quad (7)$$

Further, when relationship between refractive index n1 of the first lens 11 and refractive index n2 of the first lens substrate 1 satisfied the following conditional expression (9), it was possible to obtain a short total optical length and excellent aberration properties.

[Math. 46]

$$n_1 < n_2 \quad (9)$$

TABLE 33

|   | Example 1 | Example 2 | Example 3 | Example 4 | Example 5 | Example 6 | Example 7 | Example 8 |
|---|---|---|---|---|---|---|---|---|
| v1 | 54.00 | 55.72 | 54.00 | 54.00 | 70.45 | 54.00 | 54.00 | 54.00 |
| v2 | 29.00 | 30.23 | 29.00 | 29.00 | 31.16 | 26.00 | 29.00 | 29.00 |
| (**15) Results | 25.00 | 25.50 | 25.00 | 25.00 | 39.28 | 28.00 | 25.00 | 25.00 |
| $f_{s1}$ | 2.670 | 2.525 | 2.751 | 2.627 | 3.237 | 2.753 | 2.439 | 2.170 |
| f | 2.955 | 2.918 | 2.895 | 2.964 | 2.979 | 2.954 | 2.927 | 1.475 |
| (**16) Results | 0.90 | 0.87 | 0.95 | 0.89 | 1.09 | 0.93 | 0.83 | 1.471 |
| $f_{s2}$ | −2.730 | −2.500 | −3.033 | −4.010 | −3.185 | −4.273 | −4.564 | −41.700 |
| $f_{s3}$ | 10.590 | 26.411 | 9.845 | −6.336 | 13.866 | −5.285 | −4.909 | |
| $f_{s4}$ | −10.560 | −33.308 | −8.341 | −37.041 | −11.562 | 54.733 | | |
| $f_{s5}$ | | | | | | 26.656 | 10.184 | |
| $f_{s6}$ | | | | | | −10.838 | −7.604 | |
| (**17) Results | 0.167 | 0.153 | 0.170 | 0.067 | 0.188 | 0.077 | 0.056 | 0.434 |
| $f_1/f_3$ | 0.252 | 0.096 | 0.279 | −0.415 | 0.233 | −0.521 | −0.497 | |
| $f_1/f_4$ | 0.252 | 0.096 | 0.279 | −0.415 | 0.233 | −0.521 | −0.497 | |
| $f_1/f_5$ | −0.253 | −0.076 | −0.330 | −0.071 | −0.280 | 0.050 | | |
| $f_1/f_6$ | | | | | | −0.254 | −0.321 | |
| X | −0.180 | −0.397 | −0.150 | −0.484 | −0.203 | −0.400 | −0.349 | |
| $X_0$ | 0.154 | 0.057 | 0.116 | 0.006 | 0.147 | 0.078 | 0.093 | |
| Y | 1.750 | 1.730 | 1.750 | 1.750 | 1.750 | 1.750 | 1.750 | 0.88 |
| h | 1.270 | 1.298 | 1.329 | 1.291 | 1.410 | 1.298 | 1.270 | |
| (**18) Results | 0.191 | 0.262 | 0.152 | 0.280 | 0.200 | 0.273 | 0.253 | |
| (**21) Results | | | | | | | | 0.136 |
| (**22) Results | | | | | | | | 0.107 |

**Expression

TABLE 34

| | Example 9 | Example 10 | Example 11 | Example 12 | Example 13 | Example 14 | Example 15 | Example 16 |
|---|---|---|---|---|---|---|---|---|
| v1 | 54.00 | 70.45 | 54.00 | 70.45 | 54.00 | 56.60 | 56.60 | 56.60 |
| v2 | 29.00 | 31.16 | 29.00 | 31.16 | 26.00 | 23.00 | 23.00 | 23.00 |
| (**15) Results | 25.00 | 39.28 | 25.00 | 39.28 | 28.00 | 33.60 | 33.60 | 33.60 |
| $f_{s1}$ | 2.200 | 2.258 | 2.415 | 3.237 | 2.753 | 2.150 | 2.426 | 3.15 |
| f | 1.450 | 1.559 | 1.477 | 2.973 | 2.966 | 1.453 | 1.455 | 2.81 |
| (**16) Results | 1.517 | 1.449 | 1.635 | 1.09 | 0.93 | 1.820 | 1.667 | 1.12 |
| $f_{s2}$ | −41.700 | −41.700 | −41.700 | −3.185 | −4.273 | −38.480 | −38.480 | −2.821 |
| $f_{s3}$ | | | | 12.570 | −4.620 | | | 7.0957 |
| $f_{s4}$ | | | | −11.562 | 54.733 | | | −7.38 |
| $f_{s5}$ | | | | | 22.160 | | | |
| $f_{s6}$ | | | | | −10.838 | | | |
| (**17) Results | 0.442 | 0.416 | 0.434 | 0.017 | −0.058 | 0.465 | 0.465 | 0.087 |
| $f_1/f_3$ | | | | | | | | 0.444 |
| $f_1/f_4$ | | | | | | | | 0.444 |
| $f_1/f_5$ | | | | | | | | −0.427 |
| $f_1/f_6$ | | | | | | | | |
| X | | | | | | | | −0.06258 |
| $X_0$ | | | | | | | | 0.14902 |
| Y | 0.88 | 0.88 | 0.88 | 1.75 | 1.750 | 0.88 | 0.88 | 1.75 |
| h | | | | | 1.298 | | | 1.1219 |
| (**18) Results | | | | | | | | 0.1209 |
| (**21) Results | 0.624 | 0.770 | | | | 0.683 | 0.683 | |
| (**22) Results | 0.108 | 0.096 | 0.106 | | | 0.111 | 0.111 | |

**Expression

The invention has been explained above, referring to the embodiments and the examples. However, the invention should not be construed to be limited to the embodiments and the examples, and it is naturally possible to vary or improve the invention.

The invention claimed is:

1. An image pickup lens comprising:
a lens group arranged at a closest position to an object side in the image pickup lens; and
an optical member being a parallel flat plate, arranged at an image side of the lens group with a predetermined distance,
wherein the lens group comprises:
a first lens substrate being a parallel flat plate;
a first lens with an Abbe number v1 and a positive refractive power, formed on an object side surface of the first lens substrate, an object side surface of the first lens being a convex surface facing the object side; and
a second lens with an Abbe number v2 and a negative refractive power, formed on an image side of the first lens substrate, the image side surface of the second lens being a concave surface facing the image side,
a difference of the Abbe numbers v1 and v2 satisfies the following expression (1), and the optical member satisfies the following expression(2):

$$10 < (v1 - v2) < 70 \qquad (1)$$

$$0.13 > \frac{l_2 - l_1}{f}, \qquad (2)$$

where $l_1$ is an optical path length of an axial ray from the second lens to an image plane, $l_2$ is an optical path length of a principal ray at a maximum image height from the second lens to the image plane, and f is a focal length of a total lens system of the image pickup lens.

2. An image pickup lens comprising:
a lens group arranged at a closest position to an object side in the image pickup lens, the lens group including:
a first lens substrate being a parallel flat plate,
a first lens with an Abbe number v1 and a positive refractive power, formed on an object side surface of the first lens substrate, and
a second lens with an Abbe number v2 and a negative refractive power, formed on an image side surface of the first lens substrate; and
a second lens substrate being a parallel flat plate, arranged at an image side of the first lens substrate with a predetermined distance, and a lens or lenses with a positive or negative power formed on at least one of an object side surface and an image side surface of the second lens substrate,
wherein a difference of the Abbe numbers v1 and v2 satisfies the following expression (1):

$$10 < (v1 - v2), \text{ and} \qquad (1)$$

wherein at least one m-th lens selected from a third lens which is arranged on the second lens substrate and lenses arranged at a closer position to the image side than the third lens, has a negative power and has a focal length fm satisfying the expression (2):

$$-0.7 \leq \frac{f_1}{fm} < 0, \qquad (2)$$

where m satisfies m≧3, and
$f_1$ is a focal length of the first lens.

3. The image pickup lens of claim 2,
wherein an Abbe number vm of the m-th lens satisfies the expression (3):

$$20 \leq vm \leq 50 \qquad (3).$$

4. The image pickup lens of claim 2,
wherein a lens substrate arranged at a closest position to the image side in the image pickup lens comprises a lens on an image side thereof, and an image side surface of the lens has a negative refractive power.

5. An image pickup lens comprising:
a lens group arranged at a closest position to an object side in the image pickup lens, the lens group including:
a first lens substrate being a parallel flat plate,
a first lens with an Abbe number v1 and a positive refractive power, formed on an object side surface of the first lens substrate, and
a second lens with an Abbe number v2 and a negative refractive power, formed on an image side surface of the first lens substrate;
a second lens substrate being a parallel flat plate, arranged at an image side of the first lens substrate with a predetermined distance, and a lens or lenses with a positive or negative power formed on at least one of an object side surface and an image side surface of the second lens substrate; and
a third lens with a negative refractive power, arranged on an object side surface of the second lens substrate,
wherein a difference of the Abbe numbers v1 and v2 satisfies the following expression (1):

$$10 < (v1 - v2) \quad (1).$$

6. An image pickup lens comprising:
a lens group arranged at a closest position to an object side in the image pickup lens, the lens group including:
a first lens substrate being a parallel flat plate,
a first lens with an Abbe number v1 and a positive refractive power, formed on an object side surface of the first lens substrate, and
a second lens with an Abbe number v2 and a negative refractive power, formed on an image side surface of the first lens substrate; and
a second lens substrate being a parallel flat plate, arranged at an image side of the first lens substrate with a predetermined distance, and a lens or lenses with a positive or negative power formed on at least one of an object side surface and an image side surface of the second lens substrate,
wherein a difference of the Abbe numbers v1 and v2 satisfies the following expression (1):

$$10 < (v1 - v2), \text{ and} \quad (1)$$

wherein a lens surface arranged at a closest position to the image side in the image pickup lens is an aspheric surface, and
a value calculated by normalizing an amount of an aspheric sag of the lens surface arranged at the closest position to the image side by a maximum image height, satisfies a condition of the following expression (2):

$$\frac{|X - X_0|}{Y} > 0.14, \quad (2)$$

where X is a displacement amount of the aspheric surface given by the expression (2.1), and is measured in a perpendicular direction to an optical axis at a height of a principal ray at a maximum image height:

$$X = \frac{h^2/R}{1 + \sqrt{1 - (1+K)h^2/R^2}} + \sum A_i h^i, \quad (2.1)$$

$X_0$ is a displacement amount of a component of a quadratic surface of revolution in the aspheric surface, given by the expression (2.2), and is measured in the perpendicular direction to the optical axis at the height of the principal ray at the maximum image height:

$$X_0 = \frac{h^2/R}{1 + \sqrt{1 - (1+K)h^2/R^2}}, \quad (2.2)$$

Y is the maximum image height,
Ai is a i-th order aspheric surface coefficient of the lens surface arranged at the closest position to the image side, where i=2, 4, 6 . . . ,
R is a paraxial curvature radius of the lens surface arranged at the closest position to the image side,
K is a conic constant the lens surface arranged at the closest position to the image side, and
h is a height of a principal ray at the maximum image height and is measured in the perpendicular direction to the optical axis.

7. An image pickup lens comprising:
a lens group arranged at a closest position to an object side in the image pickup lens, the lens group including:
a first lens substrate being a parallel flat plate,
a first lens with an Abbe number v1 and a positive refractive power, formed on an object side surface of the first lens substrate, and
a second lens with an Abbe number v2 and a negative refractive power, formed on an image side surface of the first lens substrate,
wherein a difference of the Abbe numbers v1 and v2 satisfies the following expression (1):

$$10 < (v1 - v2), \text{ and} \quad (1)$$

wherein a value calculated by normalizing a focal length $f_{S1}$ of an object side surface of the first lens by a focal length f of a total lens system of the image pickup lens, satisfies the following expression (2):

$$0.6 \leq \frac{f_{s1}}{f} \leq 1.0. \quad (2)$$

8. An image pickup lens comprising:
a lens group arranged at a closest position to an object side in the image pickup lens, the lens group including:
a first lens substrate being a parallel flat plate,
a first lens with an Abbe number v1 and a positive refractive power, formed on an object side surface of the first lens substrate, and
a second lens with an Abbe number v2 and a negative refractive power, formed on an image side surface of the first lens substrate,
wherein a difference of the Abbe numbers v1 and v2 satisfies the following expression (1):

$$10 < (v1 - v2), \text{ and} \quad (1)$$

wherein a Petzval's sum of a total lens system of the image pickup lens satisfies the following expression (2):

$$\sum_j \frac{1}{f_j n_j} \leq 0.14, \quad (2)$$

where $f_j$ is a focal length of a j-th lens, and
$n_j$ is a refractive index of the j-th lens.

* * * * *